(12) United States Patent
Tanaka

(10) Patent No.: US 7,522,937 B2
(45) Date of Patent: Apr. 21, 2009

(54) SUPER-HIGH RATE LETTER INPUT DEVICE FOR A CELL PHONE

(76) Inventor: Katsuzo Tanaka, 40-15, hokuyo-mati, Nagasaki-shi, Nagasaki 852-8064 (JP)

( * ) Notice: Subject to any disclaimer, the term of this patent is extended or adjusted under 35 U.S.C. 154(b) by 686 days.

(21) Appl. No.: 10/488,479

(22) PCT Filed: Mar. 1, 2002

(86) PCT No.: PCT/JP02/01938

§ 371 (c)(1),
(2), (4) Date: Mar. 1, 2004

(87) PCT Pub. No.: WO03/021417

PCT Pub. Date: Mar. 13, 2003

(65) Prior Publication Data

US 2005/0250530 A1 Nov. 10, 2005

(30) Foreign Application Priority Data

| Aug. 29, 2001 | (WO) | PCT/JP01/07470 |
|---|---|---|
| Sep. 6, 2001 | (JP) | 2001-270474 |
| Sep. 17, 2001 | (JP) | 2001-281461 |
| Sep. 20, 2001 | (JP) | 2001-286260 |
| Sep. 20, 2001 | (JP) | 2001-286361 |
| Sep. 20, 2001 | (JP) | 2001-286424 |
| Sep. 25, 2001 | (JP) | 2001-291159 |
| Oct. 2, 2001 | (JP) | 2001-306593 |
| Oct. 2, 2001 | (JP) | 2001-306607 |
| Oct. 11, 2001 | (JP) | 2001-314042 |
| Oct. 23, 2001 | (JP) | 2001-324919 |
| Nov. 27, 2001 | (JP) | 2001-361200 |
| Dec. 12, 2001 | (JP) | 2001-378814 |
| Dec. 17, 2001 | (JP) | 2001-382516 |
| Jan. 15, 2002 | (JP) | 2002-005996 |
| Jan. 24, 2002 | (WO) | PCT/JP02/00523 |
| Feb. 5, 2002 | (JP) | 2002-028431 |
| Feb. 5, 2002 | (JP) | 2002-028447 |

(51) Int. Cl.
*H04B 1/38* (2006.01)
*H04Q 7/32* (2006.01)

(52) U.S. Cl. ............... 455/550.1; 455/575.1; 455/566; 455/351

(58) Field of Classification Search ............. 455/550.1, 455/575.1–575.9, 90.1–90.3, 351, 566
See application file for complete search history.

(56) References Cited

U.S. PATENT DOCUMENTS 4,360,892 A 11/1982 Endfield (Continued)

FOREIGN PATENT DOCUMENTS

EP 104709 A 4/1984

(Continued)

*Primary Examiner*—Philip J Sobutka
(74) *Attorney, Agent, or Firm*—Kilpatrick Stockton LLP

(57) ABSTRACT

Letter input rate of a conventional cell phone is low because only the thumb is used for inputting a letter. The inventive cell phone with one joystick, two shift keys and twenty six keys on the opposite side faces, is grasped by both hands and ten fingers are used. Any one of twenty six alphabetical letters can be inputted by a single push operation without switching the shift key and letters can be inputted at super-high rate by touch typing. The cell phone significantly enhances the convenience of letter input for users.

5 Claims, 46 Drawing Sheets

U.S. PATENT DOCUMENTS

| | | | |
|---|---|---|---|
| 4,791,408 A | 12/1988 | Heusinkveld | |
| 5,281,966 A | 1/1994 | Walsh | |
| 6,057,788 A * | 5/2000 | Cummings | 341/22 |
| 6,292,770 B1 | 9/2001 | Zerber | |
| 6,625,283 B1 | 9/2003 | Sato | |
| 2002/0000922 A1 | 1/2002 | Hosaka et al. | |
| 2002/0072395 A1 | 6/2002 | Miramontes | |

FOREIGN PATENT DOCUMENTS

| | | |
|---|---|---|
| EP | 0 414 365 A2 | 2/1991 |
| EP | 1 024 644 A2 | 8/2000 |
| JP | 04-088545 A | 3/1992 |
| JP | 06-274257 A | 9/1994 |
| JP | 09-083102 | 3/1997 |
| JP | 09-083402 A | 3/1997 |
| JP | 10-224288 A | 8/1998 |
| JP | 11-272360 | 10/1999 |
| JP | 11-296281 A | 10/1999 |
| JP | 2000-027653 A | 1/2000 |
| JP | 2000-059483 A | 2/2000 |
| JP | 2000-151774 A | 5/2000 |
| JP | 2000-244623 A | 9/2000 |
| JP | 2001-022501 A | 1/2001 |
| JP | 2001-060999 A | 3/2001 |
| JP | 2001117709 | 4/2001 |
| JP | 2001-265490 A | 9/2001 |

\* cited by examiner

Fig. 6

1. Combinations of input keys

・While the thumbs push no keys, the remaining fingers of both hands can push:                        eight characters The thumbs can push the following combinations of keys, ・Only 20-1, only 20-2, and the combination of 20-1 and 20-2

・Only 21-1, only 21-2, and the combination of 21-1 and 21-2

・Only 22-1, only 22-2, and the combination of 22-1 and 22-2

・Only 27-1, only 27-2, and the combination of 27-1 and 27-2

・Only 28-1, only 28-2, and the combination of 28-1 and 20-8

・Only 29-1, only 29-2, and the combination of 29-1 and 29-2

As a result, eighteen combinations of keys can be inputted by the thumbs. Thus, the calculation of 18 combinations X 11 characters (other three characters by the thumbs and eight characters by the remaining fingers) =198 characters is established and thus a total of 24 combinations of keys are obtained.

8 characters + 198 characters = 206 characters

2. The number of outputs

English

| | |
|---|---|
| ABCDEFGHIJKLMNOPQRSTUVWXYZ | (total 26 letters) |
| Abcdefghijklmnopqrstuvwxyz | (total 26 letters) |
| 0123456789 | (total 10 characters) |
| .,?!DEL ENT BackSpace space - @ | (total 10 characters) (half size) |

Total 72 characters + 72 characters of full size = total 144 characters

Native language (example: Japanese)

あいうえお　かきくけこ　がぎぐげご

さしすせそ　たちつてと　ざじずぜぞ　だぢづでど

なにぬねの　はひふへほ　ばびぶべぼ

まみむめも　やゆよ　　　ゃゅょっ

らりるれろ　わをん　　　あいうえお。「」、　　total 78 characters

"Katakana" characters of the above Japanese characters total 75 characters

| | |
|---|---|
| 0123456789 | total 10 characters |
| .,?!DEL ENT BackSpace space - @ | total 10 characters |

Total 173 characters

Fig. 9

1. Combinations of input keys

Key combinations inputted by the thumbs are as follows.

・The thumbs push no keys.

・Only 20-1, only 20-2, and the combination of 20-1 and 20-2

・Only 21-1, only 21-2, and the combination of 21-1 and 21-2

・Only 22-1, only 22-2, and the combination of 22-1 and 22-2

As a result, ten combinations of keys can be inputted by the thumbs. Thus, the calculation of 10 combinations X 4 characters (other four characters by the remaining fingers) =40 characters (types) is established.

・Mode selector switches 35 and 36 provide six combinations of keys. Thus, a total of 40 characters X 6 combinations = 240 characters (types) can be inputted.

2. The number of outputs

English

| | |
|---|---|
| ABCDEFGHIJKLMNOPQRSTUVWXYZ | (total 26 letters) |
| Abcdefghijklmnopqrstuvwxyz | (total 26 letters) |
| 0123456789 | (total 10 characters) |
| .,?!DEL ENT BackSpace space - @ | (total 10 characters) (half size) |

Total 72 characters + 72 characters of full size = total 144 characters

Native language (example: Japanese)

あいうえお　かきくけこ　がぎぐげご
さしすせそ　たちつてと　ざじずぜぞ　だぢづでど
なにぬねの　はひふへほ　　ばびぶべぼ
まみむめも　やゆよ　　　ゃゅょっ
らりるれろ　わをん　　　ぁぃぅぇぉ。「」、　　total 78 characters "Katakana" characters of the above Japanese
characters (full size)　　　　　　　　total 75 characters
0123456789 (half size and full size)　total 20 characters
.,?!DEL ENT BackSpace space - @　　　 total 10 characters
　　　　　　　　　　　　　　　　　　　Total 183 characters Fig.24
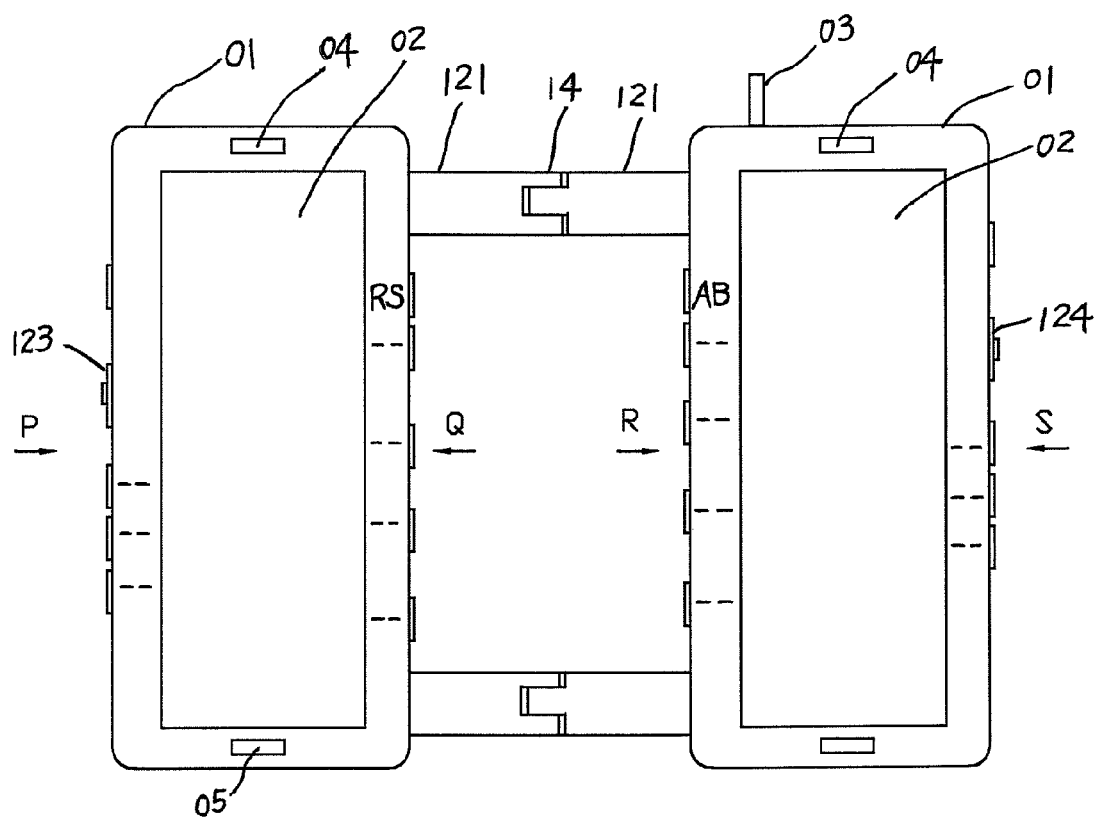
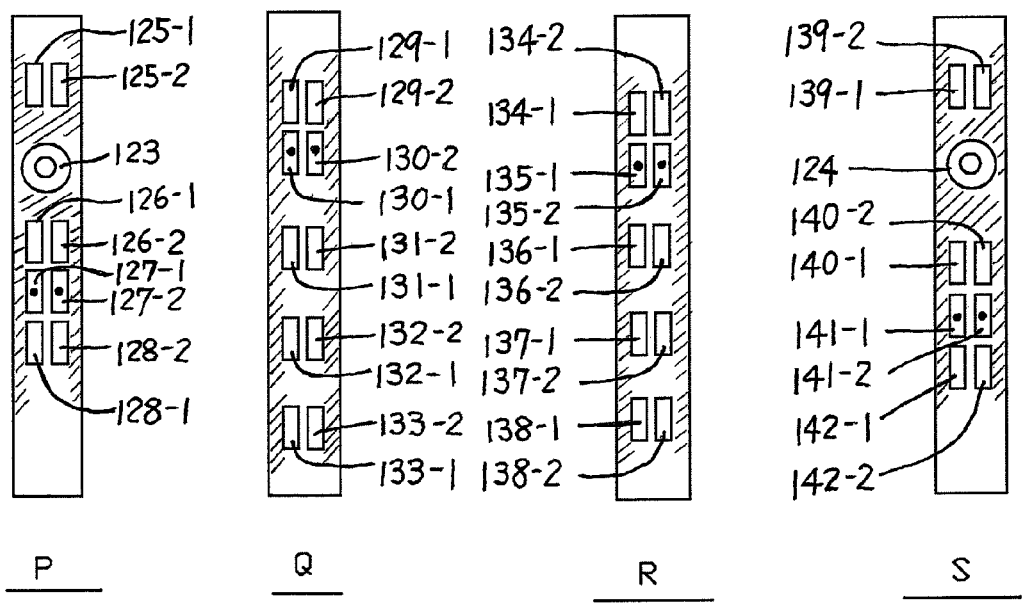

Fig.30
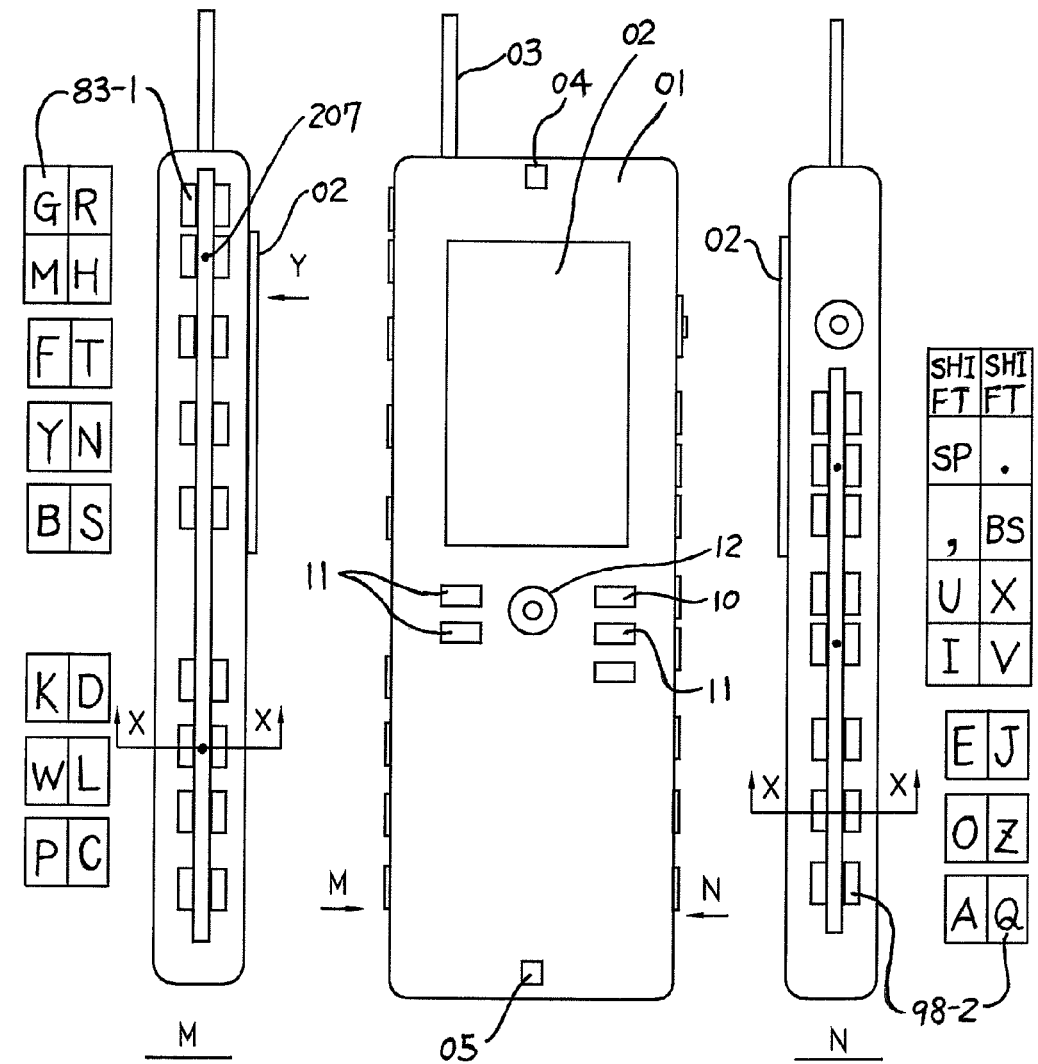
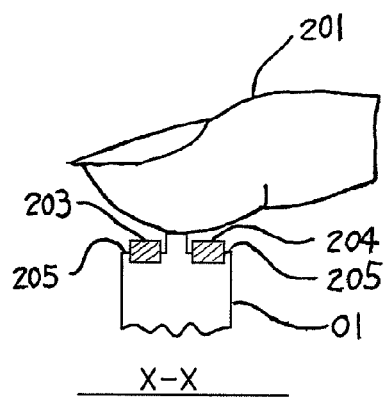
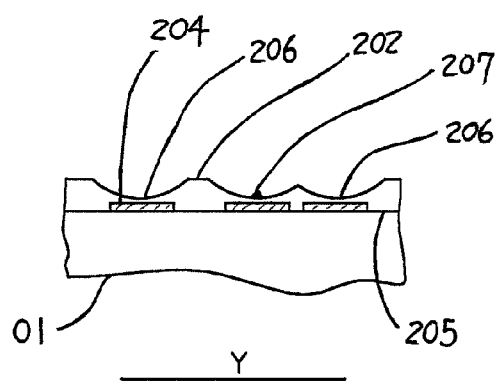

Fig.33
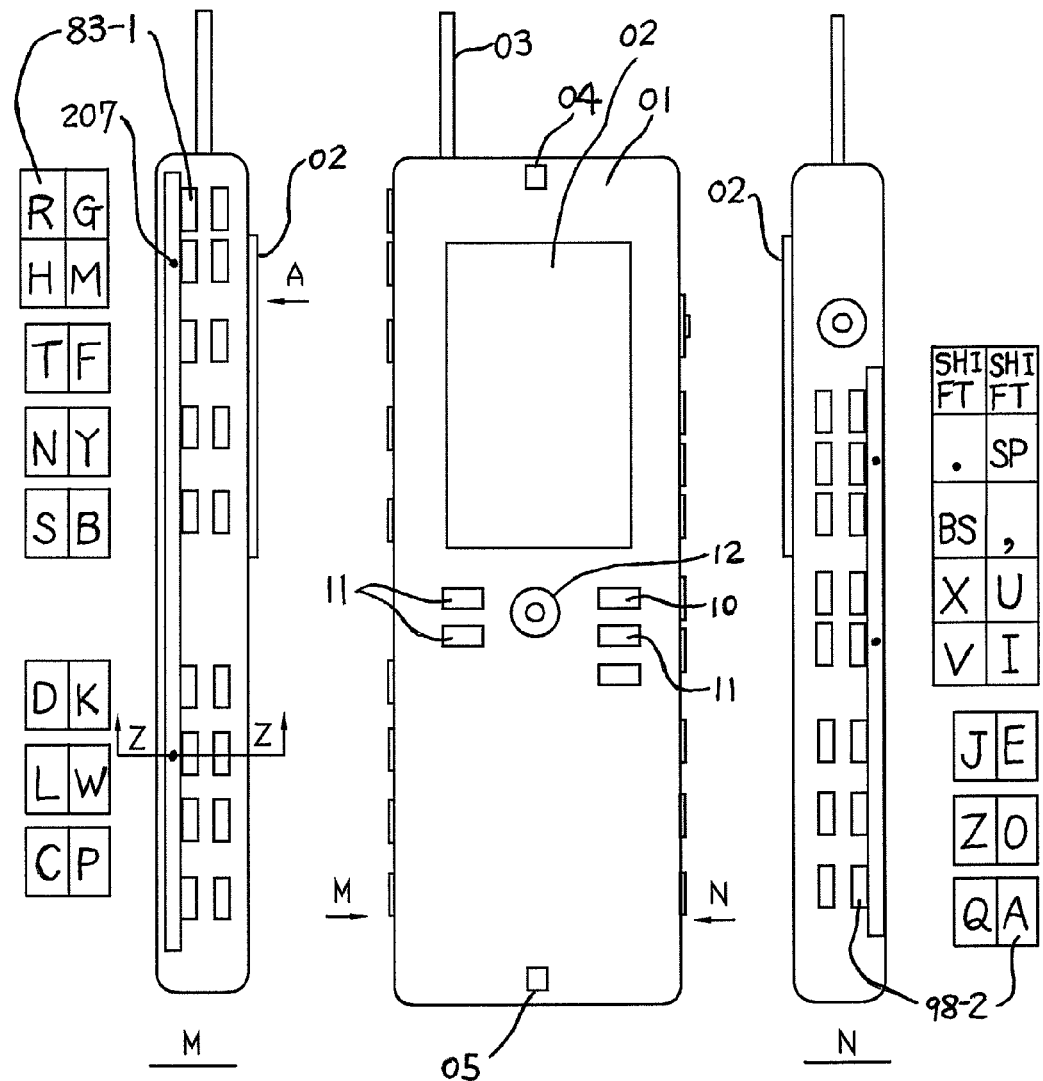
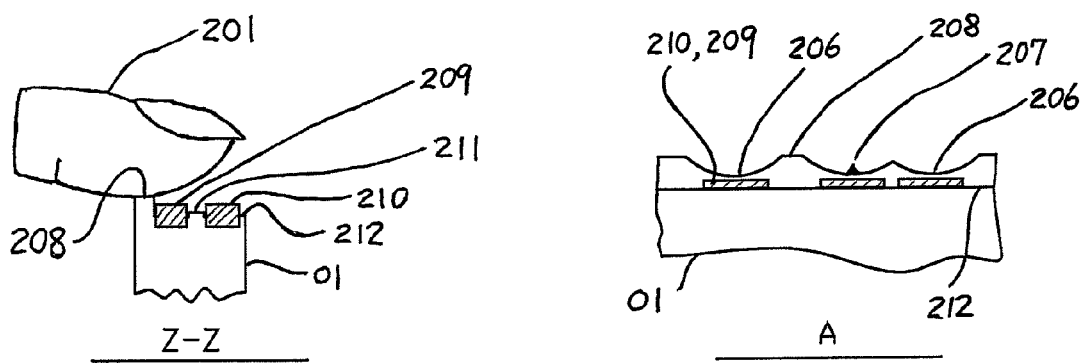

Fig.42
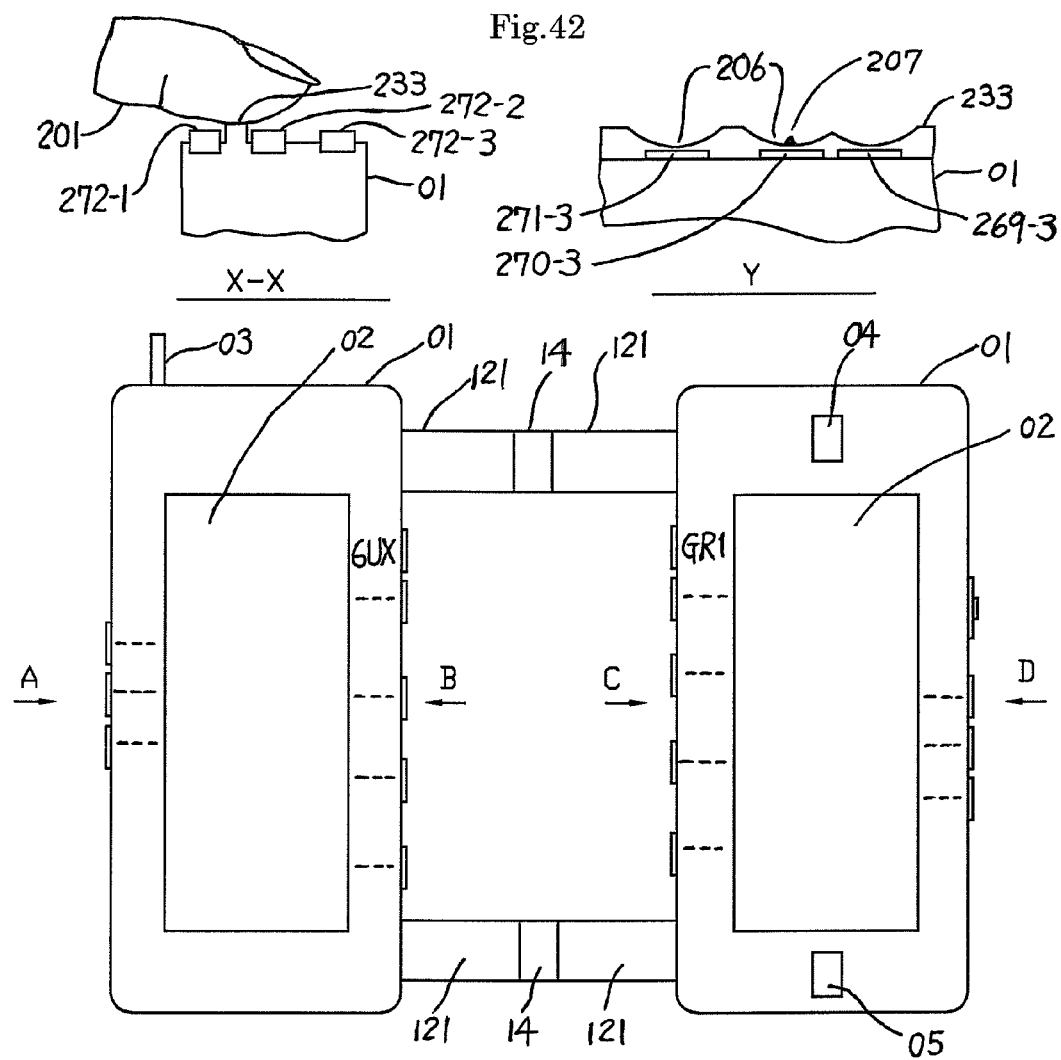
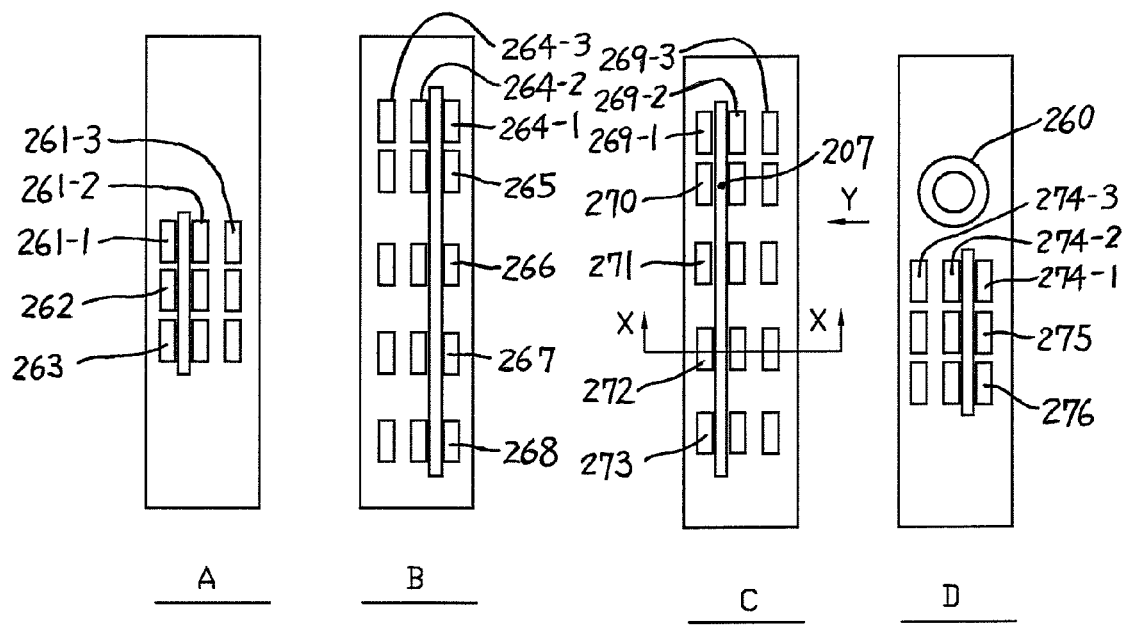

Fig.46
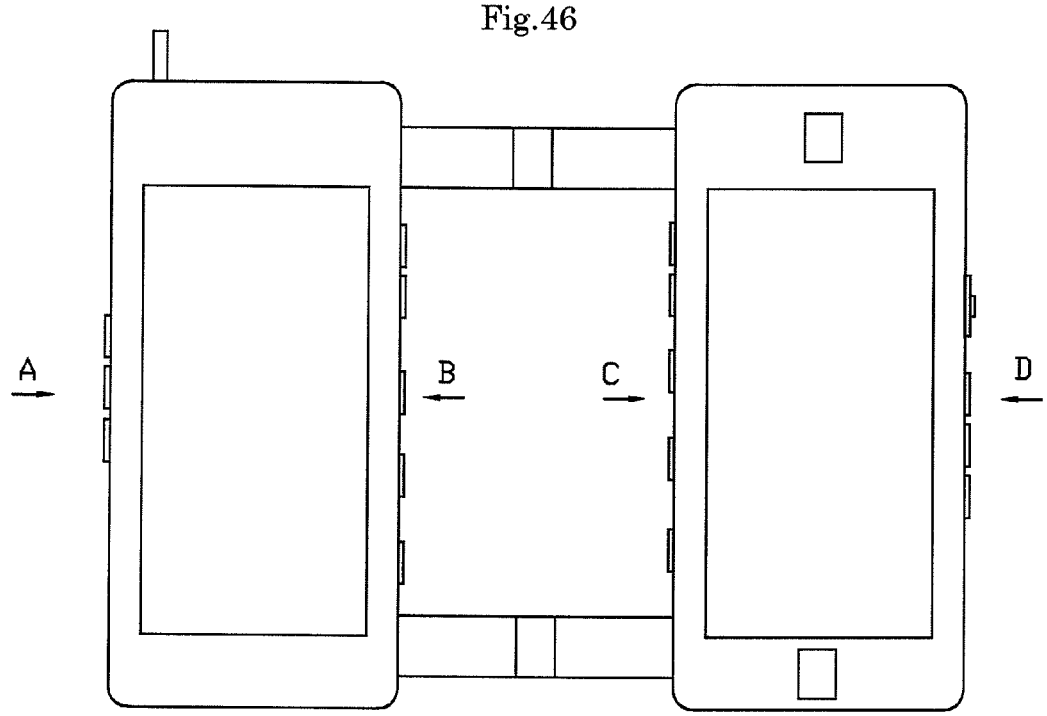
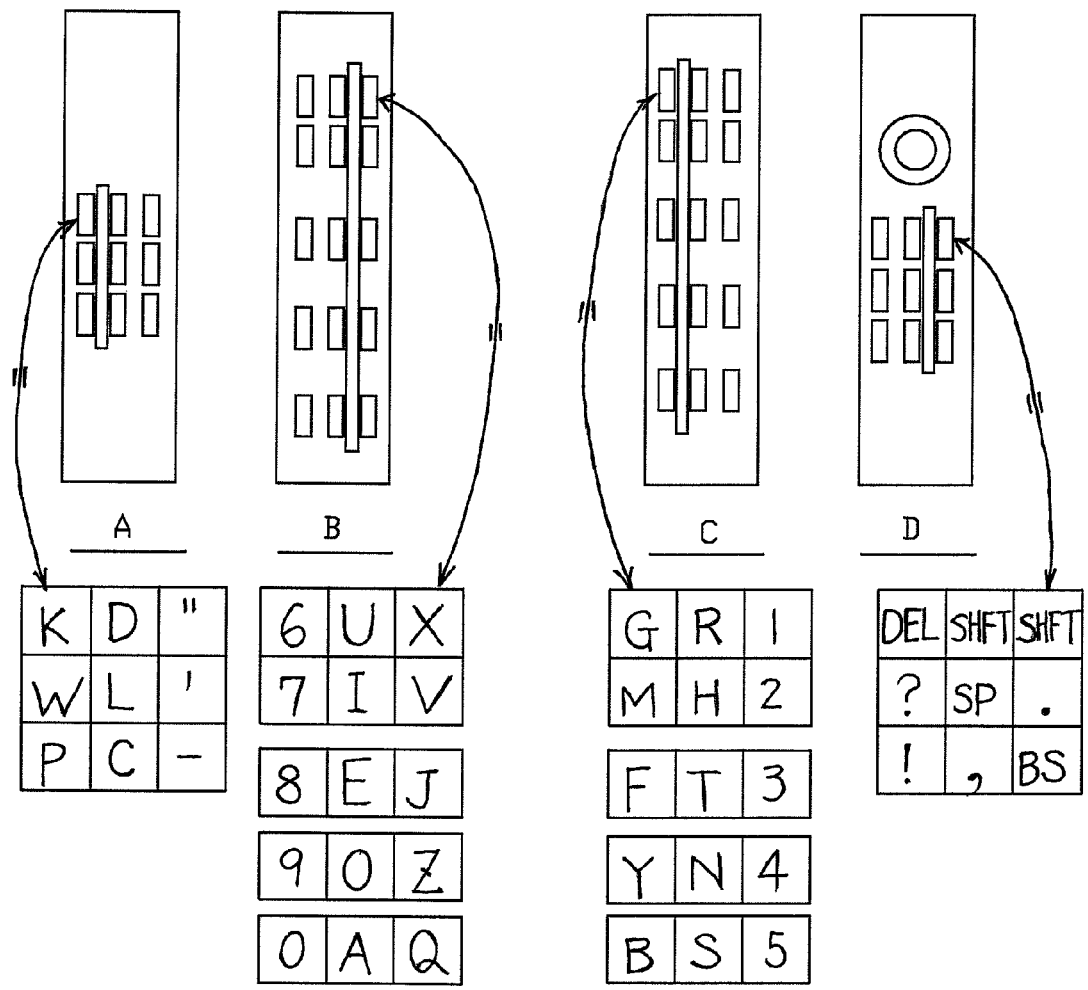

SUPER-HIGH RATE LETTER INPUT DEVICE FOR A CELL PHONE

TECHNICAL FIELD

The present invention relates to a letter input device for a cell phone and a letter input device for a portable device having a communication function used as a data communication terminal.

BACKGROUND ART

In accordance with the recent development of data communication techniques, there are cell phones provided with a function for transmitting and receiving e-mail or PDA (personal digital assistant) devices equipped with a letter input device with a data communication function.

FIG. 1 illustrates a front view of a conventional general purpose cell phone. This cell phone is comprised of a display 02, an antenna 03, a loudspeaker 04, a microphone 05, a power switch 10, various mode switch keys 11, a joy key 12, letter keys 17, and a main body 16.

As shown in FIG. 1, the cell phone is generally equipped with about twelve letter keys, about four various mode conversion keys, and one joy key so that letters can be inputted through a same flat surface as a display (information display section).

A PDA device also has a similar number of keys on the same flat surface as a display. Some PDA devices have fewer keys than those of cell phones while other PDA devices have fifty keys or more as the key board of a personal computer does.

FIG. 2 illustrates a front view of a letter input device for a conventional folding type cell phone. This letter input device has at the center section thereof a hinge mechanism 14 by which the device is configured to be folded so that a display and a key board section oppose to each other when the device is not used. Such a mechanism allows the device to be smaller and thus to be conveniently carried.

A cell phone and a PDA device both have letter keys on a same flat surface as a display. Alternatively, the foldable type device, as shown in FIG. 2, in which one flat surface having the letter keys and another flat surface having the display can be folded when the device is not used has an angle of gradient between the display and the key board section as in a notebook computer. Both the devices shown in FIGS. 1 and 2, however, have the key board section on the flat surface only which can be seen in front of a user.

When letters are inputted using a cell phone, a right-handed user holds the cell phone with the right hand to move the display to the front of the user's eyes, thereby moving the right hand thumb to push one key at a time, as shown in FIG. 3.

When the user holds the cell phone by the right hand to operate the right hand thumb to push the keys for letter input, the user's left hand is free and thus can be arbitrarily used for other tasks (e.g., hanging on a strap in a train or railcar or holding a bag).

Of the PDA devices, small types thereof which can be operated with one hand are used in a similar way as for a cell phone. When a left-handed user uses such a device, then the user uses the hand fingers opposite to those used by the right-handed user to push the keys.

A large PDA device is placed on a desk so that the fingers of both hands are used to input letters, as in the case of the key board of a personal computer. This prevents one hand from arbitrarily being used for other tasks and also requires the use of the desk or knees. For a cell phone or a small PDA device which is held by one hand to be operated with the fingers of the same hand, such a device requires the one hand holding the device to use the thumb to sequentially operate about twelve keys on the key board section in front of the user for the letter input. Thus, the rate at which text is prepared is determined by the rate at which the thumb pushes each of the keys for the letter input.

The key board section provided on the front surface of the cell phone has about twelve keys to which twenty-six alphabet letters A to Z and ten numeric characters are assigned. On average, one key is assigned with three alphabetical letters and one numeric character.

A letter input rate when only the thumb is used to input letters is about one-twentieth slower than that obtained when ten fingers of both hands are used for inputting letters as in a personal computer. Such a slow speed prevents even a technique enabling a faster data communication rate from being sufficiently utilized because the letter input rate is not improved. This is due to the fact that only one thumb of one hand is used, which requires the thumb to manage too many keys and thus requires the thumb to move in an excessively broad range. This is also due to the fact that the excessively broad range in which the thumb must move leads to an extreme difficulty of touch typing (i.e., an operation in which a user presses keys without looking at the keys the user pushes while looking at a display on which the letters corresponding to the pushed keys are displayed). The use of only the thumb for letter input also requires the user to alternately switch the user's field of view to the display and the key board on the front surface having twelve keys, which causes not only a slower input rate but also an increased amount of input errors.

Thus, it is desired to allow cell phones and small PDA devices to have a faster letter input rate. It is also desired to provide such a device that does not always require only one hand to input letters when using a cell phone in the case where both hands are free so that both hands are allowed to be used for the letter input, thereby providing a faster letter input rate. Such a device is desired by all users.

If the letter input rate of a cell phone can be as fast as that of a personal computer on a desk, then a demand for business communication through the cell phone can be drastically expanded.

At present, a cell phone or a PDA device having such letter keys is not marketed. Under the present situation, the following patents are published as the general technical level of this field:

JP2001-022501;
JP09-083402;
JP2000-59483;
JP2000-151774;
JP2001-060999;
EP 104709;
JP2001-117709;
JP10-224288;
JP06-274257;
U.S. Pat. No. 4,791,408;
U.S. Pat. No. 4,360,892;
U.S. Pat. No. 5,281,966;
JP2000-244623; and
JP2000-27653.

All of these patents only attempt to provide a faster letter input rate by providing five keys on a side face so that up to five fingers of one hand can be used for the letter input or only try to eliminate the limitation of the number of keys due to the small space of the front surface of a cell phone when information is accessed using the cell phone by providing about four auxiliary keys on the side face so that about twelve keys on the front surface can play an increased number of roles.

There are a number of other publications of patent applications which try to provide a faster letter input rate of a cell phone by using only about twelve keys on a front surface by the contrivance of software. None of the patent applications, however, are effective.

At present, such techniques as suggested in the above publications are not practically marketed. The reason is that the letter input rate of a cell phone having the above-described side face keys and/or side face auxiliary keys is not remarkably faster than that of a currently-marketed product having a keyboard on the front surface thereof.

It should be noted that an external key board is a hot-selling product by which a cell phone and a JIS key board are connected through a cable as disclosed in JP2000-244623.

JP2000-27653 discloses a technique wherein the little fingers of both hands are fixed to a PDA device to hold it. The published patent applications described above indicate the difficulty to input letters with the current cell phones.

DISCLOSURE OF THE INVENTION

Hereinafter, a cell phone or a PDA device will be generally referred to as a "cell phone." Additionally, a joy key, joy stick, arrow direction key, cogwheel-type or ball rotation-type input means will be generally referred to as a "joy stick" or "joy key". The current techniques as described above do not allow a main body of a cell phone to be held by both hands so that ten fingers of both hands are used to input letters. They merely describe operation with only one hand. In other words, in these conventional techniques, it has not been noticed that the use of ten fingers of both hands provides a remarkably faster letter input rate. When ten fingers of both hands are used to input letters into current small cell phones which can be held with one hand, contrivance is required as to where and in what manner the hands should be positioned.

An idea of simultaneously using ten fingers for a cell phone is required before trying to dispose ten fingers on the cell phone.

In the above conventional techniques, it has not been noticed that the use of both hands for holding a cell phone can provide the function of fingers in which each finger of the ten fingers differentiates a plurality of (i.e., two or more) keys (six or more keys in the case of a thumb) to press the key. In other words, an idea according to the above conventional techniques in which a cell phone is held with one hand to allow the fingers of the hand holding the cell phone to press a key substantially prevents a forefinger, a middle finger, a fourth finger, and a little finger of the hand from differentiating the neighboring two or more keys arranged in the direction of the order of the fingers. In contrast, the present inventors further developed their idea and found that a frame is provided between the keys. According to the present invention, this frame is higher than the keys so that the one hand holding a cell phone allows the forefinger, the middle finger, the fourth finger, and the little finger to differentiate the neighboring two or more keys arranged in the direction of the order of the fingers to push a key.

In addition, if both hands are used to hold a cell phone to use the ten fingers of both hands, one may find another problem in that when allowing a dominant hand (i.e., one hand whose fingers can move faster than those of the other hand) to provide a number of delicate operations, letter input means of a cell phone used by a right-handed user is provided at a position different from that at which the letter input means of a cell phone used by a left-handed user is provided, and that thus, it is difficult to use a single type of cell phone for both of a right-handed user and a left-handed user. Alternatively, a left-handed user will come to find that he or she uses a cell phone used by right-handed users without modification to train his or her right hand fast enough to use the cell phone.

The cell phones, which were conventionally started with a function of telephone, have been generally bound by a mere idea of the operation with one hand in spite of the current addition of an e-mail function. The reason is that they did not discover the fact that a user inputting text for an e-mail to a cell phone very frequently has both hands available which can be freely used. Alternatively, the reason may be that they considered that a cell phone held by both hands causes the right hand fingers and the left hand fingers to be superposed on the same position on the cell phone surface, thereby preventing the user from pushing ten keys.

In other words, the present inventors solved the above problems involved in the conventional techniques by noting the fact that when a user inputs a text for an e-mail to a cell phone, it is very often that the user is in a waiting room, in a vehicle, sitting on a bench, or standing at one point while both hands can be freely used.

FIG. 17 illustrates a cell phone according to the present invention which is held by both hands so that ten fingers of both hands can be used to input letters to the cell phone. FIG. 17 illustrates a super-high rate letter input device for a cell phone which uses the function of fingers in which both hands allow each finger of the ten fingers to differentiate a plurality of (i.e., two or more) keys (six or more keys in the case of a thumb) to press a key.

According to the present invention, a main body of a cell phone has a substantially rectangular parallelepiped shape in which faces having narrower widths including the longest edge line both have thereon keys so that the thumbs and the respective remaining four fingers of both hands hold the cell phone. This allows a rotatory force by the pressing force and a reaction force by the keys on both faces to be minimized, thereby providing the cell phone with a structure by which the cell phone is easily held and the keys thereon are pushed with an extreme ease.

Also according to the present invention, the cell phone is held by a right hand and a left hand such that the right hand and the left hand are shifted in the front-to-rear direction of the cell phone. This allows the ten fingers to be efficiently positioned over the entirety of the cell phone's side faces, thereby to enable pressing a number of keys.

Also according to the present invention, the main body of the cell phone has the substantially rectangular parallelepiped shape in which both faces having narrower widths including the longest edge line both have thereon keys. This allows a conventional key board on the front surface to be omitted. This provides an important advantage in that a display area of the front surface can be increased and thus the amount of information which can be checked at one glance also can be increased. When the cell phone is of a folding type, the conventional key board section area of the lower main body can be used as a display area.

FIG. 21 illustrates one type of cell phone according to the present invention which can be used by both right-handed users and left-handed users.

The cell phone shown in FIG. 17 has, on the left side face thereof, a total of eighteen neighboring keys starting from 83-1 and 83-2, arranged in a matrix of nine rows and two columns. The cell phone shown in FIG. 17 also has, on the right side face thereof, a joy key 82 and a total of sixteen neighboring keys starting from 91-1 and 91-2, arranged in a matrix of eight rows and two columns. The cell phone front face has thereon a right to control letter input-key 37 and conventional cell phone components such as a power switch 10, mode selectors 11, and a joy key 12.

FIG. 18 illustrates a schematic view of the cell phone of FIG. 17 which is being inputted with letters using ten fingers of both hands.

FIG. 18 shows the cell phone held by a right-handed user. As can be seen from FIG. 18, the cell phone includes the joy key 82 and shift keys 91-1 and 91-2 or other components by which the fast-moving right hand can perform a number of delicate tasks.

As shown in FIG. 18, on the right side face of the cell phone, the joy key 82 and six keys of 91-1, 91-2, 92-1, 91-2, 93-1, and 93-2 are used by the right hand thumb; on the left side face thereof, four keys of 83-1, 83-2, 84-1, and 84-2 are used by the right hand forefinger; keys of 85-1 and 85-2 are used by the right hand middle finger; keys of 86-1 and 86-2 are used by the right hand fourth finger; and keys of 87-1 and 87-2 are used by the right hand little finger.

On the left side face of the cell phone, six keys of 88-1, 88-2, 89-1, 89-2, 90-1, and 90-2 are used by the left hand thumb; on the right side face thereof, four keys of 94-1, 94-2, 95-1, and 95-2 are used by the left hand forefinger; 96-1 and 96-2 are used by the left hand middle finger; 97-1 and 97-2 are used by the left hand fourth finger; and 98-1 and 98-2 are used by the left hand little finger.

When a conventional cell phone is operated, as shown in FIG. 3, only one hand thumb is used to operate twelve keys on the flat surface provided in the same direction of the display. For example, when twenty-six English alphabet letters are to be inputted to the cell phone, three letters are inputted with one key. Specifically, when an alphabet capital letter of "C" is inputted as shown in FIG. 1, a key 17-1 for an alphabet letter of "A" must be continuously pushed three times. When an alphabet lower case of "c" is inputted to the cell phone on the other hand, the key 17-1 for "A" must be continuously pushed six times or a mode selector switch for inputting a lower case must be switched with a thumb before continuously pushing the key 17-1 for "A" three times. Thereafter, when another alphabet capital letter is desired to be inputted to the cell phone, the mode selector switch must be pushed again to return to the previous mode.

In contrast, in the present invention, a capital letter "C" is inputted, as shown in FIG. 18, the key 84-1 on the left side may be pushed one time while the key 91-2 on the right side face is being pushed by the right hand thumb as shown in FIG. 17. And when an alphabet lower case "c" is inputted, the key 84-1 on the left side face may be pushed one time while no keys are pushed with the right hand thumb.

The present invention has a particularly superior characteristic in that it is not required to switch the keys on the right side face to be operated by the right hand thumb when the remaining nine fingers are used to push twenty-six keys, thereby allowing any one letter of twenty-six alphabet letters to be inputted.

The keys on the right side face to be operated with the right hand thumb are switched for three types of input: a capital letter, a lower case letter, and a numeric character/sign/function. In this embodiment, numeric character/sign/function is inputted while the key 91-1 is being pushed with the right hand thumb.

When a user desires to input an English text including numeric characters to the cell phone, the user has only to pay attention to differentiate an operation in which no keys are pressed with the right hand thumb; and an operation in which two keys (e.g., keys 91-1 and 92-2) are pressed.

The three kinds of alphabet lower cases, capital letters, and numeric character/sign/function may be allocated by software to any of an operation in which no keys are pressed by a right hand thumb; an operation in which the key 91-1 is pressed; and an operation in which the key 91-2 is pressed.

The frequency at which lower cases, capital letters, and numeric character/sign/function are used is different depending on the details of a task done by a user. Thus, the software for key allocation may be designed so that the keys on the cell phone can be set by a user with the various mode keys 11.

The above setting with the mode keys 11 is not frequently changed once the user has finished the setting.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining seven letters can be allocated to such keys that are frequently used for Japanese language (e.g., keys responsible for """, "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In addition, various mode keys 11 are used for a mode switching and the keys 92-1 and 92-2 are used as a shift key. This provides a direct input of the fifty-one Japanese Hiragana characters without using the Roman character input method. In this way, the present invention can be applied to any language including English and Japanese so long as the language allows the conversion with other twenty-six alphabet letters or other twenty-six characters.

When alphabet is used for input, a single key can be used for a pair of a capital letter and a lower case. This allows the fingers to learn the input system with an extreme ease, thus requiring the minimum period of time for performing a touch typing with the cell phone.

Specifically, the use of the present invention provides about twenty times faster letter input rate as compared to that obtained by a key layout using only one hand thumb for the letter input.

Naturally, in the case where a cell phone is used for a simple task of inputting a telephone number in which numeric characters of 1, 2, . . . 9, and 0, can be inputted by pushing the key 91-1 with the right hand thumb simultaneously with other side face keys with other fingers, as shown in FIG. 17.

While the key 91-1 is being pushed with the right hand thumb, the remaining sixteen keys can be allocated to signs or functions required for the input of English text (e.g., "BackSpace", "DEL", "ENT", ".", and ",").

The keys 92-1, 92-2, 93-1, and 93-2 on the right side face key are not required when both hands are used for the input of an English text. Thus, these keys may be omitted or may be allocated to "BackSpace", "DEL", "ENT", ".", "," or the like to increase the rate at which an English text is inputted.

It is noted, however, that the use of the keys 92-1, 92-2, 93-1, and 93-2 as a mode switch key provides a faster Japanese input rate because of the fact that the input of Japanese language requires a total of seven types of characters (i.e., "Hiragana", "Katakana" of full size and half size, numeric characters of full size and half size, and sign of full size and half size).

When the cell phone according to the present invention is used by a left-handed user, the left-handed user only has to replace the right hand with the left hand shown in FIG. 18 for using a cell phone provided with letter input means all in the symmetrical form in which the letter input means on the left side face of FIG. 17 is totally replaced with that on the right face of FIG. 17. In this case, the left-handed user operates the joy key 82 with the left hand thumb. Alternatively, it is also possible to train the left-handed user so that the user can use the right hand fingers as with right-handed users to use the cell phone shown in FIG. 17.

Under a condition where both hands can be used, the cell phone is used as shown in FIG. 18. When a user must use only one hand (e.g., when a user hangs by the strap of a train), then the user can push the key of letter input control 37 to switch to the one hand mode. This use method is a mere auxiliary one for an emergency.

If the manner of inputting e-mail text to every cell phone with both hands can be considered to become common sense in the future, the one hand mode may be eliminated.

When a cell phone is used as a mere telephone, then it is designed to provide a mode setting with the mode keys 11 so that ten numeric characters are allocated to ten keys of the combination of a matrix of nine rows and one column on the left side face (i.e., keys 83-2, 84-2, 85-2, 86-2, 87-2, 88-2, 89-2, 90-2, and 99-2) and the key 91-1 on the right side face or ten numeric characters are allocated to ten keys of the combination of a matrix of eight rows and one column on the left side face (i.e., 83-2, 84-2, 85-2, 86-2, 87-2, 88-2, 89-2, and 90-2) and the keys 91-1 and 91-2 on the right side face. This allows a phone call to be made with only one hand.

It is noted, however, that most of the recent cell phones have memories for storing telephone numbers to be called so that the stored telephone numbers can be selected by the joy key 12, requiring very few tasks in which the cell phone is used as a mere telephone by which a telephone number is manually inputted. Thus, it is considered that the manual input to the cell phone requiring more than two or three seconds does not cause any inconvenience to the users.

FIG. 19 illustrates the cell phone according to the present invention of FIG. 17 being used with the one hand mode.

The one hand mode herein means a mode where the eight keys on the left side face of 87-1, 87-2, 88-1, 88-2, 2, 90-1, 90-2, 99-1, and 99-2, the joy keys 82, and the eight keys on the right side face of the keys 91-1, 91-2, 92-1, 92-2, 93-1, 93-2, 94-1, and 94-2 are provided with the right of controlling the input of letters; and the remaining ten keys on the left side face of the keys 83-1, 83-2, 84-1, 84-2, 85-1, 85-2, 86-1, 86-2, 89-1, and 89-2 and the eight keys on the right side face of 95-1, 95-2, 96-1, 96-2, 97-1, 97-2, 98-1, and 98-2 are disabled. In FIG. 19, every two keys on the left side face are allocated to a forefinger, a middle finger, a fourth finger, and a little finger. The reason is that the mechanism shown in FIG. 30 in which a frame provided between keys is higher than the keys allows the user holding the cell phone with the right hand to input letters to the cell phone so that these four fingers can differentiate the allocated two keys to press an appropriate key. The right hand thumb provides a delicate differentiation and thus is allocated with a number of keys. Even in the one hand mode, at least about four times faster letter input rate than that obtained by a key layout using only a one hand thumb can be afforded.

The function of the right to control letter input-key 37 may be enough and the key may be replaced by other mode switch keys 11. Alternatively, the function of the right to control letter input-key 37 also may be played by the simultaneous push of a plurality of keys or a push of a predetermined key for a fixed period of time.

Cross-sections X-X shown in FIG. 30 illustrates the letter input means designed to provide an accurate letter input by neighboring keys without input errors.

The cross-section X-X includes a frame which is provided between the neighboring keys, and which is higher than these keys. The frame is a frame which accepts a reaction force caused by the pushing force to a key on the opposite side face by a finger. The reason why the frame is higher than the keys is that, allowing the finger to be provided on the frame prevents the keys from being erroneously pushed even when the reaction force to the key on the opposite side face is accepted by the finger on the frame. While being positioned on the frame, the finger can push any of the neighboring keys without departing from the frame.

The frame shown in FIG. 30, also has, on a specific position thereon, a projection shown by a solid circle 207 which can be tactilely felt by fingers so that a user can know where the home position is for the input by touch typing.

There are also concavities 206 as shown in the cross section Y of FIG. 30 by which a user can know the home position for the fingers for the input by touch typing.

The concavities 206 are provided at home positions for at least ten fingers on the surface of the frame 202 to accept the fingers. By the concavities 206, a user can tactilely feel the concavities by the ten fingers to guide the ten fingers to the home positions.

The invention shown in FIG. 30, allocates alphabet letters to the keys of the cell phone shown in FIG. 17. A conventional cell phone has about twelve keys allocated with twenty-six alphabet letters and thus provides a very slow letter input rate. A personal computer, on the other hand, uses a QWERTY key board having four of top, middle, and bottom rows.

Although the QWERTY key board is now being used world wide, the QWERTY key board is not the one made by deliberately considering the balance among various factors (e.g., a frequency at which each letter is used, hand fatigue caused by a distance along which the hand travels, a rhythm with which left and right hands are alternately used for typing a text, the difference of western letters and eastern characters in a frequency at which the former and the latter are used).

There is no conventional cell phone which has a key layout of two columns by which a user is allowed to input any of twenty-six alphabet letters by a single push of a key. Such a problem of conventional cell phones is solved by the present invention. In English, the order of the frequency at which each letter is used is ETAOINSRHLDCUMFPGWYBVKXJQZ from higher to lower. In English, the vowels of UIEOA basically tend to be interposed among the other consonants. In Japanese, on the other hand, the order of the frequency at which each character is used is IOAUNKTESRYH-MGDZWBP from higher to lower. It is clear that in eastern characters the vowels of UIEOA and consonants are alternately used. The letter input means shown in FIG. 30, allows the letters UIEOA and RHTNS which have a high frequency at which the letters are used both in western and eastern languages to be inputted by the minimum movement of both hand's forefingers, middle fingers, fourth fingers, and little fingers by allowing the keys to be provided in one column so that the fingers can move a shorter distance.

The letter input means shown in FIG. 30, also allow the keys to be configured so that the order of the frequency at which each finger is used can be the one of forefingers, middle fingers, fourth fingers, and little fingers from higher to lower.

The letter input means also takes into consideration a comfortable rhythm of the alternate keying by fingers of left and right hands, a frequency at which each letter is used in western languages and the structure, and a frequency at which each character is used in eastern languages and the structure, thus allowing the present letter input means to be used for many languages in the world.

In FIG. 44, the letter input means also has a key layout of numeric character keys 1, 2, 3, 4, 5, 6, 7, 8, 9, and 0, which can be visually recognized with an ease.

The cell phone shown in FIG. 30, has keys allocated with alphabet letters. The cell phone is also designed such that, while the shift key is being pushed, an alphabet letter key for inputting "R" is allocated with a numeric character "1", "G" with "2", "H" with "3", "M" with "4", "T" with "5", "F" with "6", "N" with "7", "Y" with "8", "S" with "9", and "B" with "0". Such allocation allows numeric characters of 1, 2, 3, 4, 5, 6, 7, 8, 9 and 0, e.g., telephone number to be inputted only by those fingers for operating the shift key, which is very convenient and efficient.

In FIG. 17, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention. Those letters to be inputted during the one hand mode are printed with a different color since the letters are different from those at the normal input, i.e., input by both hands.

FIGS. 18 and 19 show the cell phone of FIG. 17 having on the display thereof letters inputted corresponding to the keys selected by the thumbs in order to show the letters corresponding to the keys selected by the thumbs. When a user pushes the key 83-1 on the top of the left side face while the display is as shown in FIG. 18, for example, then an alphabet letter of "A" on the left top of the display can be inputted. When the thumb selects another key, then the details of a letter indicated on the display are changed accordingly. The exemplary cell phone shown in FIG. 19 is in the one hand mode and thus has four keys on the left side face, thereby allowing the display to indicate four letters. Any of the above key layouts allows a user to utilize efficiently the guidance of input of keys in a small display of the cell phone.

BRIEF DESCRIPTION OF THE DRAWINGS

FIG. 6 illustrates one example of the combinations of input keys and the number of outputs corresponding to the number of keys shown in FIG. 4 according to the present invention.

FIG. 9 illustrates a view of one example of the combinations of input keys and the number of outputs corresponding to the number of keys when the cell phone of FIG. 4 is used with the one hand mode.

FIG. 24 illustrates one example of a super-high rate letter input device for a cell phone according to the present invention which can be held by both hands so that the ten fingers of both hands can be used for letter input.

FIG. 30 illustrates the allocation according to the concept of the present invention of the letters to the keys of the cell phone of FIG. 17, and the cell phone has frames being provided between the neighboring keys and having a higher height than that of the keys.

FIG. 33 illustrates the allocation according to the concept of the present invention of the letters to the keys of the cell phone of FIG. 17, and the cell phone has frames being provided at one side of the neighboring keys and having a higher height than those of the keys.

FIG. 42 illustrates another example of a super-high rate letter input device for a notebook-type cell phone according to the present invention which can be held by both hands so that ten fingers of both hands can be used for letter input.

FIG. 46 illustrates the allocation according to the concept of the present invention of the letters to the keys of the cell phone of FIG. 42.

BEST MODE FOR CARRYING OUT THE INVENTION

Embodiment 1

Figure 1:
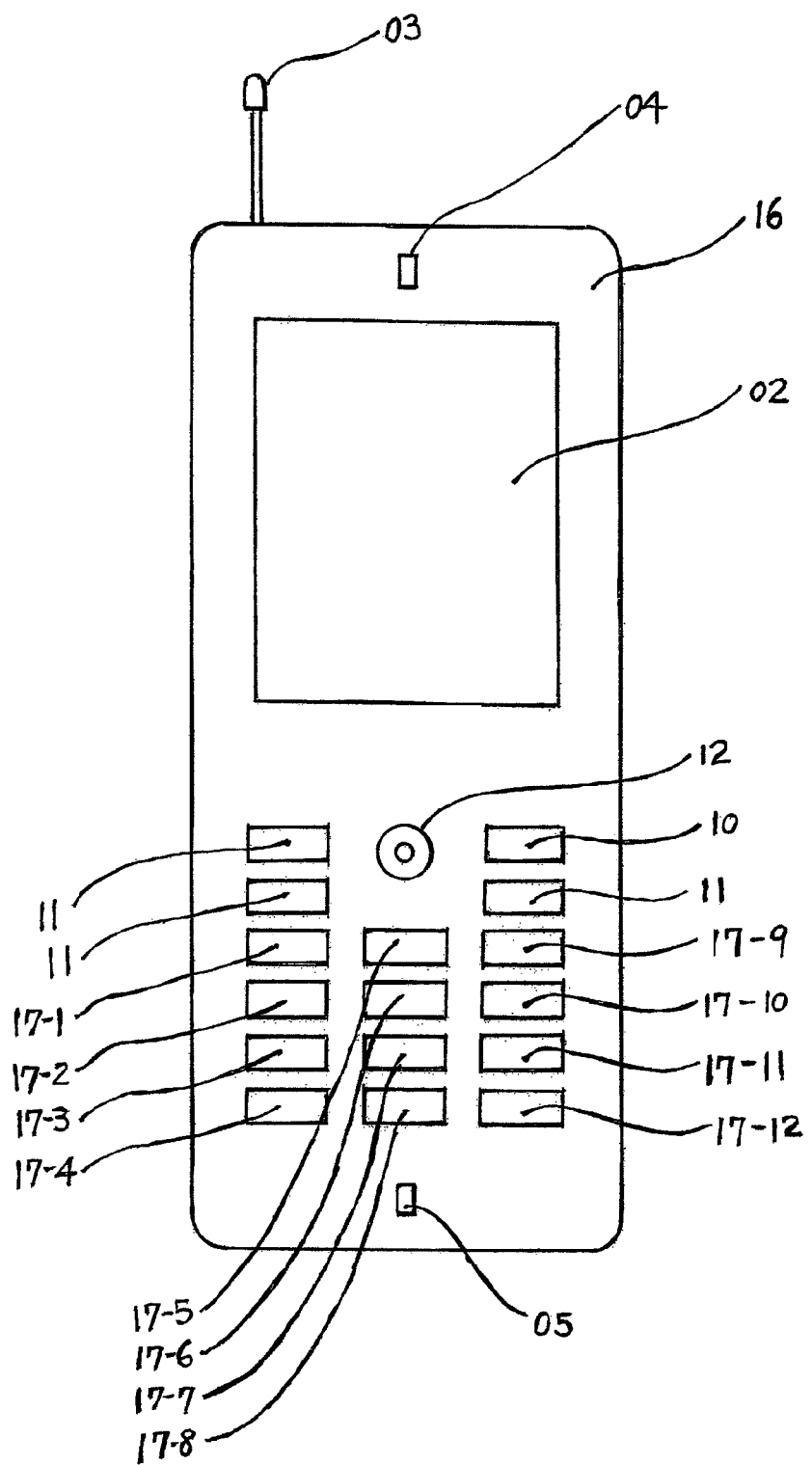
FIG. 1 illustrates a front view of a conventional letter input device for a cell phone.
Figure 2:
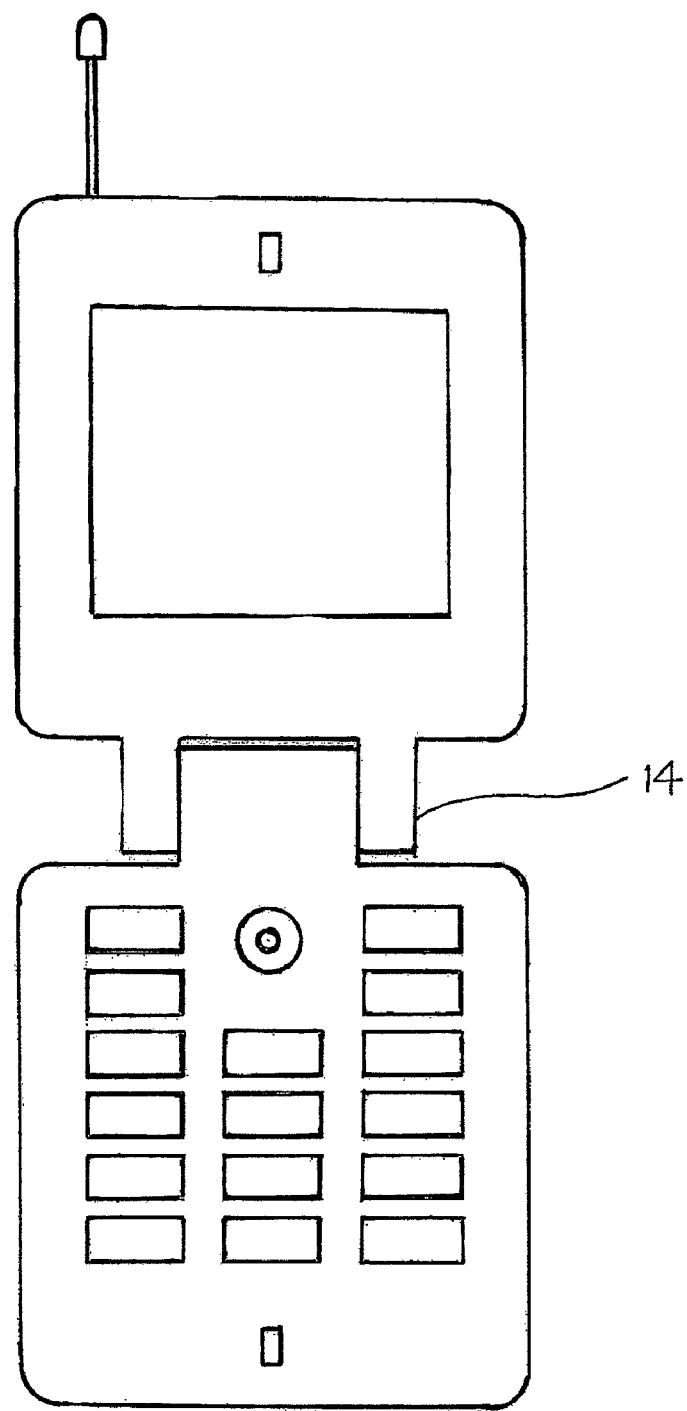
FIG. 2 illustrates the front view of a letter input device for a conventional folding type cell phone.
Figure 3:
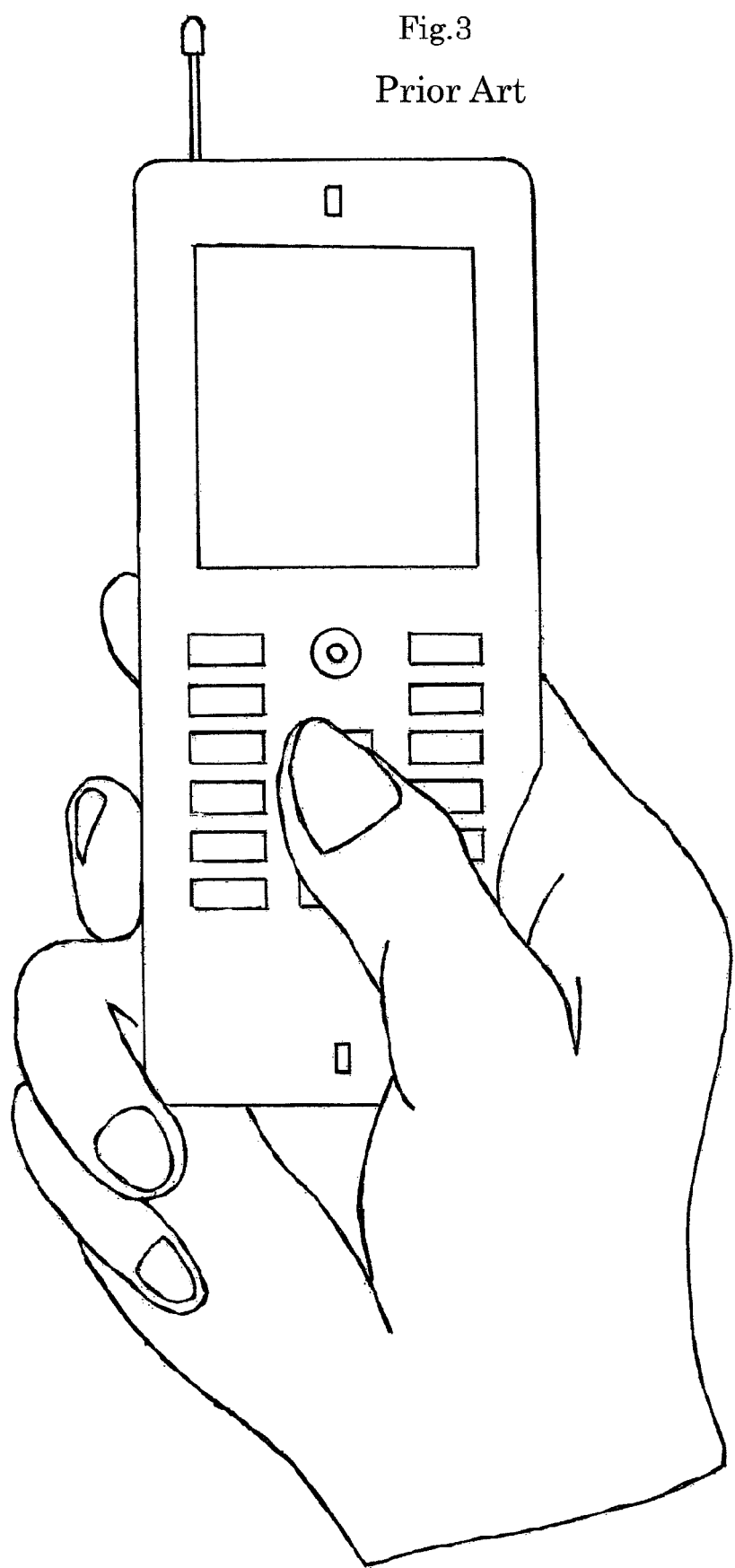
FIG. 3 illustrates a view of appearance of the conventional cell phone of FIG. 1 being inputted with letters.
Figure 4:
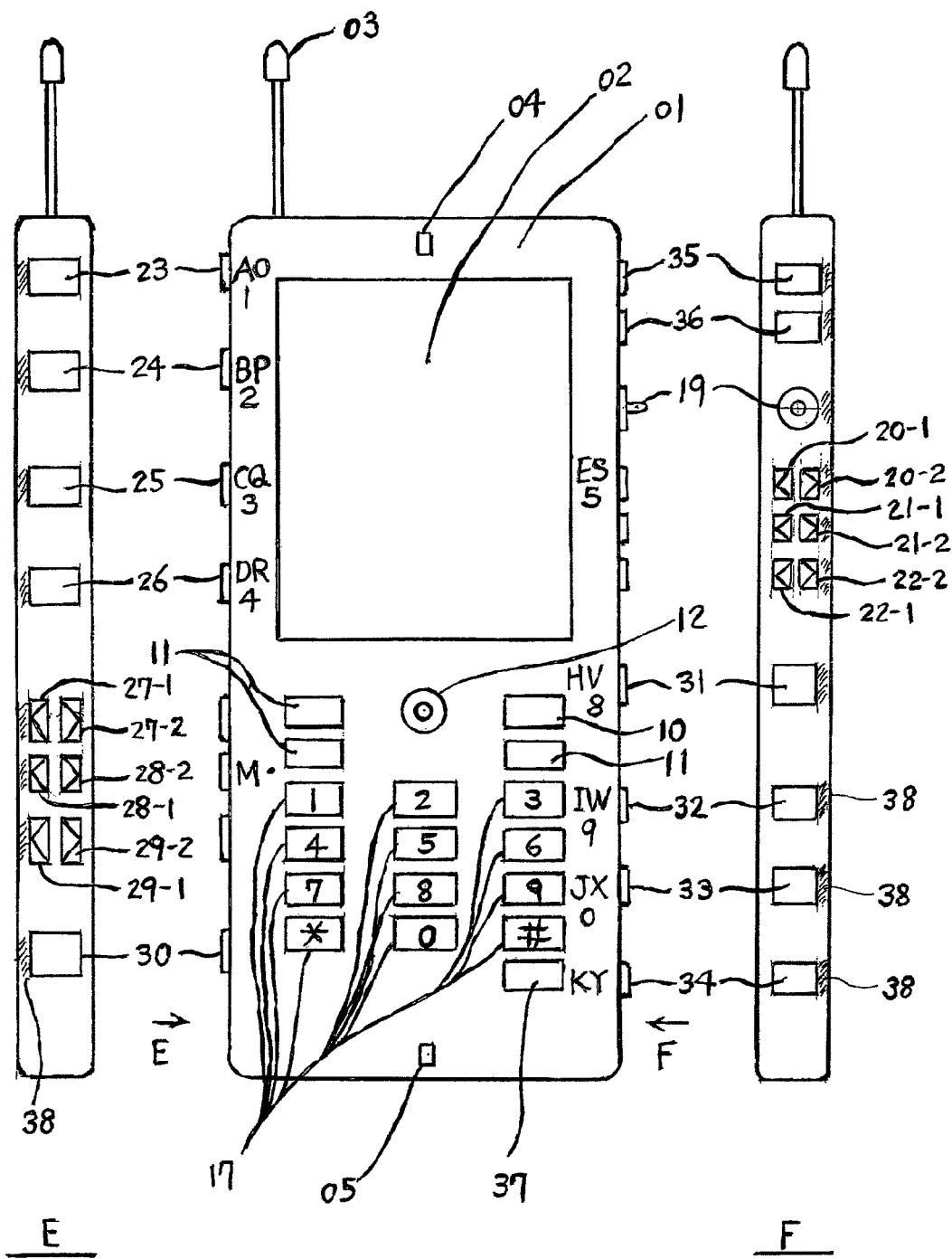
FIG. 4 illustrates an exemplary cell phone according to the present invention which is held by both hands so that the fingers of both hands can be used for letter input.

FIG. 4 illustrates an exemplary cell phone according to the present invention which is held by both hands so that the ten fingers of both hands can be used for letter input.

The cell phone according to the present invention includes: a main body 01; a display 02; an antenna 03; a loudspeaker 04; a microphone 05; five left side face keys 23, 24, 25, 26, and 30; three sets of left side face small keys 27-1 and 27-2, 28-1 and 28-2, and 29-1 and 29-2; four right side face keys 31, 32, 33, and 34; three sets of right side face small keys 20-1 and 20-2, 21-1 and 21-2, and 22-1 and 22-2; a four-way joy stick 19; mode selector switches 35 and 36; a right to control letter input-switch 37 on the cell phone front surface; a fingers rest 38 shown by the shaded area; a power switch of a conventional cell phone; mode selector switches 11; a four-way joy stick 12; and twelve letter keys 17.

Figure 5:
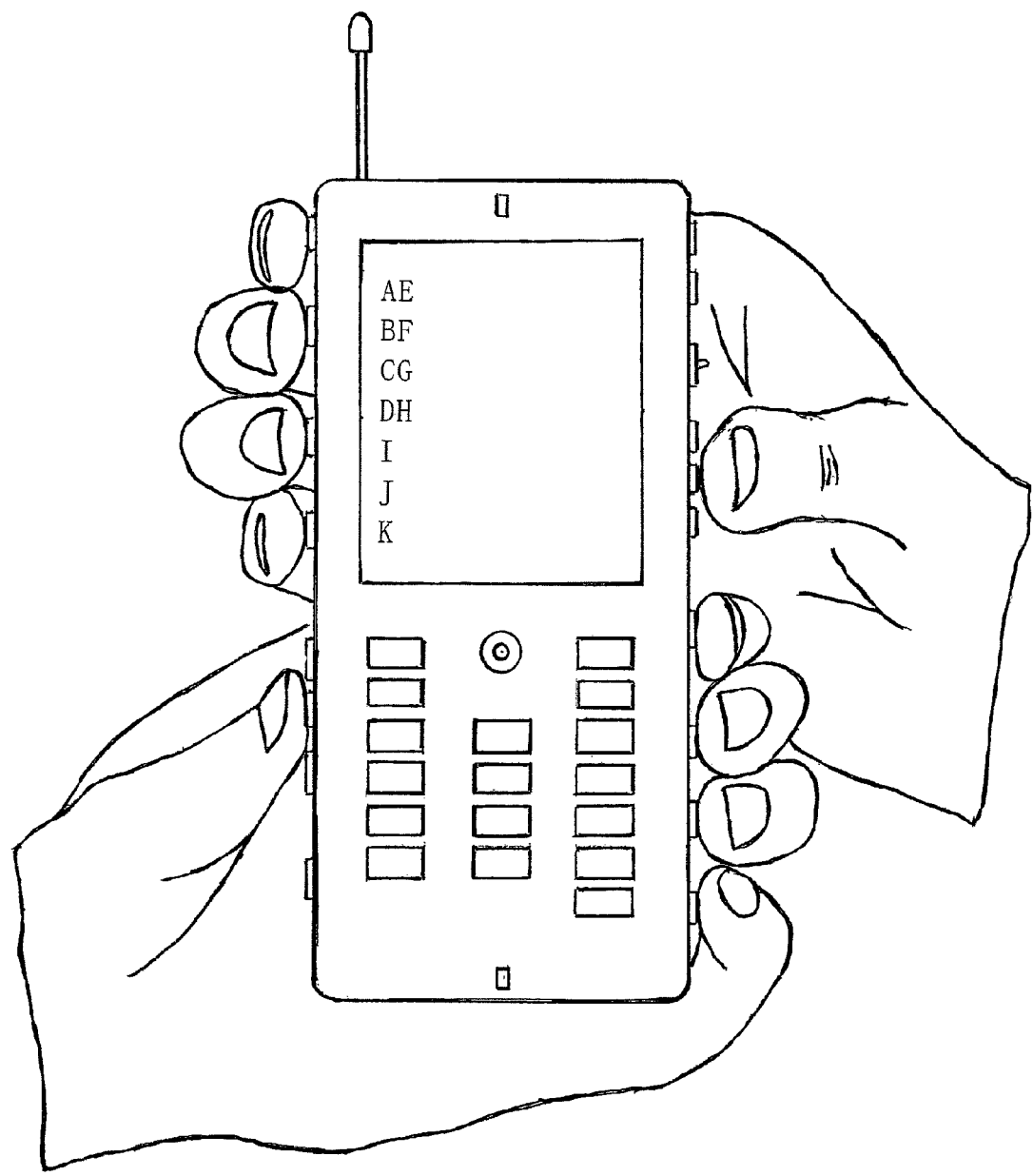
FIG. 5 illustrates a view of appearance of the cell phone of FIG. 4 being inputted with letters.

FIG. 5 is a schematic view illustrating the cell phone of FIG. 4 which is being inputted with letters by ten fingers of both hands.

FIG. 5 shows the cell phone held by a right-handed user.

When the left and right components of the cell phone of FIG. 4 (i.e., all of the keys on the left and right faces, the small keys, the four-way joy stick and the various mode selectors) are arranged symmetrically in the right and left directions, then a cell phone for a left-handed user is provided.

As shown in FIG. 5, the right hand thumb operates the four-way joy stick 19, the three sets of small keys 20-1 and 20-2, 21-1 and 21-2, and 22-1 and 22-2, and mode selector switches 35 and 36 on the right side face. A forefinger, a middle finger, a fourth finger, and a little finger of the right hand operate the four keys of 23, 24, 25, and 26 on the left side face.

Similarly, the left hand thumb operates the three sets of small keys 27-1 and 27-2, 28-1 and 28-2, and 29-1 and 29-2. A forefinger, a middle finger, a fourth finger, and a little finger of the left hand operate the four keys 31, 32, 33, and 34 on the right side face.

The keys 20-1 and 20-2 are provided closely. This provides three ways of pushing the button(s) (i.e., one of the two keys is pushed, the other of the two keys is pushed, and both of the two keys are pushed). These three ways apply to the combination of 21-1 and 21-2, the combination of 22-1 and 22-2, the combination of 27-1 and 27-2, the combination of 28-1 and 28-2, and the combination of 29-1 and 29-2. As a result, 18 ways of pushing the button(s) are obtained when multiplying the three ways of each combination with the six sets of small keys. Since all of the remaining nine fingers are ready to push other keys, the thumb is allowed to operate the three keys (because the thumb can move faster than other fingers), thereby allowing 198 characters to be inputted when multiplying the above 18 ways of pushing the button(s) with 11. Furthermore, when any of the six sets of small keys is not pushed, eight keys can be pushed and thus a total of 206 characters (types) can be inputted. (In this calculation, when the key 20-1 on the right side face is being pushed, pushing any of the keys 27-1 and 27-2 on the left side face is recognized as an input of one letter. The same applies to the keys 28 and 29. The reason is that since the neighboring arrow keys on the right side face provide a delicate task when being pushed, the keys on the left side face provide only the input of one letter so that the user does not have to pay attention to the keys on the left side face).

The finger rest 38 shown by the shaded area is slightly higher than the housing. The finger rest 38 is provided for the purpose of receiving a reaction force caused by a force applied to the opposite side face when a user pushes a key on the opposite side face. The finger rest 38 has on the surface thereof a coating for preventing a finger thereon from slipping. The finger rest 38 also has an objective of preventing a key from being erroneously pushed. The finger rest 38 also has a concavity by which a finger thereon can be fixedly positioned.

The four-way joy stick 19 on the right side face has a main task of moving a cursor on the display 02 in the lateral and vertical directions. It also may be allocated with the conversion for inputting Kanji of Japanese language (e.g., conversion of "Hiragana" to "Kanji", "Katakana" or the like). The mode selector switch 35 may be used for the switching between alphabetic characters and a native language (e.g., "Hiragana" of Japanese language, "Kanji" of China, Hangul characters of South Korea). The mode selector switch 36 may be used for the switching between a full size and a half size and also may be used for the switching to "Katakana" for Japanese language. When the mode selector switch 35 is set to provide the switching between two modes and the mode selector switch 36 is set to provide the switching among three modes, then a total of six modes can be switched. As a result, 1,236 characters (types) can be inputted because 206 characters can be combined with six modes.

These key combinations for 1,236 characters are not necessarily allocated to only characters and also may be allocated to "Space" key or "DELETE" key. When one key combination for one character is specified as the one which is to be pushed as a representative key combination for the collection of special signs, then a specific one character is inputted by the key combination and then a number of special signs can be subsequently inputted by repeatedly moving the four-way joy stick 19. When the mode selector switches 35 and 36 provide one mode, respectively, then a total of 206 characters can be inputted, thus preventing the mode selectors 35 and 36 from being used frequently. Therefore, in this case, it is not inconvenient that the right hand thumb must move all the way to a position slightly far from the position at which the right hand thumb always stay.

FIG. 6 shows combinations of the input keys according to the present invention shown in FIG. 4 and the number of outputs. As can be seen from FIG. 6, the combinations of the input keys provide a sufficient number of combinations when a general English text (including numeric characters) is inputted. Thus, a task for inputting English text does not require the mode selectors.

On the other hand, a task for inputting a general Japanese text requires the switching between two modes because this task requires full sizes of "Hiragana", "Kanji"; full sizes and half sizes of "Katakana" and numeric characters; and full sizes and half sizes of alphabetic characters. In this case, the introduction of the Roman character input method (i.e., a method by which "Hiragana" is inputted with alphabet characters) increases such characters that can be inputted with one mode, thus providing the letter input without requiring frequent mode switching. However, it is not an objective of the present invention to rationally allocate the keys to characters so that the mode selectors can be switched less frequently.

Thus, the above sections only described how many characters can be inputted by the switching in the key layout according to the present invention.

In this way, by providing such a key layout that allows all of the ten fingers of both hands to operate keys of the key layout, a single operation (i.e., an operation in which another key is pushed with another finger at one time while pushing a key with a thumb) provides the input of 206 characters. This means that providing an appropriate training to a user of the key layout will allow the user to input letters with this key layout at an input rate as fast as that provided by a notebook computer on a desk in an office.

In other words, the letter input rate is at least about eight times faster than that obtained by a key layout requiring the input by one hand thumb.

Figure 7:
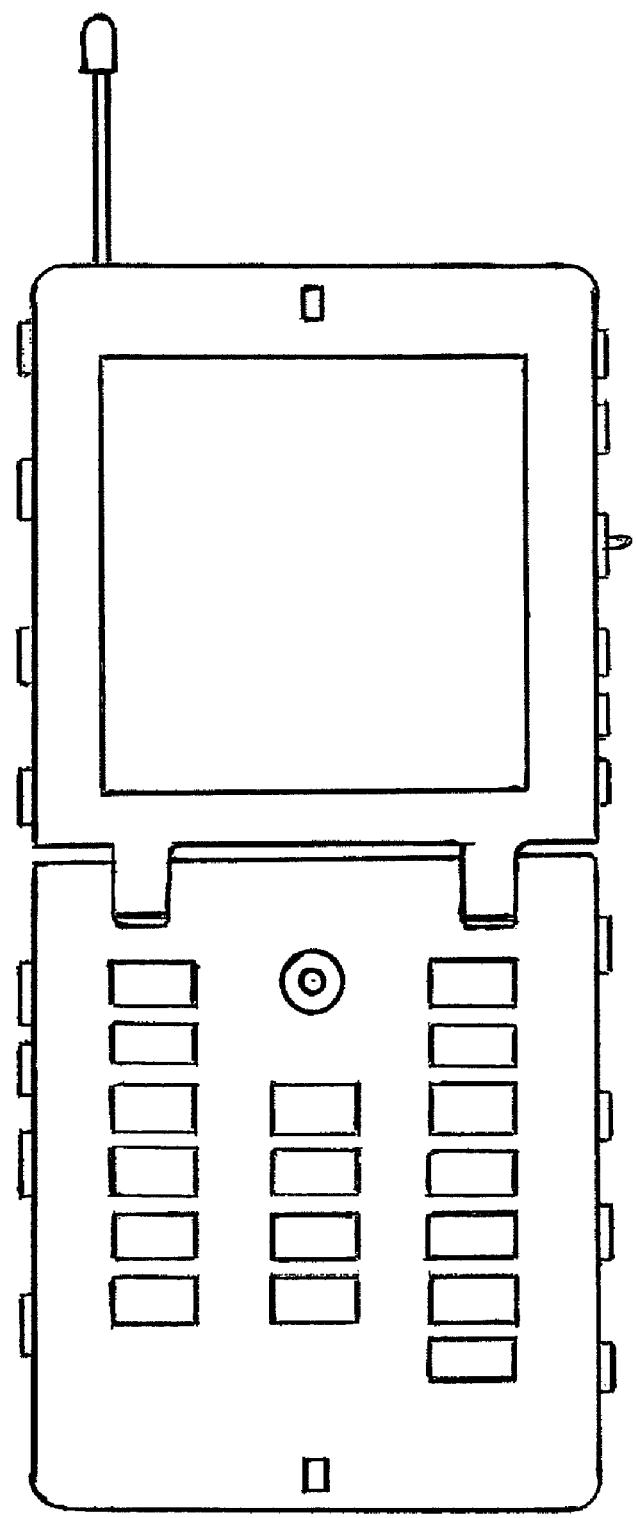
FIG. 7 illustrates a front view of the letter input device of the folding type cell phone according to the present invention which has the key layout shown in FIG. 4.

FIG. 7 is a front view of a letter input device for a folding type cell phone according to the present invention having the key layout shown in FIG. 4.

The right to control letter input-switch 37 shown in FIG. 4 is a switch which provides the switching among three modes when being pushed continuously. When a user can use both hands, then the key layout is used as shown in FIG. 5. When a user can use only one hand (e.g., when a user hangs on a strap in a train), then the user pushes the switch 37 one time to switch to the one hand mode. When the user pushes the switch 37 one more time, then the components as in a conventional cell phone, i.e., mode selector switch 11, the four-way joy stick 12, twelve letter keys 17 which are provided on the same face of the display 02 can be used during which the keys on both side faces are disabled even when being pushed.

In the above sections, the one hand mode refers to a mode in which the left side face components (i.e., the four keys 26, 27, 29, and 30) and the right side face components (i.e., the four-way joy stick 19, the three sets of small keys 20-1 and 20-2, 21-1 and 21-2, and 22-1 and 22-2; and mode selector switches 35 and 36) are provided with the right to control the input of letters. In the one hand mode, the remaining left side face components (i.e., the keys 23, 24, and 25; and the small keys 28-1 and 28-2) and the remaining right side face components (i.e., the keys 31, 32, 33, and 34) are all disabled. In the one hand mode, twelve letter keys 17 on the front surface are also disabled. In this case, pushing one of the keys 27-1 and 27-2 or pushing both of the keys 27-1 and 27-2 provide the input of one character. The same applies to the keys 29-1 and 29-2. The reason is that a middle finger and a fourth finger cannot differently push closely-arranged keys like the keys 27-1 and 27-2 for letter input.

Figure 8:
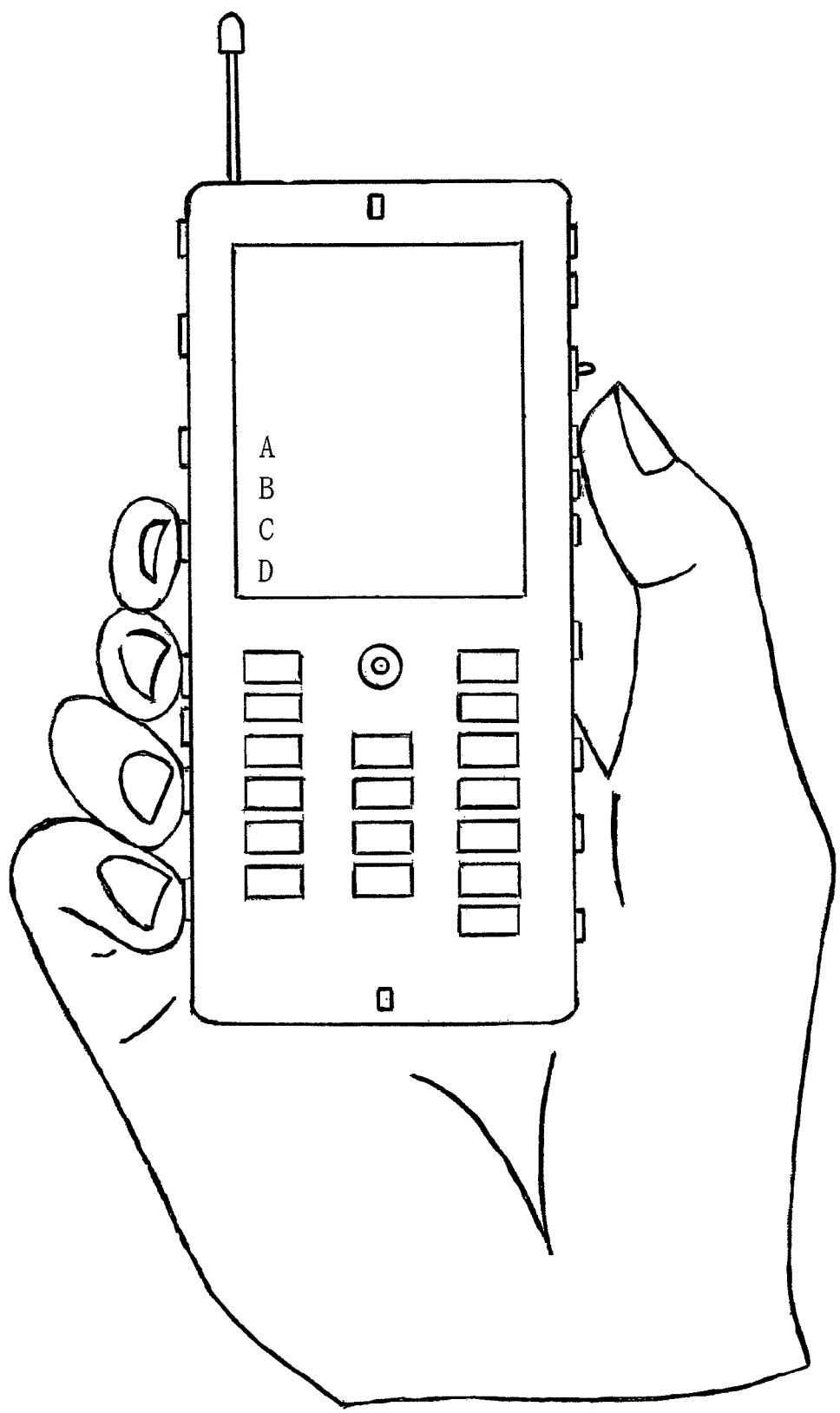
FIG. 8 illustrates a view of the cell phone of FIG. 4 being used with the one hand mode.

FIG. 8 illustrates the cell phone of FIG. 4 according to the present invention which is being used with the one hand mode.

As shown in FIG. 8, the use of the right to control letter input-switch 37 provides switching among three input modes depending on the status of the user's hands or preference. In other words, a user who is accustomed to input by a conventional type of key layout can use the twelve letter keys 17 provided on the same surface of the display 02 as in the conventional cell phone while training for being able to use all of the fingers of both hands or the one hand mode.

Naturally, the key layout also may be arranged to provide an economic cell phone in which the one hand mode is eliminated or the conventionally-used front surface keys are eliminated, thereby reducing the three input modes to only two input modes. The one hand mode provides nine key combinations by three sets of the small keys 20-1 and 20-2, 21-1 and 21-2, and 22-1 and 22-2; and one combination obtained when any small keys are not pressed, thereby providing a total of 10 combinations. These 10 combinations are multiplied with the four keys on the left side face, thereby allowing a total of 40 characters to be inputted.

The mode selector switches 35 and 36 provide the switching among six modes and thus provide an input of 240 characters (types).

FIG. 9 illustrates one example of the combinations of input keys and the number of outputs corresponding to the number of keys of the cell phone of FIG. 4 according to the present invention which is being used with the one hand mode.

In FIG. 4, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIGS. 5 and 8 show the cell phone of FIG. 4 having on the display thereof letters inputted corresponding to the keys selected by the thumbs in order to show the letters corresponding to the keys selected by the mode keys and the thumbs. When a user pushes the key 23 on the top of the left side face while the display is as shown in FIG. 5, for example, then an alphabet letter of "A" on the left top of the display can be inputted. When the thumb selects another key, then the details of a letter indicated on the display are changed accordingly. The exemplary cell phone shown in FIG. 8 is in the one hand mode and thus has four keys on the left side face, thereby allowing the display to indicate four letters. Any of the above key layouts allows a user to utilize efficiently the guidance of input of keys in a small display of the cell phone.

Embodiment 2

Figure 10:
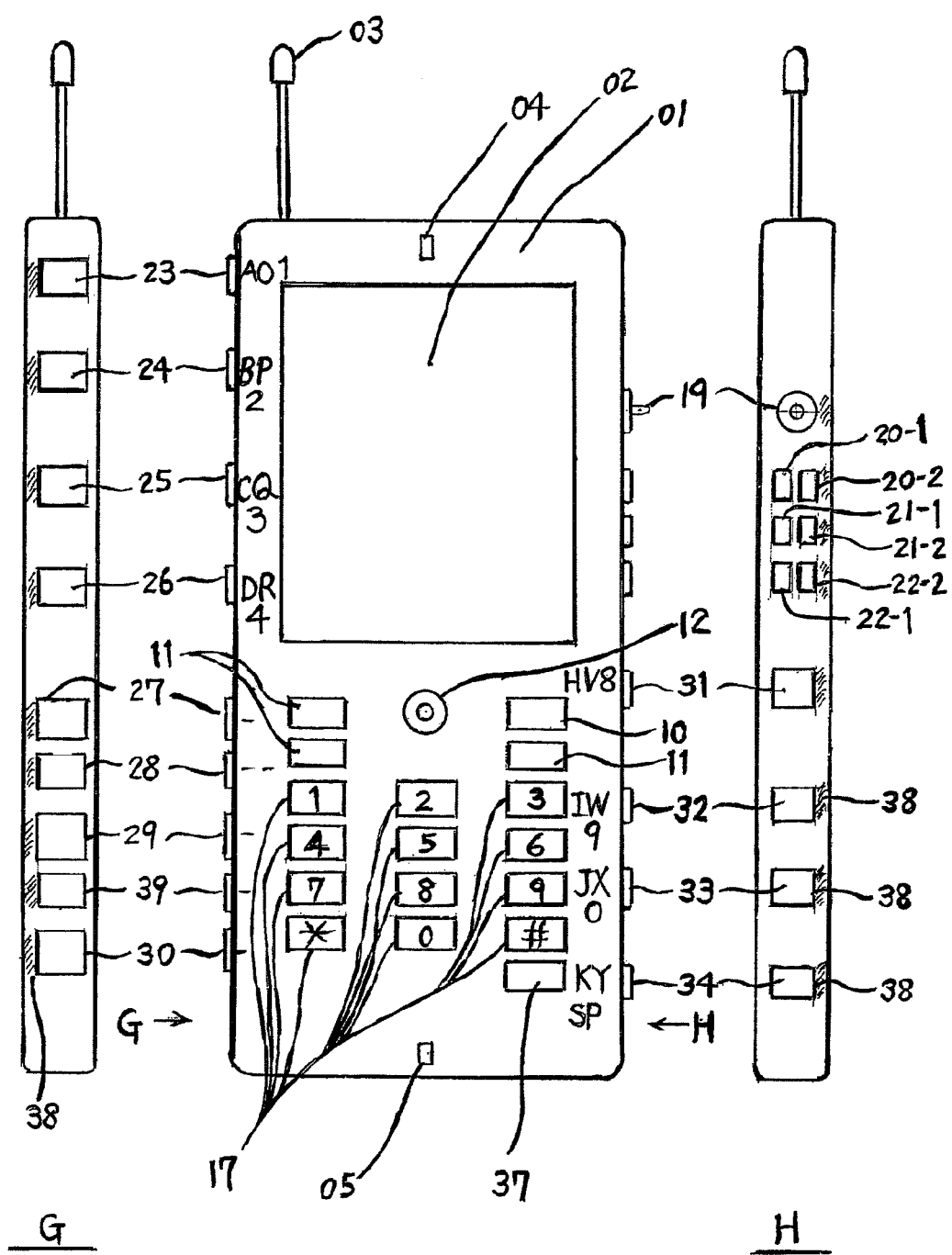
FIG. 10 illustrates an exemplary cell phone according to the present invention which can be held by both hands so that the fingers of both hands can be used for letter input and which also can be used with the one hand mode, and this cell phone has the number of keys appropriate for the use in alphabet-using countries.

FIG. 10 illustrates an exemplary cell phone according to the present invention which can be held by both hands so that the fingers of both hands can be used for letter input and which also can be used with the one hand mode, and this cell phone has the number of keys appropriate for the use in alphabet-using countries.

The cell phone according to the present invention includes: a main body 01; a display 02; an antenna 03; a loudspeaker 04; a microphone 05; nine left side face keys 23, 24, 25, 26, 27, 28, 29, 39, and 30; six right side face keys 20-1, 20-2, 21-1, 21-2, 22-1, and 22-2; four right side face keys 31, 32, 33, and 34; right side face a four-way joy stick 19; a fingers rest 38 shown by the shaded area; a right to control letter input-switch 37 on the cell phone front surface; a power switch 10; mode selector switches 11; a four-way joy stick 12; and twelve letter keys 17 of a conventional cell phone.

The cell phone shown in FIG. 10 is held in a substantially similar manner as in the case shown in the schematic view of FIG. 5 in which the cell phone is inputted with letters by ten fingers of both hands.

FIG. 10 illustrates a cell phone for a right-handed user.

When the input means is provided symmetrically on the left side face as well as the right side face of the cell phone of FIG. 10, a cell phone for a left-handed user is provided.

As shown in FIG. 10, the right hand thumb operates the four-way joy stick 19, six of small keys 20-1, 20-2, 21-1, 21-2, 22-1, and 22-2, on the right side face. A forefinger, a middle finger, a fourth finger, and a little finger of the right hand operate the four keys of 23, 24, 25, and 26 on the left side face.

Similarly, the left hand thumb operates five keys 27, 28, 29, 39, and 30, on the left side face. A forefinger, a middle finger, a fourth finger, and a little finger of the left hand operate the four keys 31, 32, 33, and 34 on the right side face.

When the small key 20-1 is pushed, the remaining nine fingers can push any of thirteen alphabetical lower case of "a" to "m", when the key 20-2 is pushed, the remaining nine fingers can push any of thirteen alphabetical lower case of "n" to "z".

Then, when the key 21-1, or 21-2 is pushed, the remaining nine fingers can push any of twenty-six capital letter of "A" to "Z". Similarly, when the right hand thumb does not push any key, ten numeric characters from 1, 2, . . . 9, to 0 can be allocated to the thirteen keys. The other remaining three keys can be allocated to signs (e.g., ".", ",", or "Space").

The key layout of this cell phone provides the input of a total of 65 characters (types) and thus is convenient for the letter input by those who are in English-speaking countries.

The remaining small keys 22-1 and 22-2 can be used to input an additional total of twenty-six characters (types) such as special signs or the like.

FIG. 10 shows one example of a key layout in which twenty-six alphabetic characters and ten numeric characters are efficiently provided such that a user operates five keys with his or her left hand to give a burden, thereby giving less input operation for selecting keys by use of right hand thumb.

In this layout, an increase of the key combinations to be selected by the right hand thumb from four to six allows the number of keys operated by the left hand thumb to be reduced to three as shown in FIG. 4. This allows 66 characters (obtained by multiplying the six key combinations with eleven) to be inputted, thereby providing a similar function. This modified layout also allows the remaining four combinations to be multiplied with eleven, thereby allowing the input of 44 characters.

In this key layout, the four-way joy stick-19, the right to control letter input-switch 37, and the fingers rest 38 shown by the shaded area have the same use method, function, and structure as those in FIG. 4.

The one hand mode in FIG. 10, means a mode where the five keys on the left side face of 25, 26, 27, 29, and 30, and the six small keys on the right side face of 20-1, 20-2, 21-1, 21-2, 22-1, and 22-2, and the four-way joy stick 19, are provided with the right of controlling the input of letters; and the remaining keys on the left side face of the keys 23, 24, 28, and 29, and the remaining keys on the right side face of 31, 32, 33, and 34, are disabled.

In FIG. 10, the cell phone is used in the one hand mode and thus is held as in FIG. 8.

The one hand mode provides nine key combinations by the six small keys 20-1, 20-2, 21-1, 21-2, 22-1 and 22-2, (i.e., one of the two keys is pushed, the other of the two keys is pushed, and both of the two keys are pushed because of providing closely); and one combination obtained when any of the six small keys is not pushed, thereby providing a total of ten key combinations. These ten combinations are multiplied with the four keys on the left side face, thereby allowing a total of 40 characters to be inputted.

If the key 25 on the left side face is designed to have a mode switch function only when the one hand mode is used, then 80 characters can be inputted. Specifically, capital letters and lower cases of twenty-six alphabetical characters (i.e., a total of fifty-six characters) are added with ten numeric characters, thereby allowing a total of sixty-six characters to be inputted. Then, the remaining fourteen characters are allocated to special signs, which is convenient for users in English-speaking countries to input letters. The key 25 on the left side face is operated by the movement of the right hand forefinger.

According to the key layout of the present invention, when a user's both hands are available, all of the ten fingers of both hands can be used to allow the remaining nine fingers to be used for the input of twenty-six alphabet characters by switching only one mode switch key. This provides a faster input rate as compared to the conventional input method using only one hand thumb. The present invention also allows a user to have much shorter period of training for touch typing than that required by the conventional input method by only one thumb.

When the user can do a touch typing with the present invention, then a further faster letter input rate can be obtained. Specifically, the present invention provides a cell phone with a letter input rate equal to that obtained by a notebook-type personal computer on a desk, providing new innovative communication means for a cell phone.

As described above, the present invention provides a cell phone with a much faster letter input rate as compared to a conventional cell phone both when the cell phone is held by both hands to be operated by fingers of both hands as well as when the cell phone must be held by one hand to be operated by the fingers of the hand, thus providing users with much increased convenience.

Embodiment 3

Figure 11:
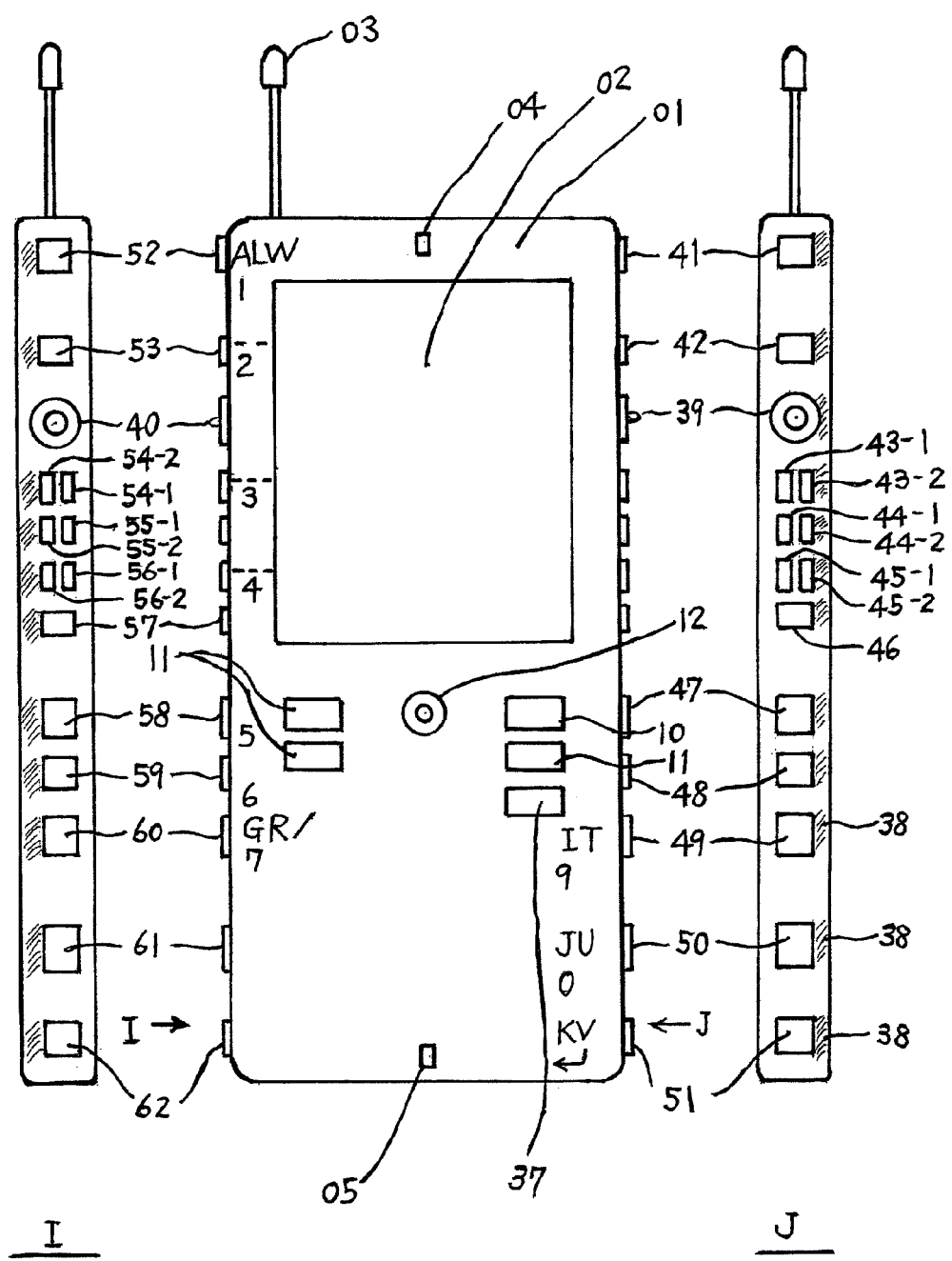
FIG. 11 illustrates an exemplary cell phone according to the present invention which can be held by both hands so that the fingers of both hands can be used for letter input, and this cell phone can be used with both a right-handed user and a left-handed user as well as it can be used with the one hand mode for a right hand and a left hand.

FIG. 11 illustrates an exemplary cell phone according to the present invention which can be held by both hands so that the fingers of both hands can be used for letter input, and this cell phone can be used by both a right-handed user and a left-handed user as well as with the one hand mode for a right hand and a left hand.

The cell phone according to the present invention includes: a main body 01; a display 02; an antenna 03; a loudspeaker 04; a microphone 05; fourteen left side face keys 52, 53, 54-1, 54-2, 55-1, 55-2, 56-1, 56-2, 57, 58, 59, 60, 61, and 62, and a four-way joy stick 40; fourteen right side face keys 41, 42, 43-1, 43-2, 44-1, 44-2, 45-1, 45-2, 46, 47, 48, 49, 50, and 51, and a four-way joy stick 39; a fingers rest 38 shown by the shaded area; a right to control letter input-switch 37 on the cell phone front surface; a power switch 10; mode selector switches 11; a four-way joy stick 12 of a conventional cell phone.

Figure 12:
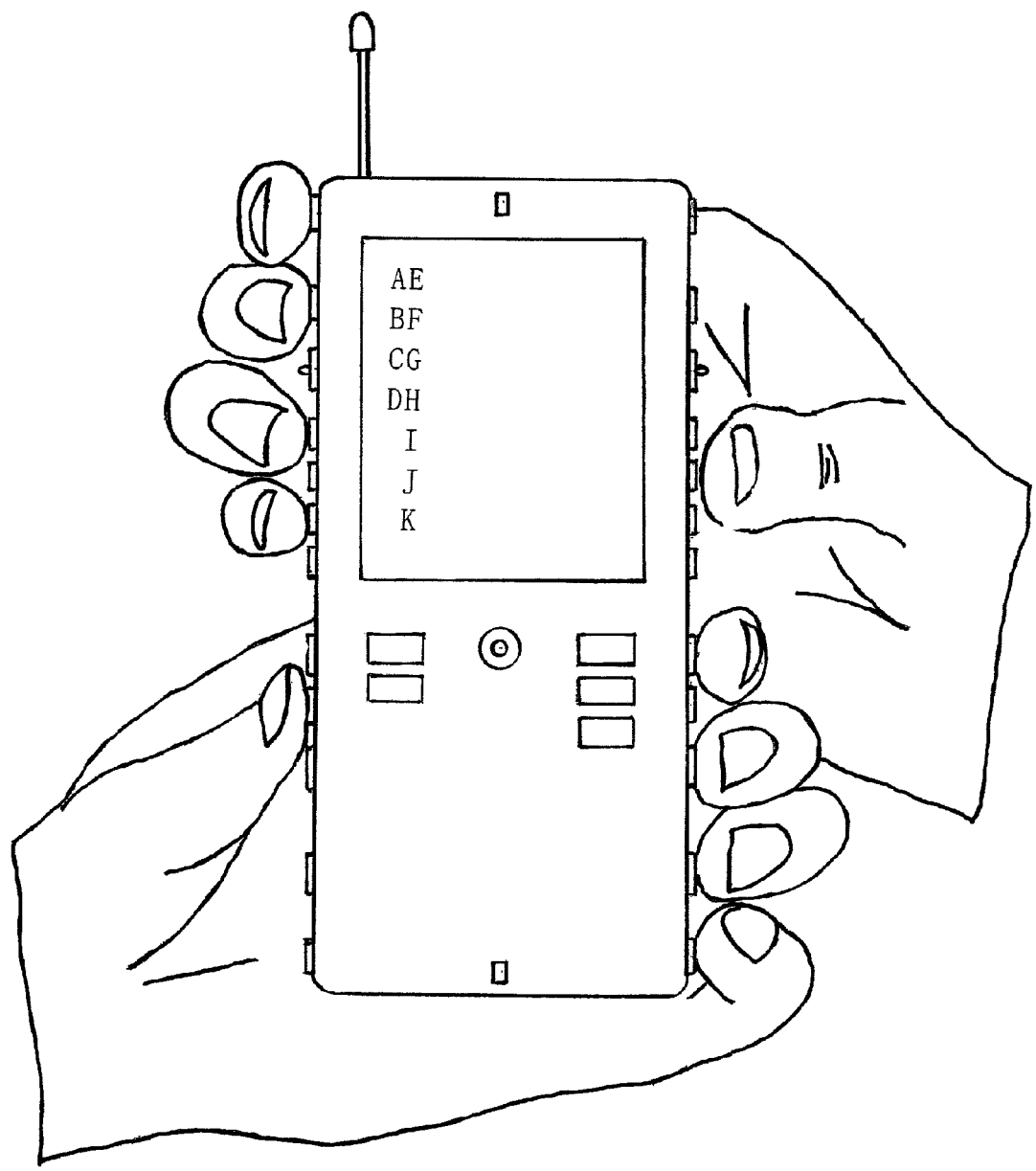
FIG. 12 illustrates a view of appearance of the cell phone of FIG. 11 being inputted with letters.

FIG. 12 illustrates a view of appearance of the cell phone of FIG. 11 being inputted with letters. This figure shows the cell phone held by a right-handed user.

As shown in FIG. 12, the right hand thumb operates the four-way joy stick 39, six keys 43-1, 43-2, 44-1, 44-2, 45-1, and 45-2, and mode selector switches 41, 42, and 46, on the right side face. A forefinger, a middle finger, a fourth finger, and a little finger of the right hand operate the four keys of 52, 53, 54-2, and 56-2 on the left side face.

Similarly, the left hand thumb operates three keys 58, 59, and 60, on the left side face. A forefinger, a middle finger, a fourth finger, and a little finger of the left hand operate the four keys 47, 49, 50, and 51 on the right side face.

When a right-handed user operates the cell phone by the fingers of both hands, the four-way joy stick 40, the left side face keys 54-1, 55-1, 55-2, 56-1, 57, 61, and 62, and the right side face key 48 are disabled.

When a capital letter "C" is inputted, as shown in FIG. 12, the key 54-2 on the left side face may be pushed one time while the key 43-1 on the right side face is being pushed by the right hand thumb as shown in FIG. 12. And when an alphabet lower case "c" is inputted, the key 54-2 on the left side face may be pushed one time while the key 44-1 is being pushed by the right hand thumb.

The use of the present invention provides that the letter input rate is at least about eight times faster than that obtained by a key layout requiring the input by one hand thumb.

Naturally, side face keys can be used even when a user uses simply the cell phone for calling a telephone number.

Under a condition where both hands can be used, the cell phone is used as shown in FIG. 12. When a user must use only one hand (e.g., when a user hangs by the strap of a train), then the user can push the key of letter input control 37 to switch to the one hand mode.

Figure 13:
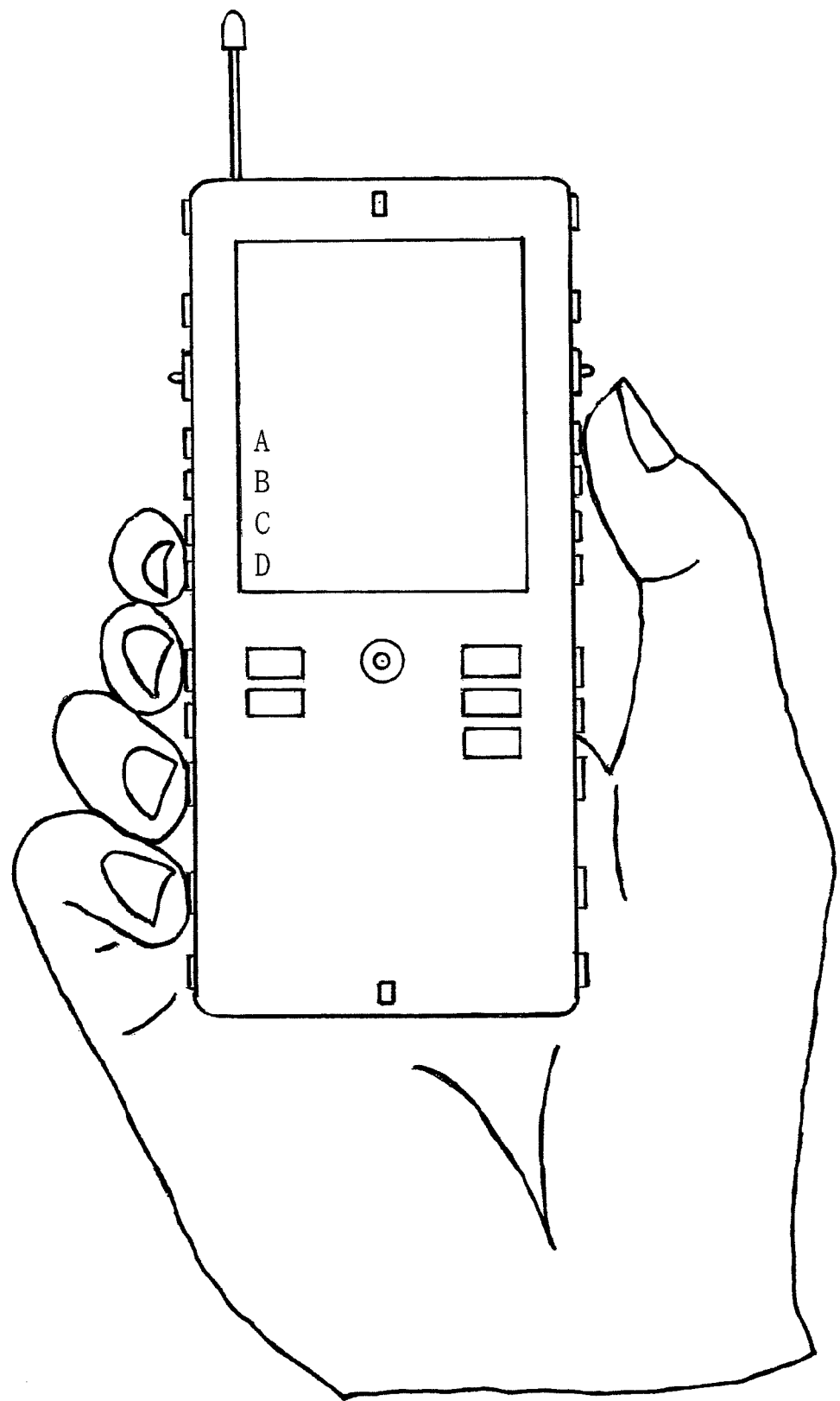
FIG. 13 shows a view in which the cell phone according to the present invention of FIG. 11 is being used with the one hand mode.

FIG. 13 illustrates a view of the cell phone of FIG. 11 being used with the one hand mode.

This figure shows the cell phone held by a right-handed user.

The one hand mode herein means a mode where the four keys on the left side face of 57, 58, 60, and 61, and on the right side face of the four-way joy stick 39, the six keys 43-1, 43-2, 44-1, 44-2, 45-1, and 45-2, and keys 41, 42, and 46, (which works as a mode selector switch) are provided with the right of controlling the input of letters; and the remaining keys on the left side face of 52, 53, the four-way joy stick 40, 54-1, 54-2, 55-1, 55-2, 56-1, 56-2, 59, and 62 and the keys on the right side face of 47, 48, 49, 50, and 51 are disabled.

Even in the one hand mode, the letter input rate is at least about four times faster than that obtained by a key layout requiring the input by one thumb.

The cell phone as shown in FIG. 11 is designed for both a fight-handed user and a left-handed user.

By continuously pushing the right to control letter input-switch 37, the right to control the input of letters can be given to any one of: ten fingers of both hands of a right-handed user; ten fingers of both hands of a left-handed user; only five fingers of a right hand of a right-handed user; and only five fingers of a left hand of a left-handed user.

Those keys used by a left-handed user are symmetrically opposite to the position of the keys and the four-way joy stick used by right-handed user described above.

When the cell phone is inputted with letters by ten fingers of both hands as shown in FIG. 12, then nine combinations of keys can be selected. Specifically, the right hand thumb can select three combinations of the neighboring keys 43-1 and 43-2 (i.e., pushing any of the keys 43-1 and 43-2 and pushing both of the keys 43-1 and 43-2) and also can select three combinations of each of the keys 44-1 and 44-2 and 45-1 and 45-2 (i.e., a total of six combinations), thereby providing nine combinations by adding the above three combinations with the six combinations. When the nine combinations are added with a key status in which no keys are pushed by the right hand thumb, there are a total of ten combinations of keys. In this key status, all of the remaining nine fingers can push other keys and thus the thumb included in the remaining fingers is allowed to operate three keys (since the thumb can move faster than other fingers), thereby allowing the input of a total of 110 characters (i.e., 10 combination×11).

When the keys 41 and 42 are allocated with a function of a mode selector switch and the key 41 provides two combinations and the key 42 provides three combinations, then a total of six combinations are obtained. As a result, 660 characters can be inputted at the maximum.

The finger rest 38 shown by the shaded area is slightly higher than the housing. The finger rest 38 is provided for the purpose of receiving a reaction force caused by a force applied to the opposite side face when a user pushes a key on the opposite side face. The finger rest 38 has on the surface thereof a coating for preventing a finger thereon from slipping. The finger rest 38 also has an objective of preventing an key from being erroneously pushed. The finger rest 38 also has a concavity by which a finger thereon can be fixedly positioned.

The four-way joy stick 39 on the right side face has a main task of moving a cursor on the display 02 in the lateral and vertical directions. It also may be allocated with the conversion for inputting Kanji of Japanese language (e.g., conversion of "Hiragana" to "Kanji", "Katakana" or the like)

One of the 660 characters may also be allocated to "Space" key or "DELETE" key. When one key for one character is specified as the one which is to be pushed as a representative key combination for the collection of special signs, then a specific one character is inputted by the key and then a number of special signs can be subsequently inputted by repeatedly moving the four-way joy stick 39. In this way, by providing such a key layout that allows all of the ten fingers of both hands to operate keys of the key layout, a single operation (i.e., an operation in which another key is pushed with another finger at one time while pushing a key with a thumb) provides the input of 110 characters. This means that providing an appropriate training to a user of the key layout will allow the user to input letters with this key layout at an input rate as fast as that provided by a notebook computer on a desk in an office.

In the one hand mode as shown in FIG. 13, the four keys 57, 58, 60, and 61 on the left side face are operated by a forefinger, a middle finger, a fourth finger, and a little finger of a right hand, respectively; and the four-way joy stick 39, six keys of 43-1, 43-2, 44-1, 44-2, 45-1, and 45-2, and the keys of 41, 42, and 46 (which works as a mode selector switch) on the right side face are operated by the right hand thumb. The one hand mode provides 10 key combinations by the keys of 43-1, 43-2, 44-1, 44-2, 45-1, and 45-2, as shown in Embodiment 2. These 10 combinations are multiplied with the four keys on the left side face, thereby allowing a total of 40 characters to be inputted.

The use of the mode selector switches, keys 41, 42, and 46 allows the number of characters which can be inputted to be increased from 80 via 120 to 160. Even when used with the one hand mode, this key layout can cope with all languages.

In FIG. 11, the cell phone always has, on the front surface of the main body, printed letters associated with the keys of the cell phone to guide letter input. Such a printed guide is convenient when a user inputs letters to a cell phone according to the present invention.

FIGS. 12 and 13 show the cell phone of FIG. 11 having on the display thereof letters inputted corresponding to the keys selected by the thumbs in order to show the letters corresponding to the keys selected by the mode keys and the thumbs. When a user pushes the key 52 on the top of the left side face while the display is as shown in FIG. 12, for example, then an alphabet letter of "A" on the left top of the display can be inputted. When the thumb selects another key, then the details of a letter indicated on the display are changed accordingly. The exemplary cell phone shown in FIG. 13 is in the one hand mode and thus has four keys on the left side face, thereby allowing the display to indicate four letters. Any of the above key layouts allows a user to utilize efficiently the guidance of input of keys in a small display of the cell phone.

Embodiment 4

Figure 14:
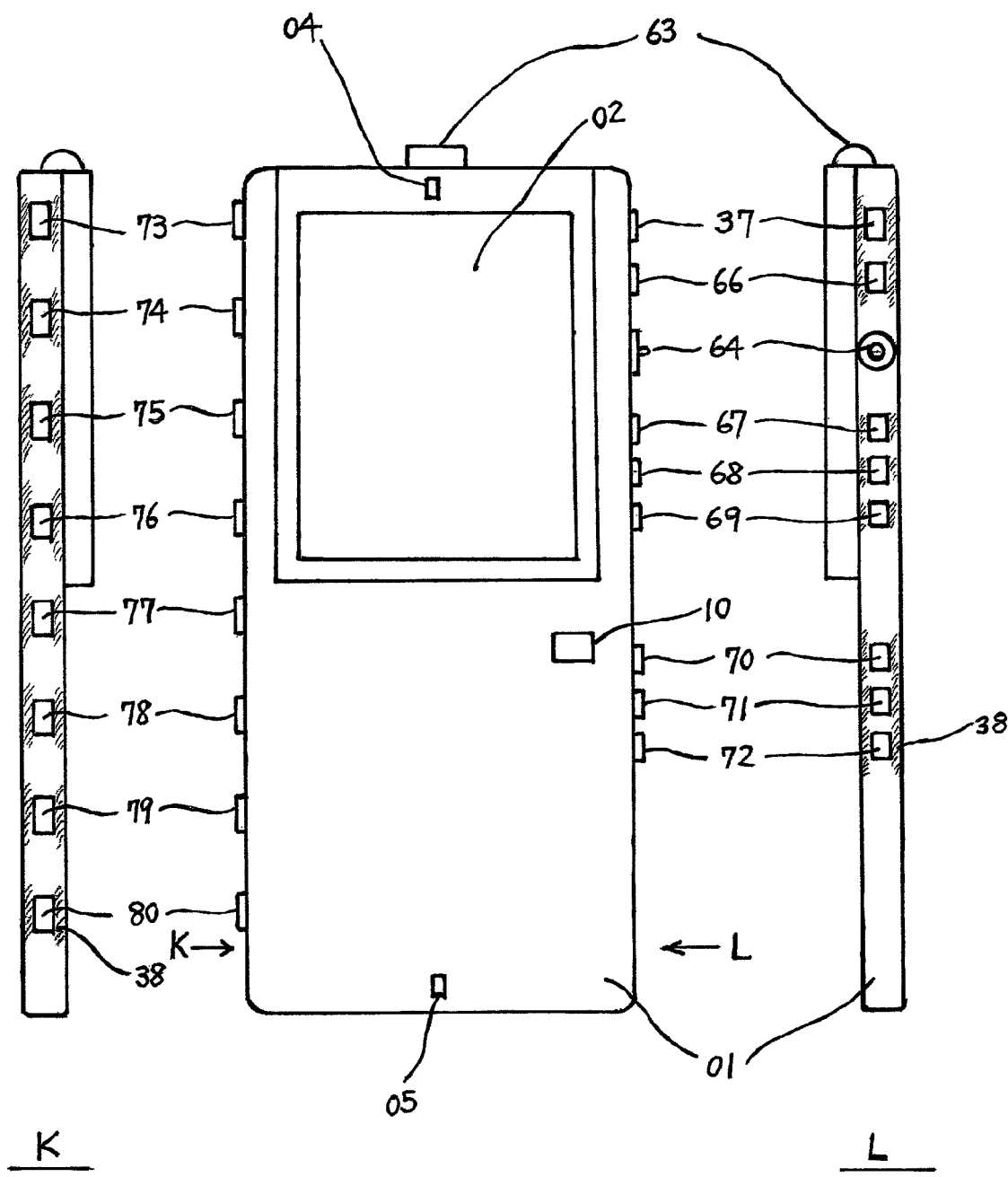
FIG. 14 illustrates an exemplary cell phone according to the present invention which can be held by both hands so that the fingers of both hands can be used for letter input, and this cell phone can be used with both of a right-handed user and a left-handed user as well as it can be used with the one hand mode for a right hand and a left hand.

FIG. 14 illustrates an exemplary cell phone according to the present invention which can be held by both hands so that the fingers of both hands can be used for letter input, and this cell phone can be used with both a right-handed user and a left-handed user as well as with the one hand mode for a right hand and a left hand.

The cell phone according to the present invention includes: a main body 01; a display 02; a loudspeaker 04; a microphone 05; a power switch 10; a fingers rest 38 shown by the shaded area; a hinge mechanism 63; eight left side face keys 73, 74, 75, 76, 77, 78, 79, and 80, and seven right side face keys 66, 67, 68, 69, 70, 71, and 72, a four-way joy stick 64; and a right to control letter input-switch 37.

Figure 15:
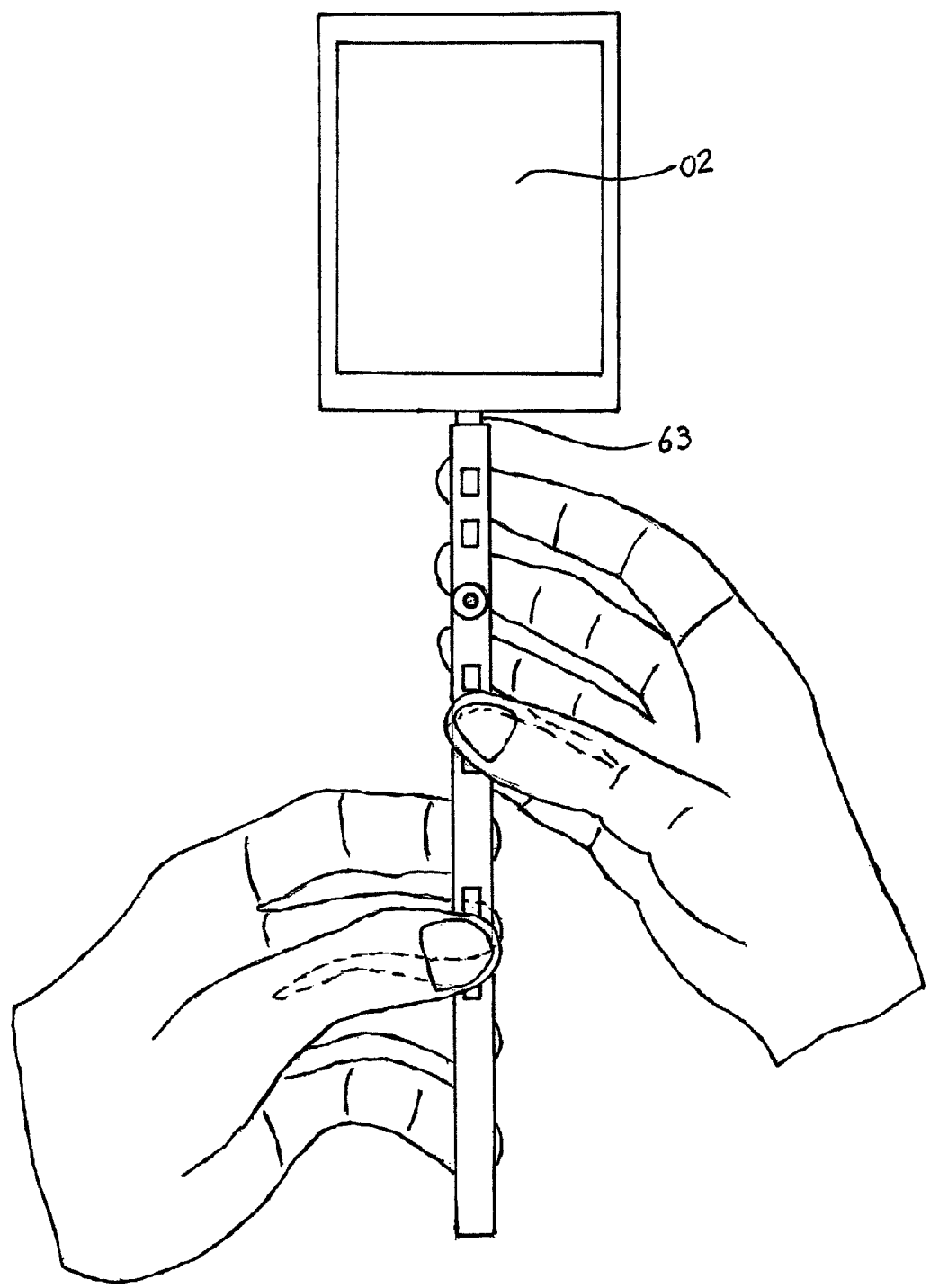
FIG. 15 illustrates a view of appearance of the cell phone of FIG. 14 being inputted with letters.

FIG. 15 illustrates a view of appearance of the cell phone of FIG. 14 being inputted with letters by ten fingers of both hands. This figure shows the cell phone held by a right-handed user.

As shown in FIG. 15, the right hand thumb operates the four-way joy stick 64, five keys 37, 66, 67, 68, and 69, on the right side face. A forefinger, a middle finger, a fourth finger, and a little finger of the right hand operate the four keys of 73, 74, 75, and 76 on the left side face.

Similarly, the left hand thumb operates three keys 70, 71, and 72, on the right side face. A forefinger, a middle finger, a fourth finger, and a little finger of the left hand operate the four keys 77, 78, 79, and 80 on the left side face.

When the cell phone as shown in FIG. 15 is inputted with letters by ten fingers of both hands, then the right side face of the cell phone's main body 01 is moved by a user to a position in front of the user. Then, the user can use the hinge mechanism 63 to open the display 02 by 180 degrees and then the user can rotate the display 02 around the hinge mechanism 63 by 360 degrees, thereby moving the display 02 to a position in front of the user's eyes to fix the display 02 at the position.

The mere position switching between a right hand and a left hand allows one cell phone to be used for both of the right-handed and the left-handed users without the switching by a mode switch.

The use of the present invention provides that the letter input rate is at least about eight times faster than that obtained by a key layout requiring the input by one hand thumb.

Under a condition where both hands can be used, the cell phone is used as shown in FIG. 15. When a user must use only one hand (e.g., when a user hangs by the strap of a train), then the user can push the key of letter input control 37 to switch to the one hand mode.

Figure 16:
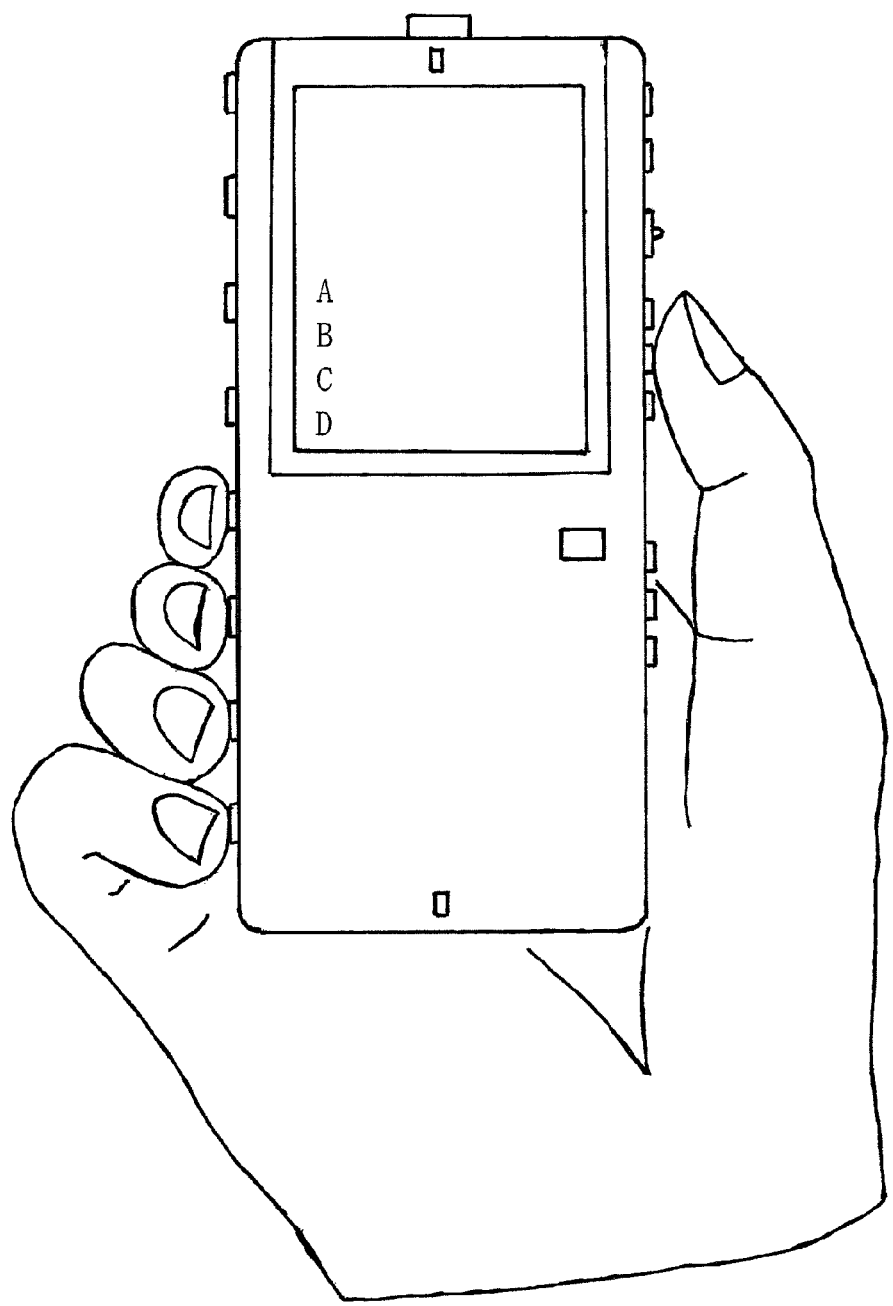
FIG. 16 shows a view in which the cell phone according to the present invention of FIG. 14 is being used with the one hand mode.

FIG. 16 illustrates a view of the cell phone of FIG. 14 being used with the one hand mode.

This figure shows the cell phone held by a right-handed user.

The one hand mode herein means a mode where the five keys on the left side face of 76, 77, 78, 79, and 80, and on the right side face of the four-way joy stick 64, the five keys 37, 66, 67, 68, and 69, are provided with the right of controlling the input of letters; and the remaining three keys on the left side face of 73, 74, and 75 and the three keys on the right side face of 70, 71, and 72 are disabled.

This cell phone allows the same keys to be used by both one hand of a right-handed user and a left-handed user.

When the cell phone shown in FIG. 14 is used by the left hand with the one hand mode, then the keys shown in FIG. 16 are operated by the left hand fingers. During the operation of the keys, the back face of this cell phone faces the user. In this case, the display 02 also can be opened around the hinge mechanism 63 by 180 degrees to be rotated by 180 degrees. When the display 02 is closed by 180 degrees, then the display 02 works as a back face of the main body, thereby allowing the left-handed user to use the cell phone with the conditions as in a right handed-user.

In this key layout, the fingers rest 38 shown by the shaded area have the same use method, function, and structure as those in FIG. 4.

When the cell phone is inputted with letters by ten fingers of both hands as shown in FIG. 15, then ten combinations of keys by both thumbs can be selected. Specifically, the right hand thumb can select five combinations of the neighboring keys 67, 68, and 69 (i.e., pushing any of the keys 67, 68, and 69 and pushing both of the keys 67 and 68, and 68 and 69) and also can select five combinations of each of the keys 70, 71, and 72. In this key status, all of the remaining nine fingers can push other keys and thus the thumb is allowed to operate these three keys (since the thumb can move faster than other fingers), thereby allowing the input of a total of 110 characters (i.e., 10 combination.times.11). When no keys are pushed by the thumbs, there are a total of 118 characters. The use of the mode selector switch key 66 allows the number of characters which can be inputted to be increased from 118 by 236 to 354.

The four-way joy stick 64 on the right side face functions as shown in FIG. 4.

In this way, by providing such a key layout that allows all of the ten fingers of both hands to operate keys of the key layout, a single operation (i.e., an operation in which another key is pushed with another finger at one time while pushing a key with a thumb) provides the input of 118 characters. This means that providing an appropriate training to a user of the key layout will allow the user to input letters with this key layout at an input rate as fast as that provided by a notebook computer on a desk in an office.

In the one hand mode as shown in FIG. 16, the four keys 77, 78, 79, and 80 on the left side face are operated by a forefinger, a middle finger, a fourth finger, and a little finger of a right hand, respectively; the key 76 is operated by the right hand forefinger by allowing the right hand forefinger to move from the key 77 to the key 76. The four-way joy stick 64, the right to control letter input-switches 37, the three keys 67, 68, and 69, and the key 66 (which works as a mode selector switch) on the right side face are operated by the right hand thumb.

As described above, the right hand thumb can select six combinations of keys by the keys 67, 68, and 69. Considering that the remaining fingers of the right hand are four, the calculation of 6×4=24 is established and thus a total of 24 combinations of keys are obtained.

The use of the mode selector switch keys 76 and 66 allows the number of characters which can be inputted to be increased from 24 by 48 to 72 or by 72 to 96.

For the input of an English text, 72 characters are sufficient for preparing a normal English text.

Embodiment 5

Figure 17:
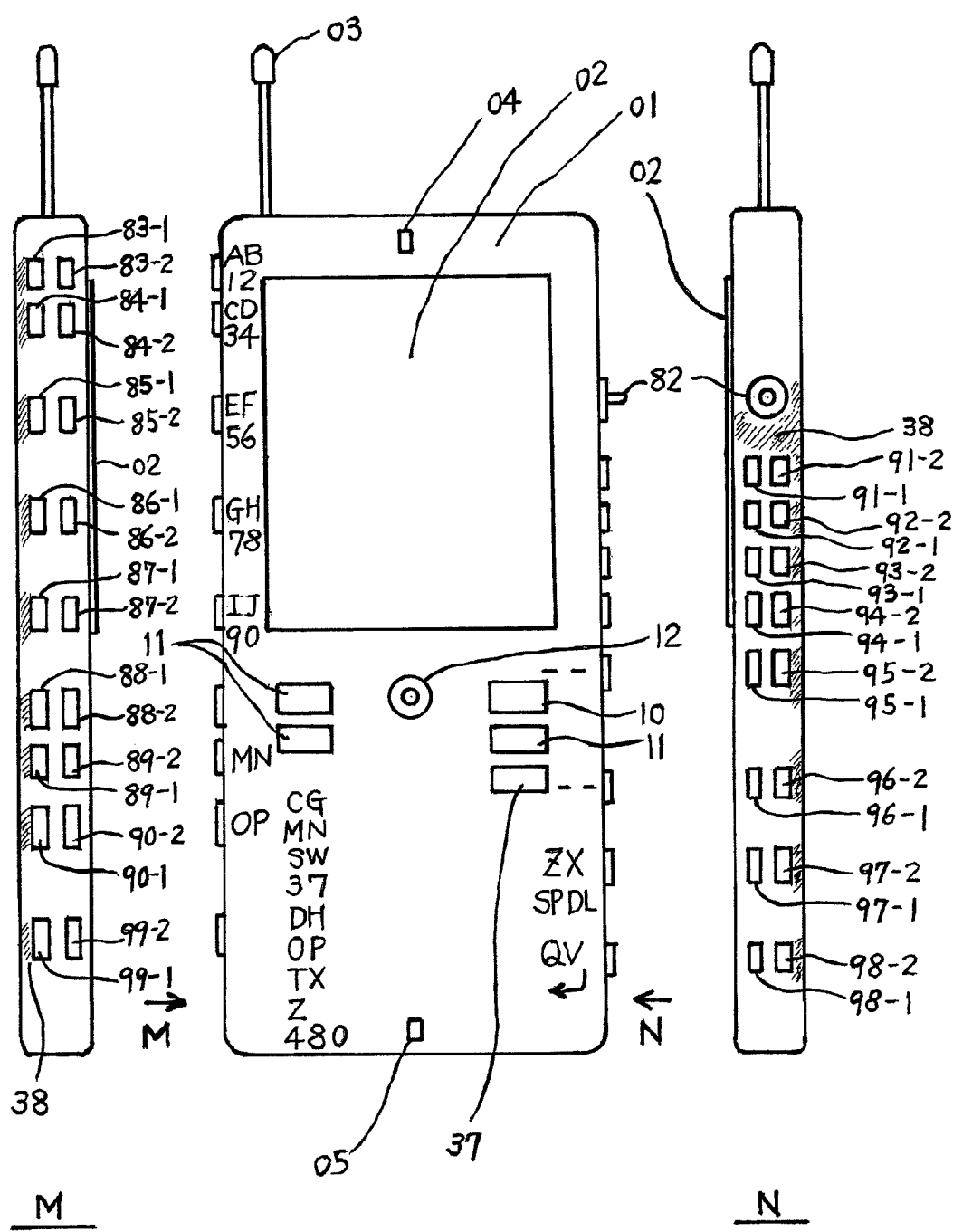
FIG. 17 illustrates one example of the best mode of the cell phone according to the present invention which can be held by both hands so that the fingers of both hands can be used for letter input.

FIG. 17 illustrates one example of the best mode of the cell phone according to the present invention which can be held by both hands so that the ten fingers of both hands can be used for letter input.

The cell phone according to the present invention includes: a main body 01; a display 02; an antenna 03; a loudspeaker 04; a microphone 05; total of eighteen left side face keys in nine rows and two columns 83-1, 83-2, 84-1, 84-2, 85-1, 85-2, 86-1, 86-2, 87-1, 87-2, 88-1, 88-2, 89-1, 89-2, 90-1, 90-2, 99-1, and 99-2, and on right side face, a joy key 82; total of sixteen right side face keys in eight rows and two columns 91-1, 91-2, 92-1, 92-2, 93-1, 93-2, 94-1, 94-2, 95-1, 95-2, 96-1, 96-2, 97-1, 97-2, 98-1, and 98-2, and a right to control letter input-switch 37 on the cell phone front surface; a power switch 10; mode selector switches 11; a four-way joy stick 12 of a conventional cell phone.

Figure 18:
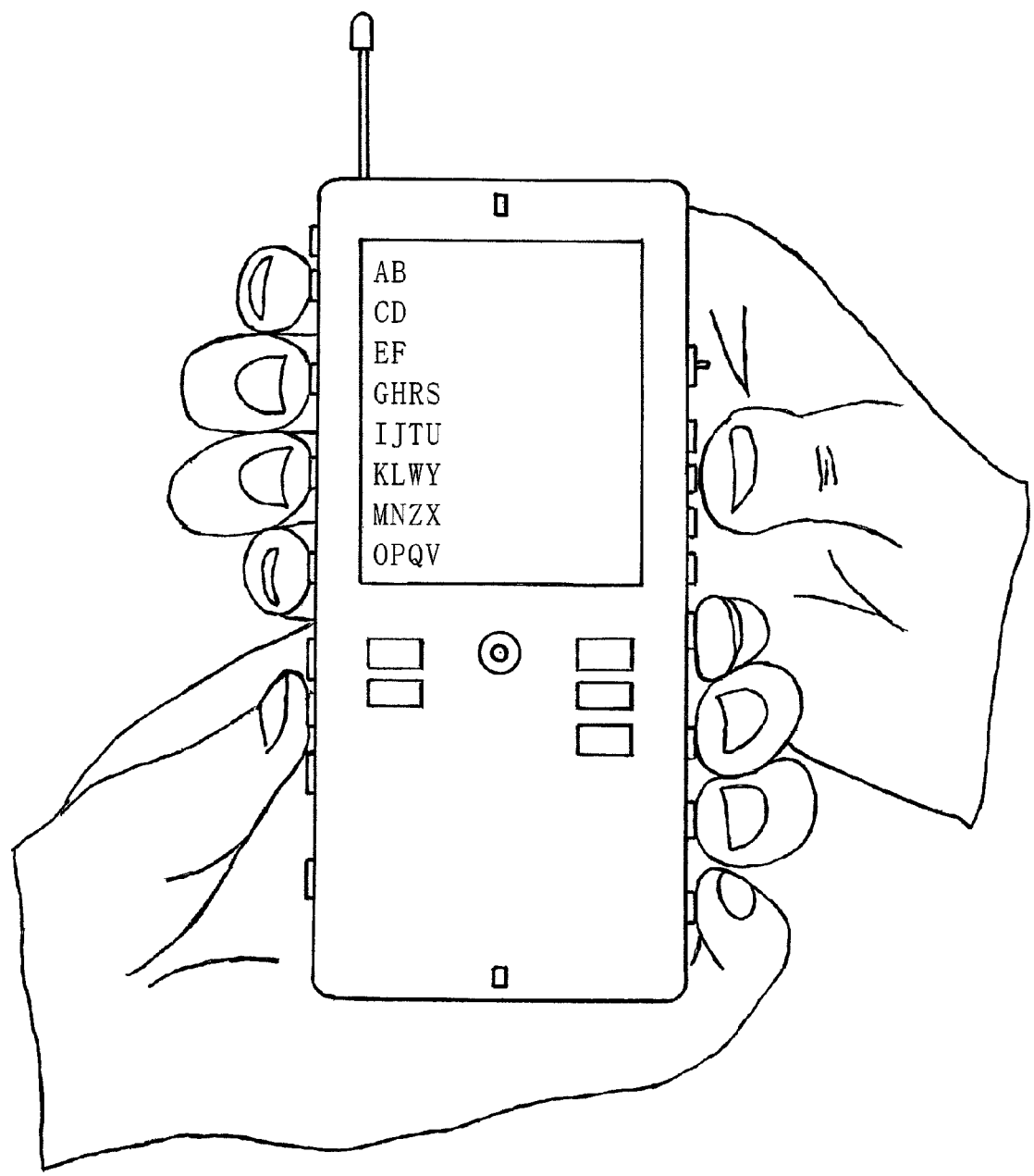
FIG. 18 illustrates a schematic view of the cell phone of FIG. 17 which is being inputted with letters by the ten fingers of both hands.

FIG. 18 illustrates a schematic view of the cell phone of FIG. 17 which is being inputted with letters by the ten fingers of both hands.

FIG. 18 schematically illustrates the cell phone being held by both hands, wherein ten fingers of both hands are positioned at home positions of the letter input means.

This figure shows the cell phone held by a right-handed user.

As shown in FIG. 18, the right hand thumb operates the joy key 82, six keys 91-1, 91-2, 92-1, 92-2, 93-1, and 93-2, on the right side face; the right hand forefinger operates four keys 83-1, 83-2, 84-1, and 84-2 on the left side face; the right hand middle finger operates two keys 85-1, and 85-2 on the left side face; the right hand fourth finger operates two keys 86-1, and 86-2 on the left side face; and right hand little finger operates two keys 87-1, and 87-2 on the left side face.

Similarly, the left hand thumb operates six keys 88-1, 88-2, 89-1, 89-2, 90-1, and 90-2, on the left side face; the left hand forefinger operates four keys 94-1, 94-2, 95-1, and 95-2 on the right side face; the left hand middle finger operates two keys 96-1, and 96-2 on the right side face; the left hand fourth finger operates two keys 97-1, and 97-2 on the right side face; and left hand little finger operates two keys 98-1, and 98-2 on the right side face.

When the right hand thumb does not push any key and the remaining nine fingers push any of twenty-six keys, then it is possible to input any of the twenty-six alphabetical lower cases from alphabet letters of "a" to "z". Then, when the right hand thumb pushes the key 91-2 and the remaining nine fingers push any of twenty-six keys, it is possible to input any of the twenty-six alphabetical capital letters from alphabet letters of "A" to "Z".

Similarly, any of ten numeric characters from 1, 2, . . . , 9, to 0 can be inputted when the right hand thumb pushes the key 91-1 and any of the keys 83-1, 83-2, 84-1, 84-2, 85-1, 85-2, 86-1, 86-2, 87-1, and 87-2 is pushed. The other remaining sixteen keys can be allocated to signs and functions required for inputting an English text (e.g., "BackSpace", "DEL", "ENT", ".", and ",").

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 82.

Thus, the present invention allows one key to have two roles (e.g., alphabet, numeric character, sign, or function), thereby allowing a user to perform touch typing with extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining seven letters can be allocated to such keys that are frequently used for Japanese language (e.g., keys responsible for """, "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In this way, the present invention can be applied to any language including English and Japanese so long as the language allows the conversion with twenty-six alphabet letters or other twenty-six characters.

The joy key 82 on the right side face has a main task of moving a cursor on the display 02 in the lateral and vertical directions. The joy key 82 also may be allocated a task of conversion from "Hiragana" to "Kanji" and "Katakana" or other tasks when Japanese Kanji needs to be inputted.

The keys 92-1, 92-2, 93-1, and 93-2 can be used as a mode switch key for switching between alphabetic characters and native language characters (e.g., "Hiragana" and "Katakana" of Japanese language, "Kanji" of China, and "Hangul character" of South Korea) or the switching between full size and half size.

How to reasonably allocate such letters that are used frequently to thumbs or forefingers which can move faster than other fingers so that the fastest letter input rate can be obtained will be described in other embodiments. The following sections will describe only that the key layout according to the present invention can classify the keys for capital letters, the keys for lower cases, and the keys for numeric characters/function/sign so that faster letter input rate is obtained.

The keys 99-1 and 99-2 on the left side face are provided at such positions that can have a contact with a right hand little finger only while the one hand mode is used.

When both hands are used for letter input, then the keys 99-1 and 99-2 also may be allocated with two different characters so that this embodiment will be applicable for inputting a text of a language having 28 different characters.

The keys 92-1, 92-2, 93-1, and 93-2 on the right side face are not necessary when English is inputted by both hands. Therefore, these key may be omitted or may be allocated to "BackSpace", "DEL", "ENT", ".", "," or the like for providing a faster input rate of an English text.

It is noted, however, that the use of the keys 92-1 and 92-2 as a mode switch key provides a faster Japanese input rate because of the fact that the input of Japanese language requires a total of seven types of characters (i.e., "Hiragana", "Katakana" of full size and half size, numeric characters of full size and half size, and sign of full size and half size).

The following section will describe another method for inputting letters with ten fingers of both hands according to the present invention.

In this method, the keys 88-1 and 89-1 are used as a shift key used by a left hand thumb; the keys 91-2 and 92-2 are used as a shift key used by a right hand thumb; and twenty keys are used as a letter key used by the remaining eight fingers. There are five shift modes including a key status in which no keys are pushed by thumbs of both hands. As a result, the calculation of 5×20 letters=100 letters is established. An increase of the shift keys to six allows the input of 140 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

Figure 20:
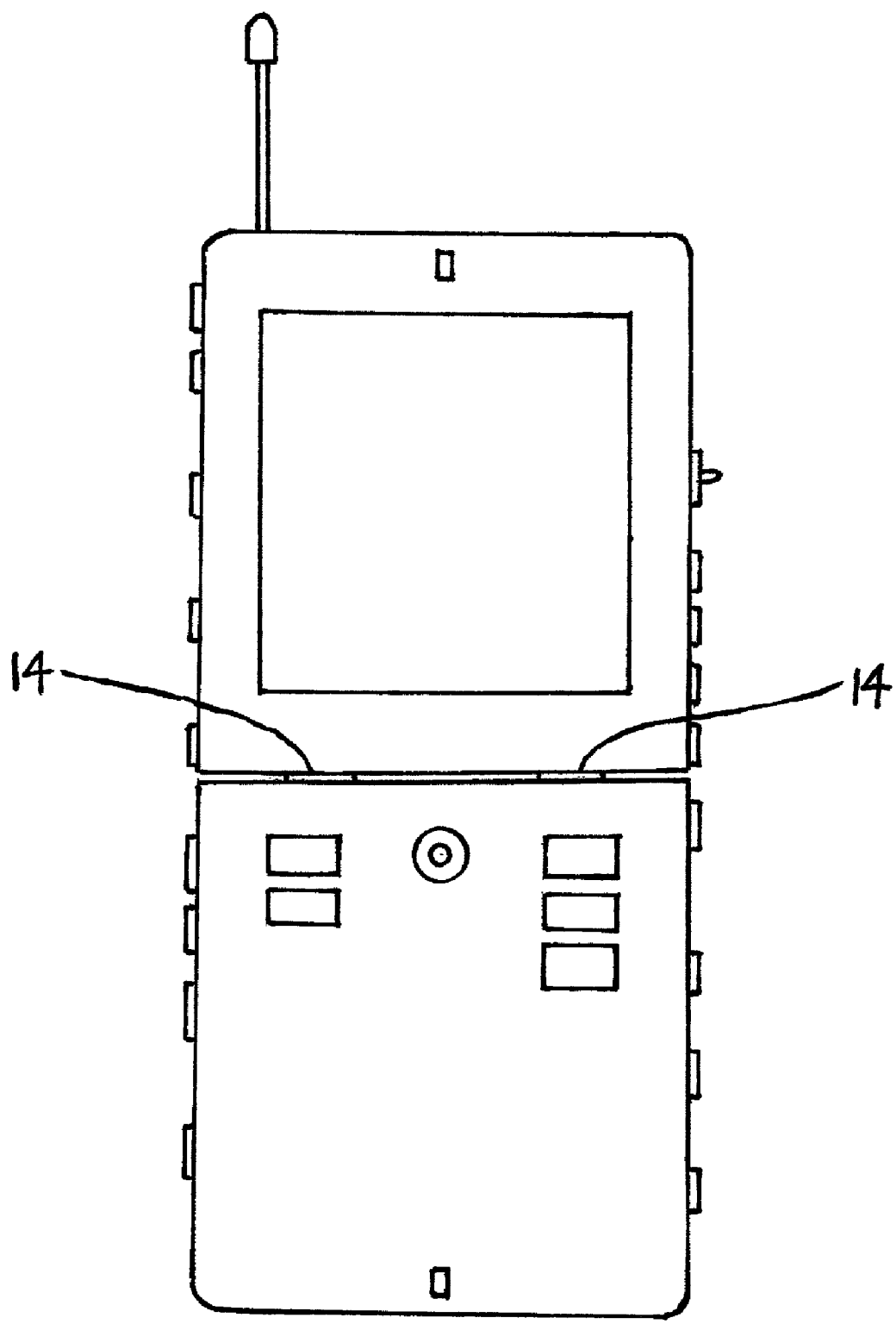
FIG. 20 illustrates a front view of the letter input device of the folding type cell phone according to the present invention which has the key layout shown in FIG. 17.

FIG. 20 is a front view of a letter input device for a folding type cell phone according to the present invention having the key layout of FIG. 17. This letter input device is folded by a hinge mechanism 14.

The right to control letter input-switch 37 shown in FIG. 17 is a switch which provides the switching among three modes when being pushed continuously. When a user can use both hands, then the key layout is used as shown in FIG. 18. When a user can use only one hand (e.g., when a user hangs on a strap in a train), then the user pushes the switch 37 one time to switch to the one hand mode. When the user pushes the switch 37 one more time, then the components as in a conventional cell phone, i.e., mode selector switch 11, the four-way joy stick 12 which are provided on the same face of the display 02 can be used during which the keys on both side faces are disabled even when being pushed.

Figure 19:
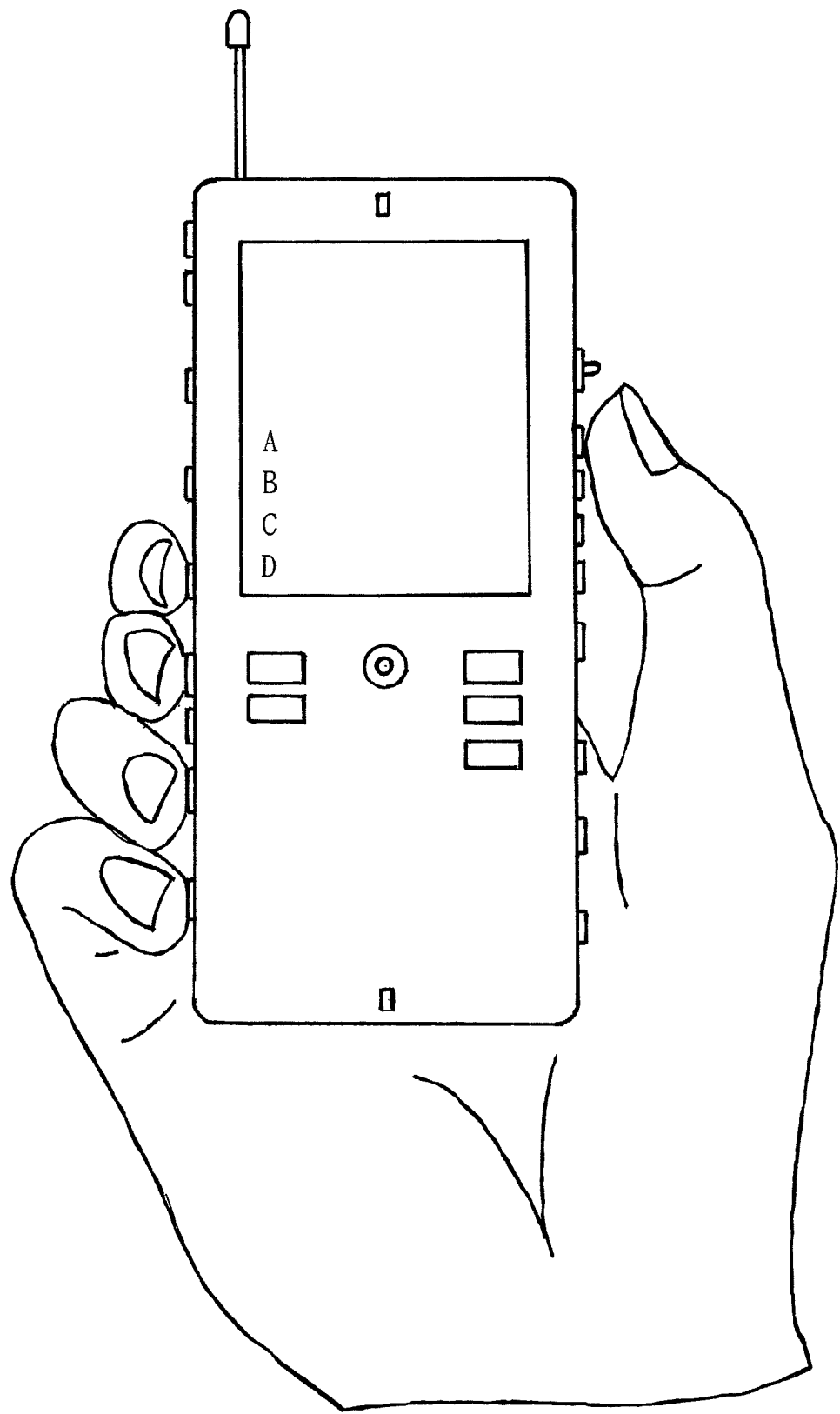
FIG. 19 shows a view in which the cell phone according to the present invention of FIG. 17 is being used with the one hand mode.

FIG. 19 illustrates the cell phone of FIG. 17 according to the present invention which is being used with the one hand mode.

FIG. 19 schematically illustrates the letter input means being held by a right hand, wherein the five fingers of the right hand are always placed at the home positions of the letter input means.

Under a condition where both hands can be used, the cell phone is used as shown in FIG. 18. When a user must use only one hand (e.g., when a user hangs by the strap of a train), then the user can push the key of letter input control 37 to switch to the one hand mode. This use method is a mere auxiliary one for an emergency.

FIG. 19 illustrates the cell phone of FIG. 17 according to the present invention which is being used with the one hand mode.

The one hand mode herein means a mode where the eight keys on the left side face of 87-1, 87-2, 88-1, 88-2, 90-1, 90-2, 99-1, and 99-2, the joy keys 82, and the eight keys on the right side face 91-1, 91-2, 92-1, 92-2, 93-1, 93-2, 94-1, and 94-2 are provided with the right of controlling the input of letters; and the remaining ten keys on the left side face 83-1, 83-2, 84-1, 84-2, 85-1, 85-2, 86-1, 86-2, 89-1, and 89-2 and the eight keys on the right side face 95-1, 95-2, 96-1, 96-2, 97-1, 97-2, 98-1, and 98-2 are disabled. In FIG. 19, every two keys on the left side face are allocated to a forefinger, a middle finger, a fourth finger, and a little finger. The reason is that the mechanism shown in FIG. 30 in which a frame provided between keys is higher than the keys allows the user holding the cell phone with the right hand to input letters to the cell phone so that these four fingers can differentiate the allocated two keys to press an appropriate key. The right hand thumb provides a delicate differentiation and thus is allocated with a number of keys. Even in the one hand mode, at least about four times faster letter input rate than that obtained by a key layout using only a one hand thumb can be afforded.

In the one hand mode, the right hand thumb on the right side is used to obtain six key combinations by each of the keys 91-1 and 91-2, 92-1 and 92-2, and 93-1 and 93-2 and one combination by pushing no keys (total of seven combinations). The left side face has eight keys, thereby establishing the calculation of 7×8 to allow a total of 56 characters to be inputted.

If the function of the letter input means is designed to allow the keys 94-1 and 94-2 to be used as a mode switch key only during the one hand mode, then even a simple design provides four modes, thereby allowing an increase of the number of inputtable characters to 112, 168, and 224. For inputting English which generally includes numeric characters, it is sufficient to provide 80 characters by key combinations and thus the mode switch key is not required to be switched frequently.

In FIG. 17, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIGS. 18 and 19 show the cell phone of FIG. 17 having on the display thereof letters inputted corresponding to the keys selected by the thumbs in order to show the letters corresponding to the keys selected by the mode keys and the thumbs. When a user pushes the key 83-1 on the top of the left side face while the display is as shown in FIG. 18, for example, then an alphabet letter of "A" on the left top of the display can be inputted. When the thumb selects another key, then the details of a letter indicated on the display are changed accordingly. The exemplary cell phone shown in FIG. 19 is in the one hand mode and thus has four keys on the left side face, thereby allowing the display to indicate four letters. Any of the above key layouts allows a user to utilize efficiently the guidance of input of keys in a small display of the cell phone.

Embodiment 6

Figure 21:
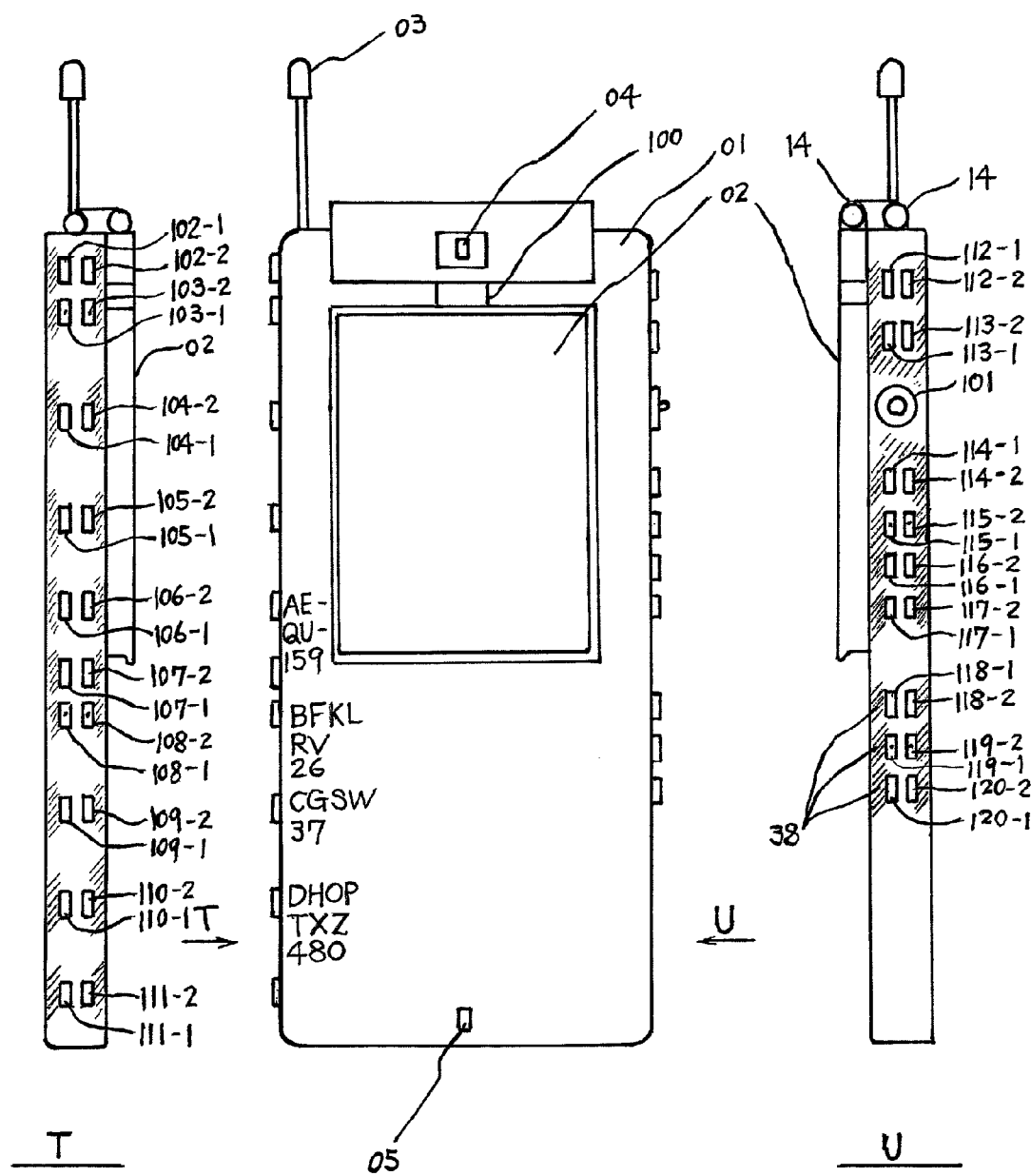
FIG. 21 illustrates one example of a super-high rate letter input device for a cell phone according to the present invention which can be held by both hands so that the ten fingers of both hands can be used for letter input.

FIG. 21 illustrates one example of a super-high rate letter input device for a cell phone according to the present invention which can be held by both hands so that the ten fingers of both hands can be used for letter input.

The cell phone according to the present invention includes: a main body 01; a display 02; an antenna 03; a loudspeaker 04; a microphone 05; a hinge mechanism 14; a pivot 100; total of twenty left side face keys in ten rows and two columns 102-1, 102-2, 103-1, 103-2, 104-1, 104-2, 105-1, 105-2, 106-1, 106-2, 107-1, 107-2, 108-1, 108-2, 109-1, 109-2, 110-1, 110-2, 111-1, and 111-2, and on the right side face, a joy key 101; a power key 112-1; mode selector keys 112-2, 113-1; and a right to control letter input-switch 113-2; total of fourteen right side face keys in seven rows and two columns 114-1, 114-2, 115-1, 115-2, 116-1, 116-2, 117-1, 117-2, 118-1, 118-2, 119-1, 119-2, 120-1, and 120-2, and a fingers rest 38 shown by the shaded area.

Figure 22:
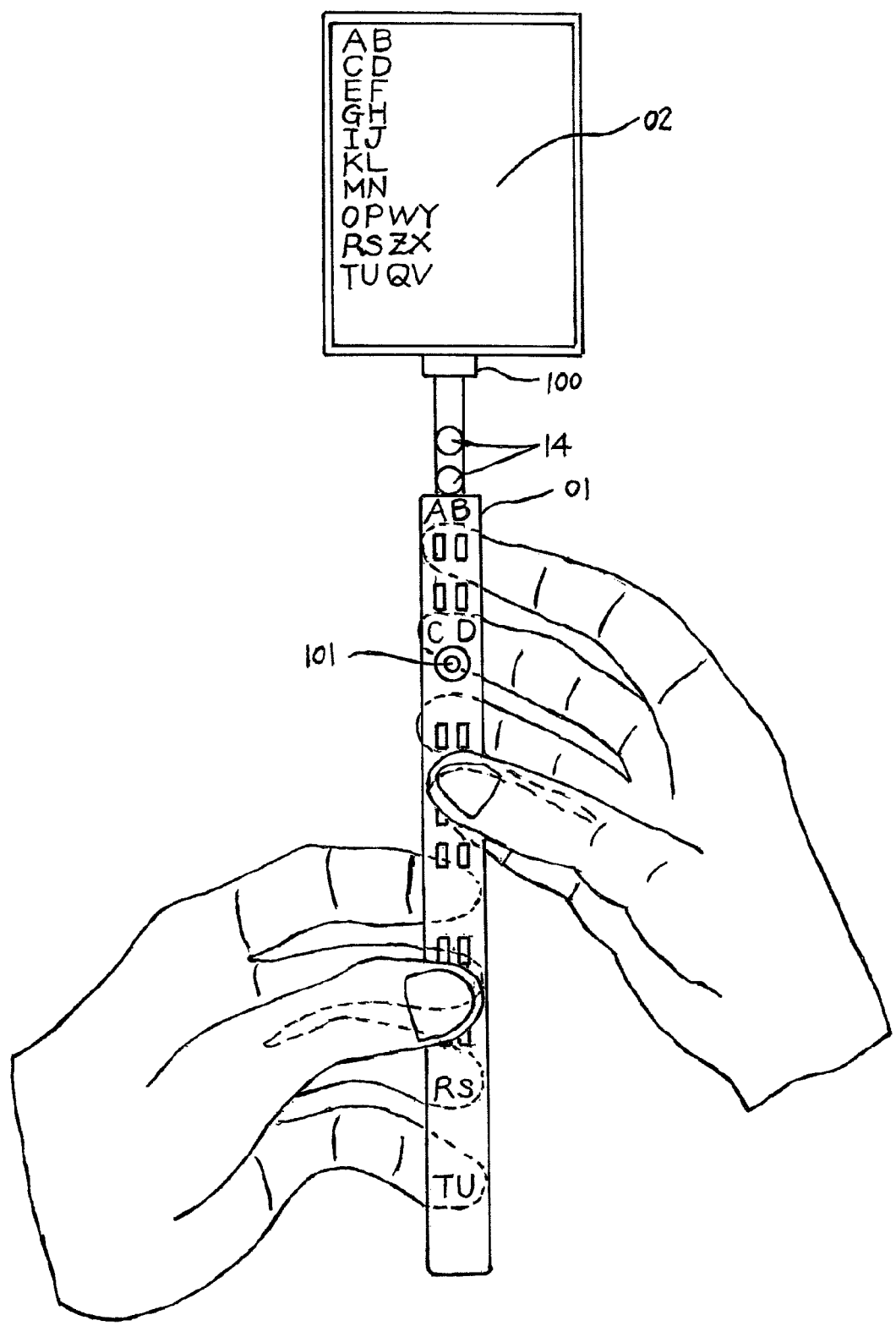
FIG. 22 illustrates a view of appearance of the cell phone of FIG. 21 being inputted with letters.

FIG. 22 illustrates a schematic view of the cell phone of FIG. 21 which is being inputted with letters by the ten fingers of both hands.

FIG. 22 schematically illustrates the cell phone being held by both hands, wherein ten fingers of both hands are positioned at home positions of the letter input means.

In the method of holding the cell phone, the hands are placed naturally to give very little fatigue to a user while the user is operating the cell phone.

When the cell phone is used for the input by both hands, then the right side face shown in FIG. 21 is moved to a position in front of a user. When the display 02 positioned as shown in FIG. 21 is rotated by 180 degrees around the hinge mechanism 14 and then rotated around a pivot 100 by 90 degrees, then the display 02 as shown in FIG. 22 is obtained.

FIG. 22 shows the cell phone held by a right-handed user. As can be seen from FIG. 22, the cell phone includes the joy key 101 and shift keys 114-1 and 114-2 operated by which the fast-moving right hand can perform a number of delicate tasks.

As shown in FIG. 22, the right hand thumb operates the joy key 101, two keys 114-1, and 114-2, on the front side face of the user; the right hand forefinger operates four keys 102-1, 102-2, 103-1, and 103-2 on the back side face to the user; the right hand middle finger operates two keys 104-1, and 104-2 on the back side face; the right hand fourth finger operates two keys 105-1, and 105-2 on the back side face; and right hand little finger operates two keys 106-1, and 106-2 on the back side face.

Similarly, the left hand thumb operates six keys 118-1, 118-2, 119-1, 119-2, 120-1, and 120-2, on the front side face of the user; the left hand forefinger operates four keys 107-1, 107-2, 108-1, and 108-2 on the back side face to the user; the left hand middle finger operates two keys 109-1, and 109-2 on the back side face; the left hand fourth finger operates two keys 110-1, and 110-2 on the back side face; and left hand little finger operates two keys 111-1, and 111-2 on the back side face.

When the right hand thumb does not push any key and the remaining nine fingers push any of twenty-six keys, then it is possible to input any of the twenty-six alphabetical lower cases from alphabet letters of "a" to "z". Then, when the right hand thumb pushes the key 114-2 and the remaining nine fingers push any of twenty-six keys, it is possible to input any of the twenty-six alphabetical capital letters from alphabet letters of "A" to "Z".

Similarly, any of ten numeric characters from 1, 2, ..., 9, to 0 can be inputted when the right hand thumb pushes the key 114-2 and any of the keys 102-1, 102-2, 103-1, 103-2, 104-1, 104-2, 105-1, 105-2, 106-1, and 106-2 is pushed. The other remaining sixteen keys can be allocated to signs and functions required for inputting an English text (e.g., "BackSpace", "DEL", "ENT", ".", and ",").

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 101.

Thus, the present invention allows one key to have two roles (e.g., alphabet, numeric character, sign, or function), thereby allowing a user to perform touch typing with extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining seven letters can be allocated to such keys that are frequently used for Japanese language (e.g., keys responsible for "'"", "○", "RET", "DEL", "Space", and "BackSpace", or keys responsible for the collection of special characters). This allows all "Hiragana" to be continuously inputted without pushing the mode switch key and also allows the right hand thumb to always stay at the joy key 101 so that the right hand thumb can be exclusively used for "Kanji (Chinese character)" conversion, thereby providing a super-high rate letter input.

In this way, the present invention can be applied to any language including English and Japanese so long as the language allows the conversion with twenty-six alphabet letters or other twenty-six characters.

When alphabet is used for input, a single key can be used for a pair of a capital letter and a lower case. This allows the fingers to learn the input system with an extreme ease, thus requiring the minimum period of time for performing a touch typing with the cell phone.

Specifically, the use of the present invention provides about twenty times faster letter input rate as compared to that obtained by a key layout using only one hand thumb for the letter input.

Naturally, in the case where a cell phone is used for a simple task of inputting a telephone number in which numeric characters of 1, 2, . . . , 9, 0, can be inputted when the right hand thumb pushes the key 114-1 and any of the keys 102-2, 102-1, 103-2, 103-1, 104-2, 104-1, 105-2, 105-1, 106-2, and 106-1 is pushed as shown in FIG. 21.

When the left-handed user uses the above cell phone as shown in FIG. 22, then the right hand and the left hand shown in FIG. 22 only have to be interchanged. In this case, the joy key 101 is operated by the left hand.

The joy key 101 on the right side face has a main task of moving a cursor on the display 02 in the lateral and vertical directions. The joy key 101 also may be allocated for conversion from "Hiragana" to "Kanji" and "Katakana" or other tasks when Japanese Kanji needs to be inputted.

The keys 115-1, 115-2, 116-1, and 116-2 can be used as a mode switch key for the switching between alphabetic characters and native language characters (e.g., "Hiragana" and "Katakana" of Japanese language, "Kanji" of China, and "Hangul character" of South Korea) or the switching between full size and half size.

How to reasonably allocate such letters that are used frequently to thumbs or forefingers which can move faster than other fingers so that the fastest letter input rate can be obtained will be described in other embodiments. The following sections will describe only that the key layout according to the present invention can classify the keys for capital letters, the keys for lower cases, and the keys for numeric characters/function/sign so that faster letter input rate is obtained.

The keys 115-1, 115-2, 116-1, 116-2, 117-1, and 117-2 on the right side face are not necessary when English is inputted by both hands. Therefore, these key may be omitted or may be allocated to "BackSpace", "DEL", "ENT", ".", ",", or the like for providing a faster input rate of an English text.

It is noted, however, that the use of the keys 115-1, 115-2, 116-1, and 116-2 as a mode switch key provides a faster Japanese input rate because of the fact that the input of Japanese language requires a total of seven types of characters (i.e., "Hiragana", "Katakana" of full size and half size, numeric characters of full size and half size, and sign of-full size and half size).

The right to control letter input-switch 113-2 shown in FIG. 21 is a switch which provides the switching among three modes when being pushed continuously.

Under a condition where both hands can be used, the cell phone is used as shown in FIG. 22. When a user must use only one hand (e.g., when a user hangs by the strap of a train), then the user can push the key of letter input control 113-2 to switch to the right hand mode. When the user pushes the switch 113-2 one more time, user can switch to the left hand mode.

Figure 23:
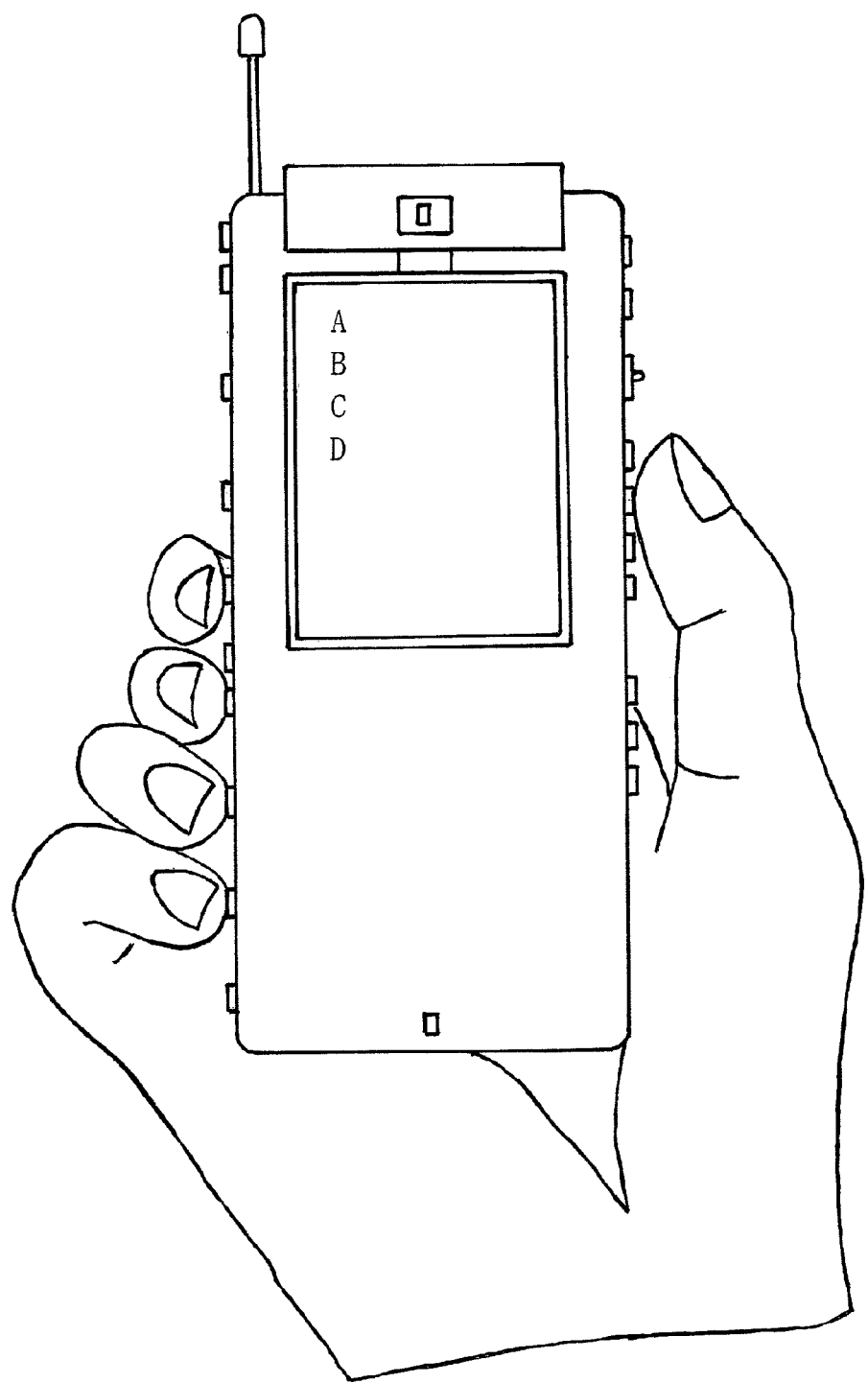
FIG. 23 shows a view in which the cell phone according to the present invention of FIG. 21 is being used with the one hand mode.

FIG. 23 shows a view in which the cell phone according to the present invention of FIG. 21 is being used with the right hand mode.

FIG. 23 schematically illustrates the letter input means being held by a right hand, wherein the five fingers of the right hand are always placed at the home positions of the letter input means. This use method is a mere auxiliary one for an emergency.

The one hand mode herein means a mode where the eight keys on the left side face of 106-1, 106-2, 108-1, 108-2, 109-1, 109-2, 110-1, and 110-2, the joy keys 101, and the eight keys on the right side face 114-1, 114-2, 115-1, 115-2, 116-1, 116-2, 117-1, and 117-2 are provided with the right of controlling the input of letters; and the remaining twelve keys on the left side face 102-1, 102-2, 103-1, 103-2, 104-1, 104-2, 105-1, 105-2, 107-1, 107-2, 111-1, and 111-2 and the six keys on the right side face 118-1, 118-2, 119-1, 119-2, 120-1, and 120-2 are disabled. In FIG. 23, every two keys on the left side face are allocated to a forefinger, a middle finger, a fourth finger, and a little finger. The reason is that the mechanism shown in FIG. 30 in which a frame provided between keys is higher than the keys allows the user holding the cell phone with the right hand to input letters to the cell phone so that these four fingers can differentiate the allocated two keys to press an appropriate key. The right hand thumb provides a delicate differentiation and thus is allocated with a number of keys. Even in the one hand mode, at least about four times faster letter input rate than that obtained by a key layout using only a one hand thumb can be afforded.

For the left-handed user, the back face of the cell phone shown in FIG. 21 is used as a front surface for the operation by the left hand.

In this case, keys to be operated are the same as those used by the right hand user. When the display 02 as shown in FIG. 22 is placed at a position of the back face shown in FIG. 21, then the display 02 is placed in front of the left-handed user. Then, the loudspeaker 04 and the microphone 05 are provided at the back side of the display 02. In FIGS. 21 and 22, the display of the display 02 is made upside down by detecting the angle of the hinge mechanism 14.

The function of the right to control letter input-key 113-2 may be enough and the key may be replaced by other mode switch keys. Alternatively, the function of the right to control letter input-key 113-2 also may be played by the simultaneous push of a plurality of keys or a push of a predetermined key for a fixed period of time.

In the one hand mode, the right hand thumb on the right side is used to obtain six key combinations by each of the keys 114-1, 114-2, 115-1, 115-2, 116-1 and 116-2 and one combination by pushing no keys (total of seven combinations). The left side face has eight keys, thereby establishing the calculation of 7×8 to allow a total of 56 characters to be inputted.

If the function of the letter input means is designed to allow the keys 117-1 and 117-2 to be used as a mode switch key only during the one hand mode, then even a simple design provides four modes, thereby allowing an increase of the number of inputtable characters to 112, 168, and 224. For inputting English which generally includes numeric characters, it is sufficient to provide 80 characters by key combinations and thus the mode switch key is not required to be switched frequently.

Naturally, one hand mode of the present invention can be applied to any language including Japanese.

Embodiment 7

FIG. 24 illustrates one example of a super-high rate letter input device for a cell phone according to the present invention which can be held by both hands so that the ten fingers of both hands can be used for letter input.

This letter input means is characterized in that two housings provided at right and left are connected. This cell phone can be folded like a book in the left-and-right direction. This letter input means has two displays provided at the left and right sides and can be used as both an electronic databook and a cell phone by which a number of pieces of letter information or the like can be recognized at one glance and characters can be inputted at a high rate.

The cell phone according to the present invention includes: two main housing 01 at the right and left side; two display 02 at the right and left side; an antenna 03; a loudspeaker 04; a microphone 05 at the right and left side; two sets of hinge mechanism 14 of upper and lower side; four sets of bar 121; four sets of bar storage groove 122; and a joy stick 123, total of eight keys in four rows and two columns 125-1, 125-2, 126-1, 126-2, 127-1, 127-2, 128-1, and 128-2 on the left side face of the left housing; total of ten keys in five rows and two columns 129-1, 129-2, 130-1, 130-2, 131-1, 131-2, 132-1, 132-2, 133-1, and 133-2 on the right side face of the left housing; total of ten keys in five rows and two columns 134-1, 134-2, 135-1, 135-2, 136-1, 136-2, 137-1, 137-2, 138-1, and 138-2 on the left side face of the right housing; a joy stick 124, total of eight keys in four rows and two columns a right to control letter input-switch 139-1, a power switch 139-2, 140-1, 140-2, 141-1, 141-2, 142-1, and 142-2 on the right side face of the right housing, a fingers rest 38 shown by the shaded area.

Figure 25:
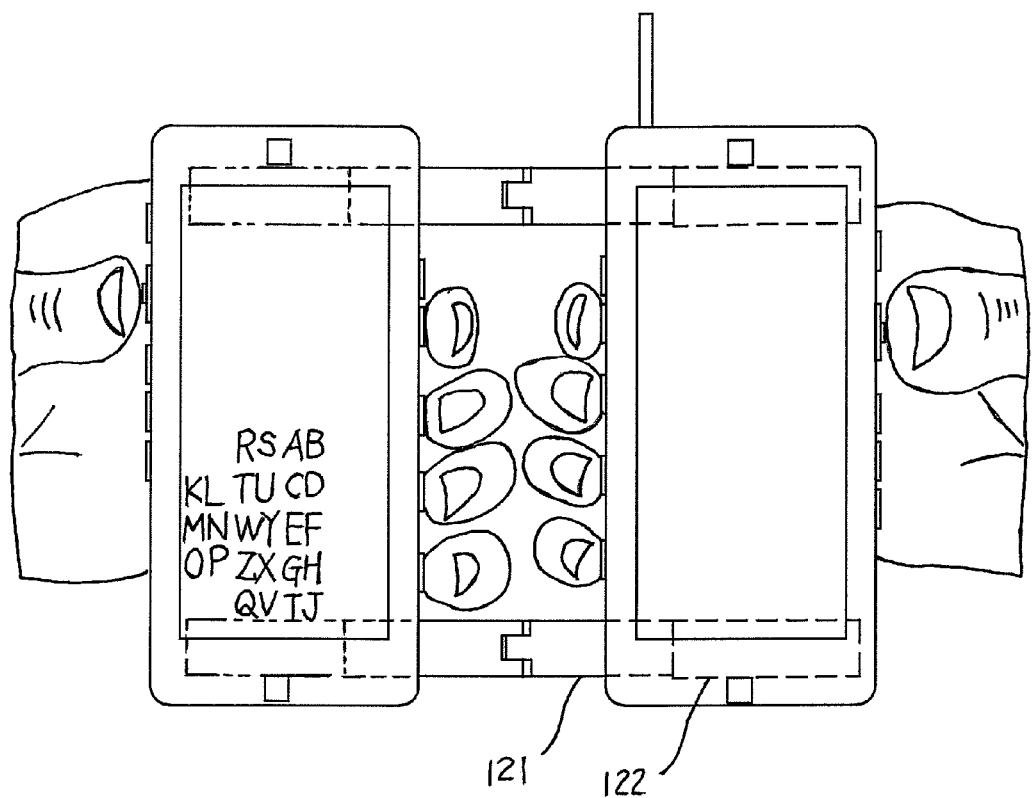
FIG. 25 illustrates a schematic view of the cell phone of FIG. 24 which is being inputted with letters by the ten fingers of both hands.

FIG. 25 illustrates a schematic view of the cell phone of FIG. 24 which is being inputted with letters by the ten fingers of both hands.

FIG. 25 schematically illustrates the cell phone being held by both hands, wherein ten fingers of both hands are positioned at home positions of the letter input means.

Except for the case where the cell phone is used by both hands, the letter input means takes a folded-configuration by allowing a user to apply a compressive force to the main housing 01 from left and right sides to push a bar 121 into a bar storage groove 122 and to subsequently allow the hinge mechanism 14 to oppose the back faces to each other as shown in FIG. 24. As a result, the two displays 02 face outside.

When being folded, the letter input means also can be used as a usual telephone in which the display 02 can display information and reception and transmission of information can be provided by a limited number of keys as compared to the number for the use by both hands.

The letter input means shown in FIG. 25 may be used by both a right-handed user and a left-handed user.

As shown in FIG. 25, the left hand thumb operates the joy stick 123, eight keys in four rows and two columns 125-1, 125-2, 126-1, 126-2, 127-1, 127-2, 128-1 and 128-2, on the left side face of the left housing; the left hand forefinger operates keys of 129-1, 129-2, 130-1, and 130-2, the left hand middle finger operates keys of 131-1, 131-2, the left hand fourth finger operates keys of 132-1, 132-2, and left hand little finger operates keys of 133-1, 133-2, on the right side face of the left housing.

Similarly, the right hand forefinger operates keys of 134-1, 134-2, 135-1, and 135-2, the right hand middle finger operates keys of 136-1, 136-2, the right hand fourth finger operates keys of 137-1, 137-2, and right hand little finger operates keys of 138-1, 138-2 on the left side face of the right housing; the right hand thumb operates the joy stick 124, eight keys in four rows and two columns of the right to control letter input-switch 139-1, the power switch 139-2, 140-1, 140-2, 141-1, 141-2, 142-1, and 142-2, on the right side face of the right housing.

The following sections will describe a case where a right-handed user uses the keys of this letter input means.

When the right hand thumb does not push any key and the remaining nine fingers push any of twenty-six keys, (the left hand thumb pushes six keys of 126-1, 126-2, 127-1, 127-2, 128-1, and 128-2) then it is possible to input any of the twenty-six alphabetical lower cases from alphabet letters of "a" to "z". Then, when the right hand thumb pushes the key 140-2 and the remaining nine fingers push any of twenty-six keys, it is possible to input any of the twenty-six alphabetical capital letters from alphabet letters of "A" to "Z".

Similarly, any of ten numeric characters from 1, 2, . . . , 9, to 0 can be inputted when the right hand thumb pushes the key 140-1 and any of the keys 129-1, 129-2, 130-1, 130-2, 131-1, 131-2, 132-1, 132-2, 133-1, and 133-2 is pushed. The other remaining sixteen keys can be allocated to signs and functions required for inputting an English text (e.g., "BackSpace", "DEL", "ENT", ".", and ",").

In the right-handed mode, the joy stick 124 is enabled and the joy stick 123 is disabled.

When the right-handed user inputs an English text, the joy stick 123 and the keys 141-1 and 141-2 and 142-1 and 142-2 are unnecessary. Thus, these key may be omitted or may be allocated to "BackSpace", "DEL", "ENT", ".", "," or other functions to increase the rate at which the English text is inputted.

The following section will describe another method for inputting letters with ten fingers of both hands according to the present invention.

In this method, the keys 126-1 and 127-1 are used as a shift key used by a left hand thumb; the keys 140-2 and 141-2 are used as a shift key used by a right hand thumb; and twenty keys are used as a letter key used by the remaining eight fingers. There are five shift modes including a key status in which no keys are pushed by thumbs of both hands. As a result, the calculation of 5×20 letters=100 letters is established. An increase of the shift keys to six allows the input of 140 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

When the left-handed user uses this letter input means, then the right to control letter input-key 139-1 is used to switch a mode to enable the joy stick 123, Then, the keys 126-1 and 126-2 are used as a shift key for switching to the input of alphabet capital letters, alphabet lower cases, or numeric characters/sign/function.

In turn, the joy stick 124 is disabled and the keys 140-1 and 140-2, 141-1 and 141-2, and 143-1 and 143-2 are used as those for inputting characters instead of the keys 126-1 and 126-2, 127-1 and 127-2, and 128-1 and 128-2.

If such a software is preliminarily designed, one type of cell phone can be used by both left-handed user and right-handed user by allowing the user to select an appropriate key layout.

In FIG. 24, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIG. 25 show the cell phone of FIG. 24 having on the display thereof letters inputted corresponding to the keys selected by the thumbs in order to show the letters corresponding to the keys selected by the mode keys and the thumbs. When a user pushes the key 126-1 on the left side face of the left housing while the display is as shown in FIG. 25, for example, then an alphabet letter of "K" on the left top of the display can be inputted. When the thumb selects another key, then the details of a letter indicated on the display are changed accordingly. Any of the above key layouts allows a user to utilize efficiently the guidance of input of keys in a small display of the cell phone.

Embodiment 8

Figure 26:
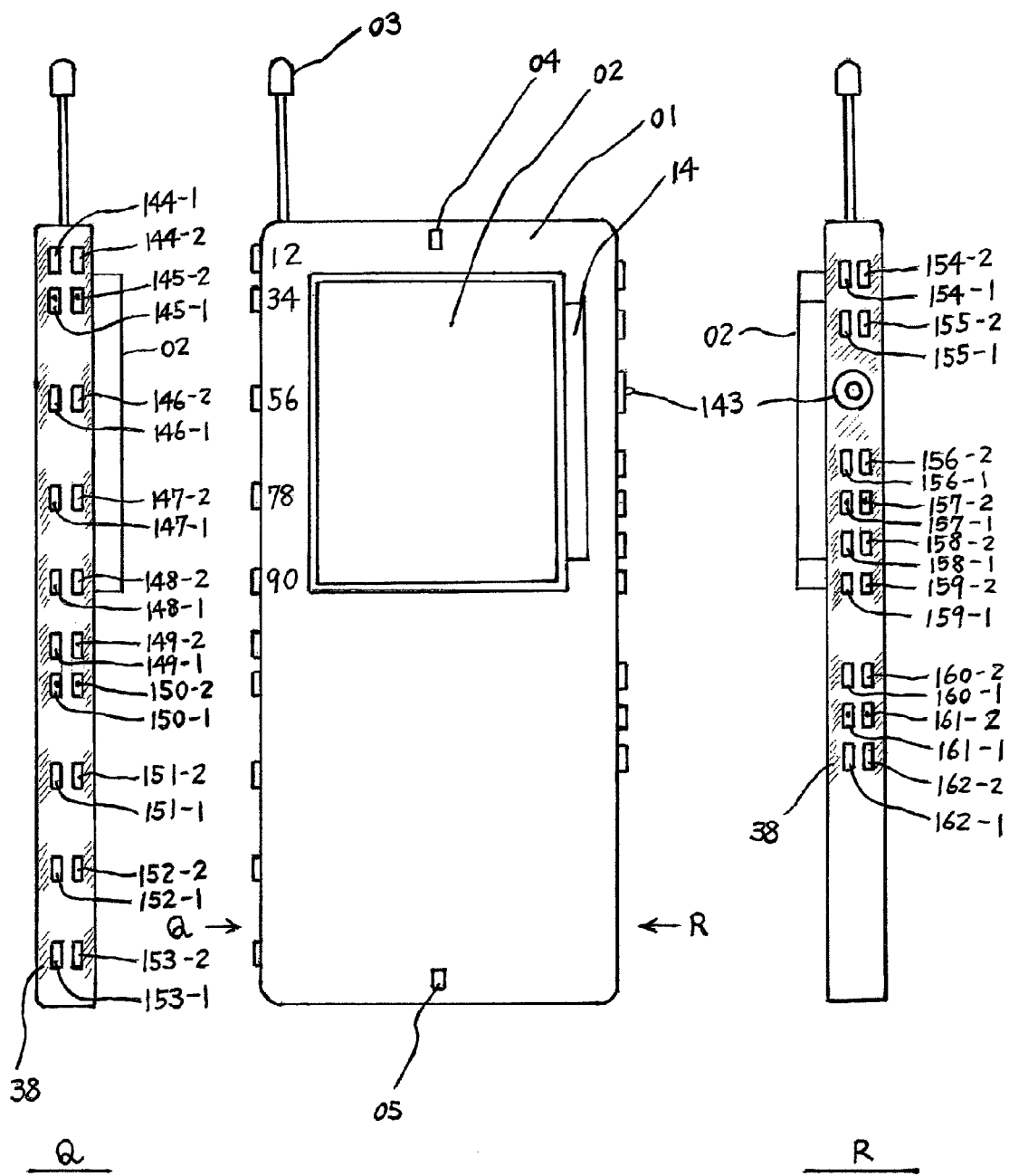
FIG. 26 illustrates one example of a super-high rate letter input device for a cell phone according to the present invention which can be held by both hands so that the ten fingers of both hands can be used for letter input.

FIG. 26 illustrates one example of a super-high rate letter input device for a cell phone according to the present invention which can be held by both hands so that the ten fingers of both hands can be used for letter input.

The cell phone according to the present invention includes: a main body 01; a display 02; an antenna 03; a loudspeaker 04; a microphone 05; a hinge mechanism 14; total of twenty left side face keys in ten rows and two columns 144-1, 144-2, 145-1, 145-2, 146-1, 146-2, 147-1, 147-2, 148-1, 148-2, 149-1, 149-2, 150-1, 150-2, 151-1, 151-2, 152-1, 152-2, 153-1, and 153-2, and on the right side face, a joy key 143; a power key 154-1; mode selector keys 154-2, 155-1, 155-2; total of fourteen right side face keys in seven rows and two columns 156-1, 156-2, 157-1, 157-2, 158-1, 158-2, 159-1, 159-2, 160-1, 160-2, 161-1, 161-2, 162-1, and 162-2, and a fingers rest 38 shown by the shaded area.

Figure 27:
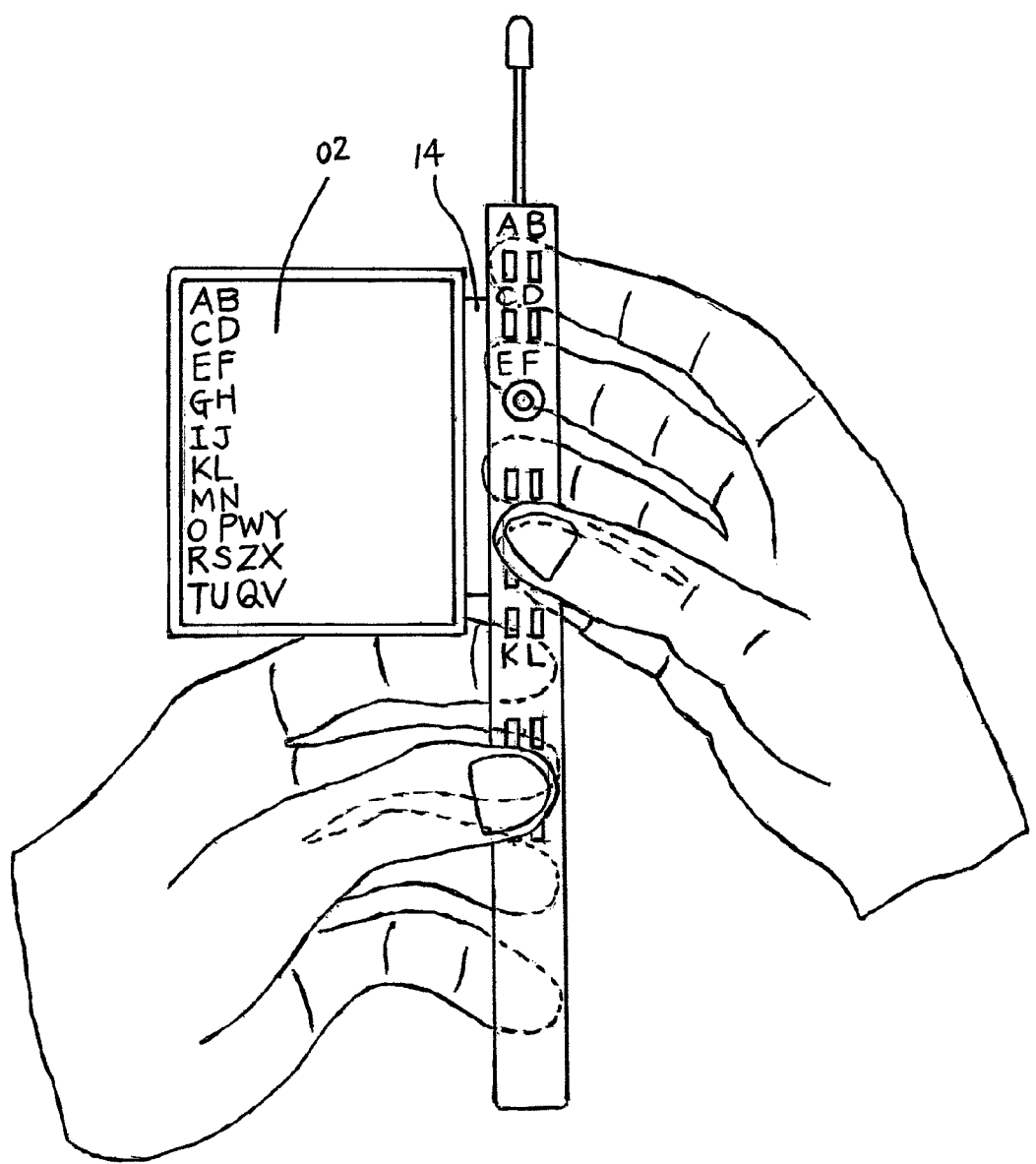
FIG. 27 illustrates the cell phone of FIG. 26 being inputted with letters.

FIG. 27 illustrates a schematic view of the cell phone of FIG. 26 which is being inputted with letters by the ten fingers of both hands.

FIG. 27 schematically illustrates the cell phone being held by both hands, wherein ten fingers of both hands are positioned at home positions of the letter input means.

In the method of holding the cell phone, the hands are placed naturally to give very little fatigue to a user while the user is operating the cell phone.

When the letter input means is inputted with letters by both hands, then the right side face of the letter input means shown in FIG. 26 is placed in front of the user. When the display 02 in the stored state shown in FIG. 26 is rotated around the hinge mechanism 14 by 90 degrees, then the display 02 is moved to a position as shown in FIG. 27.

FIG. 27 shows the cell phone held by a right-handed user. As can be seen from FIG. 27, the cell phone includes the joy key 143 and shift keys 156-1 and 156-2 operated by which the fast-moving right hand can perform a number of delicate tasks.

As shown in FIG. 27, the right hand thumb operates the joy key 143, two keys 156-1, and 156-2, on the front side face of the user; the right hand forefinger operates four keys 144-1, 144-2, 145-1, and 145-2 on the back side face to the user; the right hand middle finger operates two keys 146-1, and 146-2 on the back side face; the right hand fourth finger operates two keys 147-1, and 147-2 on the back side face; and right hand little finger operates two keys 148-1, and 148-2 on the back side face.

Similarly, the left hand thumb operates six keys 160-1, 160-2, 161-1, 161-2, 162-1, and 162-2, on the front side face of the user; the left hand forefinger operates four keys 149-1, 149-2, 150-1, and 150-2 on the back side face to the user; the left hand middle finger operates two keys 151-1, and 151-2 on the back side face; the left hand fourth finger operates two keys 152-1, and 152-2 on the back side face; and left hand little finger operates two keys 153-1, and 153-2 on the back side face.

When the right hand thumb does not push any key and the remaining nine fingers push any of twenty-six keys, then it is possible to input any of the twenty-six alphabetical lower cases from alphabet letters of "a" to "z". Then, when the right hand thumb pushes the key 156-2 and the remaining nine fingers push any of twenty-six keys, it is possible to input any of the twenty-six alphabetical capital letters from alphabet letters of "A" to "Z".

Similarly, any of ten numeric characters from 1, 2, . . . , 9, to 0 can be inputted when the right hand thumb pushes the key 156-1 and any of the keys 144-2, 144-1, 145-2, 145-1, 146-2, 146-1, 147-2, 147-1, 148-2, and 148-1 is pushed. The other remaining sixteen keys can be allocated to signs and functions required for inputting an English text (e.g., "BackSpace", "DEL", "ENT", ".", and ",")

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 143.

Thus, the present invention allows one key to have two roles (e.g., alphabet, numeric character, sign, or function), thereby allowing a user to perform touch typing with extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining seven letters can be allocated to such keys that are frequently used for Japanese language (e.g., keys responsible for """, "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In this way, the present invention can be applied to any language including English and Japanese so long as the language allows the conversion with twenty-six alphabet letters or other twenty-six characters.

When alphabet is used for input, a single key can be used for a pair of a capital letter and a lower case. This allows the fingers to learn the input system with an extreme ease, thus requiring the minimum period of time for performing a touch typing with the cell phone.

Specifically, the use of the present invention provides about twenty times faster letter input rate as compared to that obtained by a key layout using only one hand thumb for the letter input.

Naturally, in the case where a cell phone is used for a simple task of inputting a telephone number in which numeric characters of 1, 2, . . . , 9, 0, can be inputted when the right hand thumb pushes the key 156-1 and any of the keys is pushed as shown in FIG. 26.

The joy key 143 on the right side face has a main task of moving a cursor on the display 02 in the lateral and vertical directions. The joy key 143 also may be allocated for a task of conversion from "Hiragana" to "Kanji" and "Katakana" or other tasks when Japanese Kanji needs to be inputted.

The keys 157-1, 157-2, 158-1, and 158-2 can be used as a mode switch key for the switching between alphabetic characters and native language characters (e.g., "Hiragana" and "Katakana" of Japanese language, "Kanji" of China, and "Hangul character" of South Korea) or the switching between full size and half size.

How to reasonably allocate such letters that are used frequently to thumbs or forefingers which can move faster than other fingers so that the fastest letter input rate can be obtained will be described in other embodiments.

The following sections will describe only that the key layout according to the present invention can classify the keys for capital letters, the keys for lower cases, and the keys for numeric characters/function/sign so that faster letter input rate is obtained.

The keys 157-1, 157-2, 158-1, 158-2, 159-1, and 159-2 on the right side face are not necessary when English is inputted by both hands. Therefore, these key may be omitted or may be allocated to "BackSpace", "DEL", "ENT", ".", "," or the like for providing a faster input rate of an English text.

It is noted, however, that the use of the keys 157-1, 157-2, 158-1, 158-2, 159-1 and 159-2 as a mode switch key provides a faster Japanese input rate because of the fact that the input of Japanese language requires a total of seven types of characters (i.e., "Hiragana", "Katakana" of full size and half size, numeric characters of full size and half size, and sign of full size and half size).

The following section will describe another method for inputting letters with ten fingers of both hands according to the present invention.

In this method, the keys 160-1 and 161-1 are used as a shift key used by a left hand thumb; the keys 156-2 and 157-2 are used as a shift key used by a right hand thumb; and twenty keys are used as a letter key used by the remaining eight fingers. There are five shift modes including a key status in which no keys are pushed by thumbs of both hands. As a result, the calculation of 5×20 letters=100 letters is established. An increase of the shift keys to six allows the input of 140 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

Embodiment 9

Figure 28:
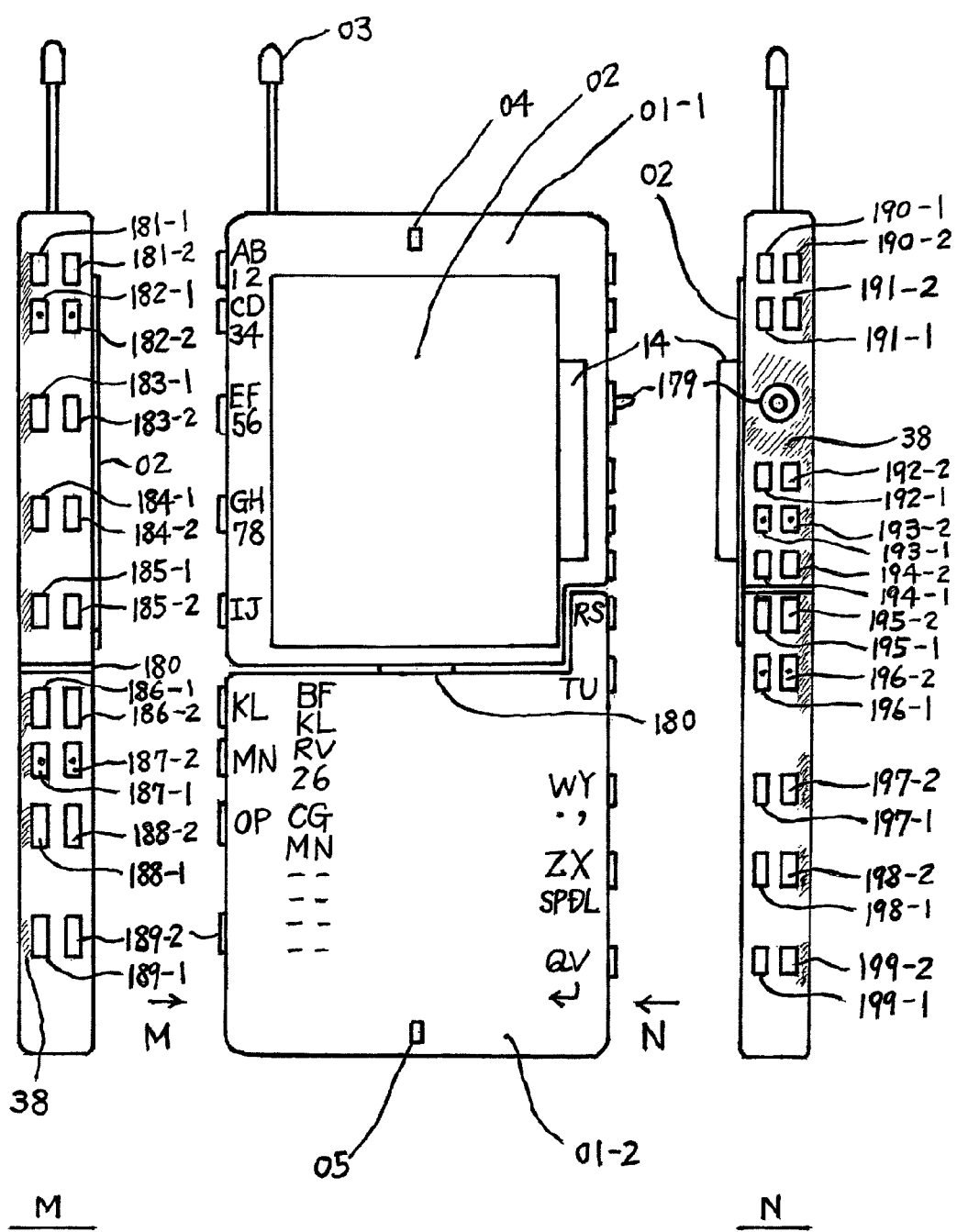
FIG. 28 illustrates another example of the super-high rate letter input device for a cell phone according to the present invention which can be held by both hands so that the ten fingers of both hands can be used for letter input, which letter input device causes less fatigue of the hands.

FIG. 28 illustrates another example of the super-high rate letter input device for a cell phone which can be held by both hands. The cell phone has two of upper and lower housings connected via a pivot.

When letters are inputted, the angle taken by the upper housing and the lower housing is fixed at a predetermined angle, or a few or successive angles so that the upper housing is twisted relative to the lower housing, such that the letter input device causes less fatigue of the hands.

The cell phone according to the present invention includes: a upper housing 01-1; a lower housing 01-2; a display 02; an antenna 03; a loudspeaker 04; a microphone 05; a hinge mechanism 14; a pivot 180; total of eighteen left side face keys in nine rows and two columns 181-1, 181-2, 182-1, 182-2, 183-1, 183-2, 184-1, 184-2, 185-1, 185-2, 186-1, 186-2, 187-1, 187-2, 188-1, 188-2, 189-1, and 189-2, and on the right side face, a joy key 179; total of twenty right side face keys in ten rows and two columns; a call key 190-1; a power key 190-2; mode selector keys 191-1, 191-2; keys 192-1, 192-2, 193-1, 193-2, 194-1, 194-2, 195-1, 195-2, 196-1, 196-2, 197-1, 197-2, 198-1, 198-2, 199-1, and 199-2, and a fingers rest 38 shown by the shaded area.

Figure 29:
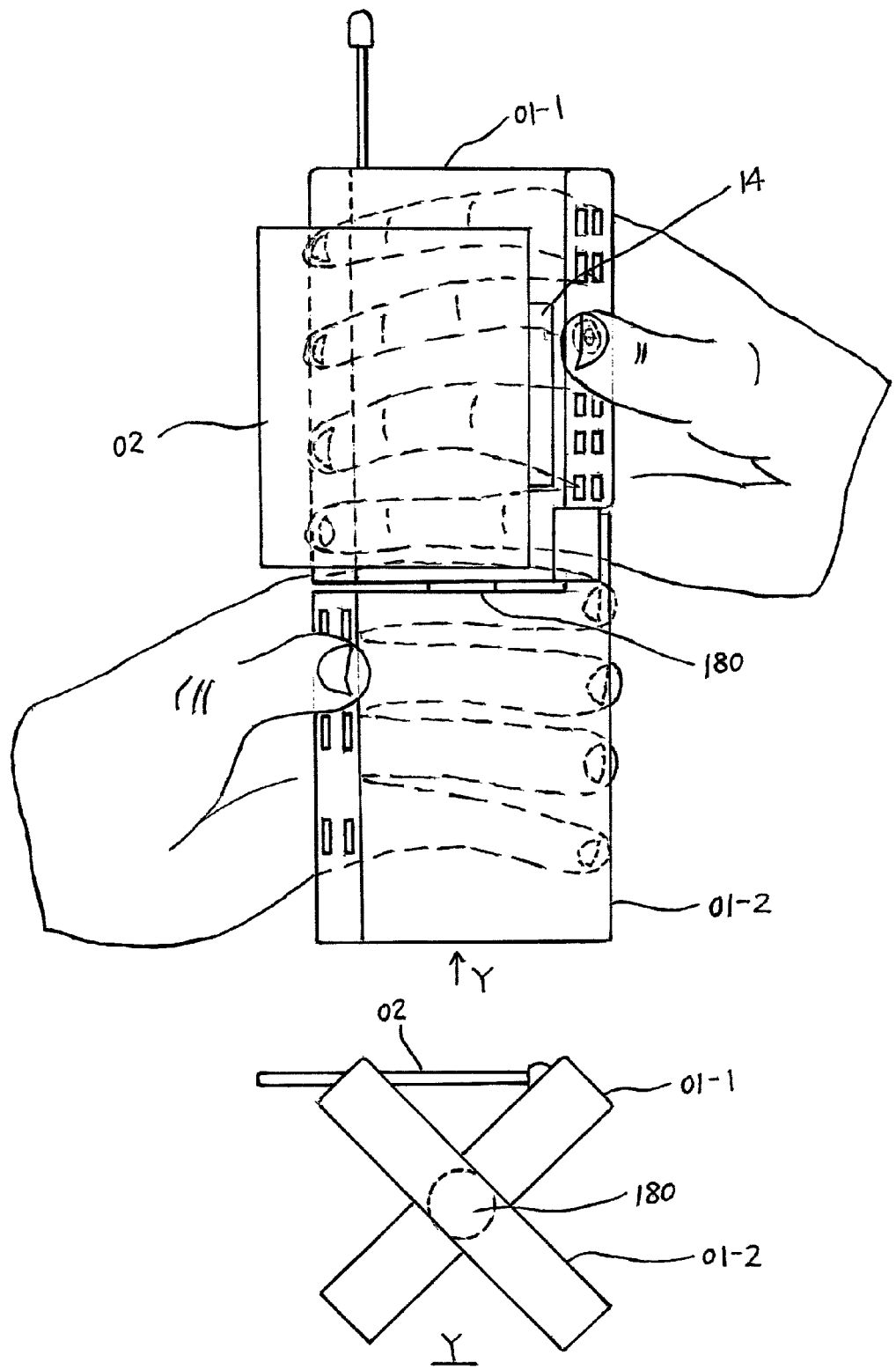
FIG. 29 illustrates a view of appearance of the cell phone of FIG. 28 being inputted with letters.

FIG. 29 shows that the upper housing 01-1 of the cell phone shown in FIG. 28 is rotated around the pivot 180 by 45 degrees in a counterclockwise direction seen from lower side of the cell phone and the lower housing 01-2 is rotated around the pivot 180 by 45 degrees in a clockwise direction seen from the lower side of the cell phone.

When the cell phone is used in which the upper housing 01-1 is rotated by about 80 degrees in the same direction and the lower housing 01-2 is rotated by about 80 degrees in the same direction, then fatigue of the hands of the user is reduced. The cell phone is designed to be fixed at a specific angle.

The display 02 is designed to be rotated by the same angle as that of the rotation angle of the upper housing 01-1 around the hinge mechanism 14 in the opposite direction. Thus, the display 02 can be adjusted to be always placed in front of the user.

FIG. 29 illustrates a schematic view of the cell phone of FIG. 28 which is being inputted with letters by the ten fingers of both hands.

FIG. 29 schematically illustrates the cell phone being held by both hands, wherein ten fingers of both hands are positioned at home positions of the letter input means.

FIG. 29 shows the cell phone held by a right-handed user.

As shown in FIG. 29, the right hand thumb operates the joy key 179, keys 190-1, 190-2, 191-1, 191-2, 192-1, 192-2, 193-1, 193-2, 194-1 and 194-2 on the right side face; the right hand forefinger operates four keys 181-1, 181-2, 182-1, and 182-2 on the left side; the right hand middle finger operates two keys 183-1, and 183-2 on the left side face; the right hand fourth finger operates two keys 184-1, and 184-2 on the left side face; and right hand little finger operates two keys 185-1, and 185-2 on the left side face.

Similarly, the left hand thumb operates eight keys 186-1, 186-2, 187-1, 187-2, 188-1, 188-2, 189-1, and 189-2, on the left side face; the left hand forefinger operates four keys 195-1, 195-2, 196-1, and 196-2 on the right side face of the user; the left hand middle finger operates two keys 197-1, and 197-2 on the right side face; the left hand fourth finger operates two keys 198-1, and 198-2 on the right side face; and left hand little finger operates two keys 199-1, and 199-2 on the right side face.

When the right hand thumb does not push any key and the remaining nine fingers push any of twenty-six keys, 181, 182, 183, 184, 185, 186, 187, 188, 195, 196, 197, 198, and 199 in thirteen rows and 2 columns, then it is possible to input any of the twenty-six alphabetical lower cases from alphabet letters of "a" to "z". Then, when the right hand thumb pushes the key 191-2 and the remaining nine fingers push any of twenty-six keys, it is possible to input any of the twenty-six alphabetical capital letters from alphabet letters of "A" to "Z".

Similarly, any of ten numeric characters from 1, 2, . . . , 9, to 0 can be inputted when the right hand thumb pushes the key 192-1 and any of the keys 181-2, 181-1, 182-2, 182-1, 183-2, 183-1, 184-2, 184-1, 185-2, and 185-1 is pushed. The other remaining sixteen keys can be allocated to signs and functions required for inputting an English text (e.g., "BackSpace", "DEL", "ENT", ".", and ",").

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 179.

Thus, the present invention allows one key to have two roles (e.g., alphabet, numeric character, sign, or function), thereby allowing a user to perform touch typing with extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining seven letters can be allocated to such keys that are frequently used for Japanese language (e.g., keys responsible for "", "○", "RET", "DEL", "Space", and "BackSpace", or keys responsible for the collection of special characters). This allows all "Hiragana" to be continuously inputted without pushing the mode switch key and also allows the right hand thumb to always stay at the joy key 179 so that the right hand thumb can be exclusively used for "Kanji (Chinese character)" conversion, thereby providing a super-high rate letter input.

In this way, the present invention can be applied to any language including English and Japanese so long as the language allows the conversion with twenty-six alphabet letters or other twenty-six characters.

The joy key 179 on the right side face has a main task of moving a cursor on the display 02 in the lateral and vertical directions. The joy key 179 also may be allocated for a task of conversion from "Hiragana" to "Kanji" and "Katakana" or other tasks when Japanese Kanji needs to be inputted.

The keys 193-1, 193-2, 194-1, and 194-2 can be used as a mode switch key for the switching between alphabetic characters and native language characters (e.g., "Hiragana" and "Katakana" of Japanese language, "Kanji" of China, and "Hangul characters" of South Korea) or the switching between full size and half size.

How to reasonably allocate such letters that are used frequently to thumbs or forefingers which can move faster than other fingers so that the fastest letter input rate can be obtained will be described in other embodiments.

The following sections will describe only that the key layout according to the present invention can classify the keys for capital letters, the keys for lower cases, and the keys for numeric characters/function/sign so that faster letter input rate is obtained.

The keys 189-1 and 189-2 on the left side face are conveniently used for certain languages if 28 characters can be inputted without the switching of the shift key.

The present letter input means also can be used for the letter input only by a right hand when only one hand is available for the letter input (e.g., when a user hangs on a strap in a train, as shown in FIG. 28).

In this case, the keys 189-1 and 189-2 are used for inputting letters. The details of the use method are the same as those described in Embodiment 5 and thus will not be further described.

Although the present method has a limitation, it is convenient as compared to the letter input only by one thumb.

Embodiment 10

Figure 36:
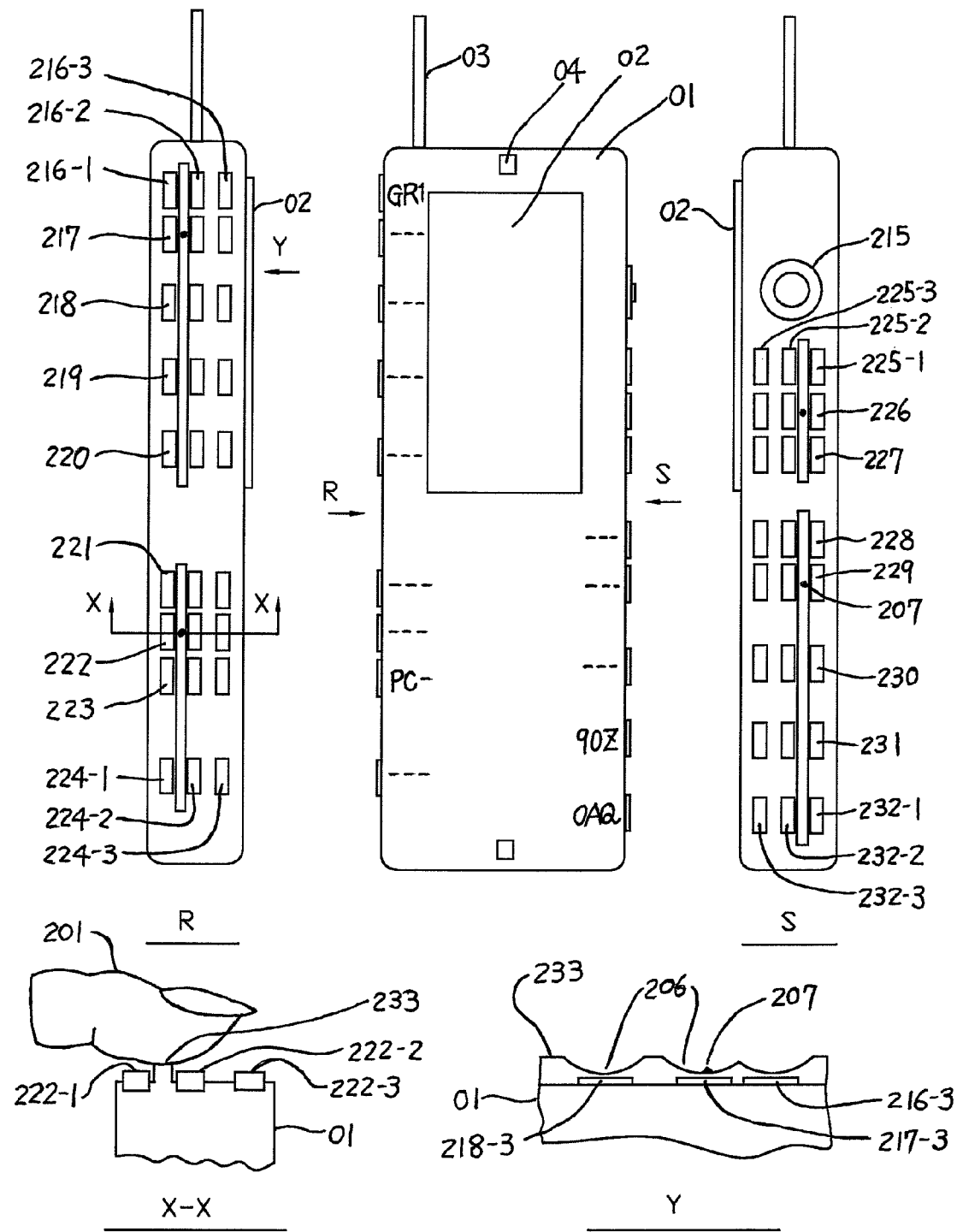
FIG. 36 illustrates an exemplary cell phone according to the present invention which is held by both hands so that the fingers of both hands can be used for letter input.

FIG. 36 illustrates one example of a super-high rate letter input device for a cell phone according to the present invention which can be held by both hands so that the ten fingers of both hands can be used for letter input.

The cell phone according to the present invention includes: a main body 01; a display 02; an antenna 03; a loudspeaker 04; a microphone 05; left side face keys consists of such as 216-1, 216-2, 216-3 in one row and three columns; total of twenty-seven keys in nine rows and three columns 217, 218, 219, 220, 221, 222, 223 and 224, and on right side face, a joy key 215; total of twenty-four keys in eight rows and three columns 225, 226, 227, 228, 229, 230, 231 and 232, and a frame 233 for fingers rest.

Figure 37:
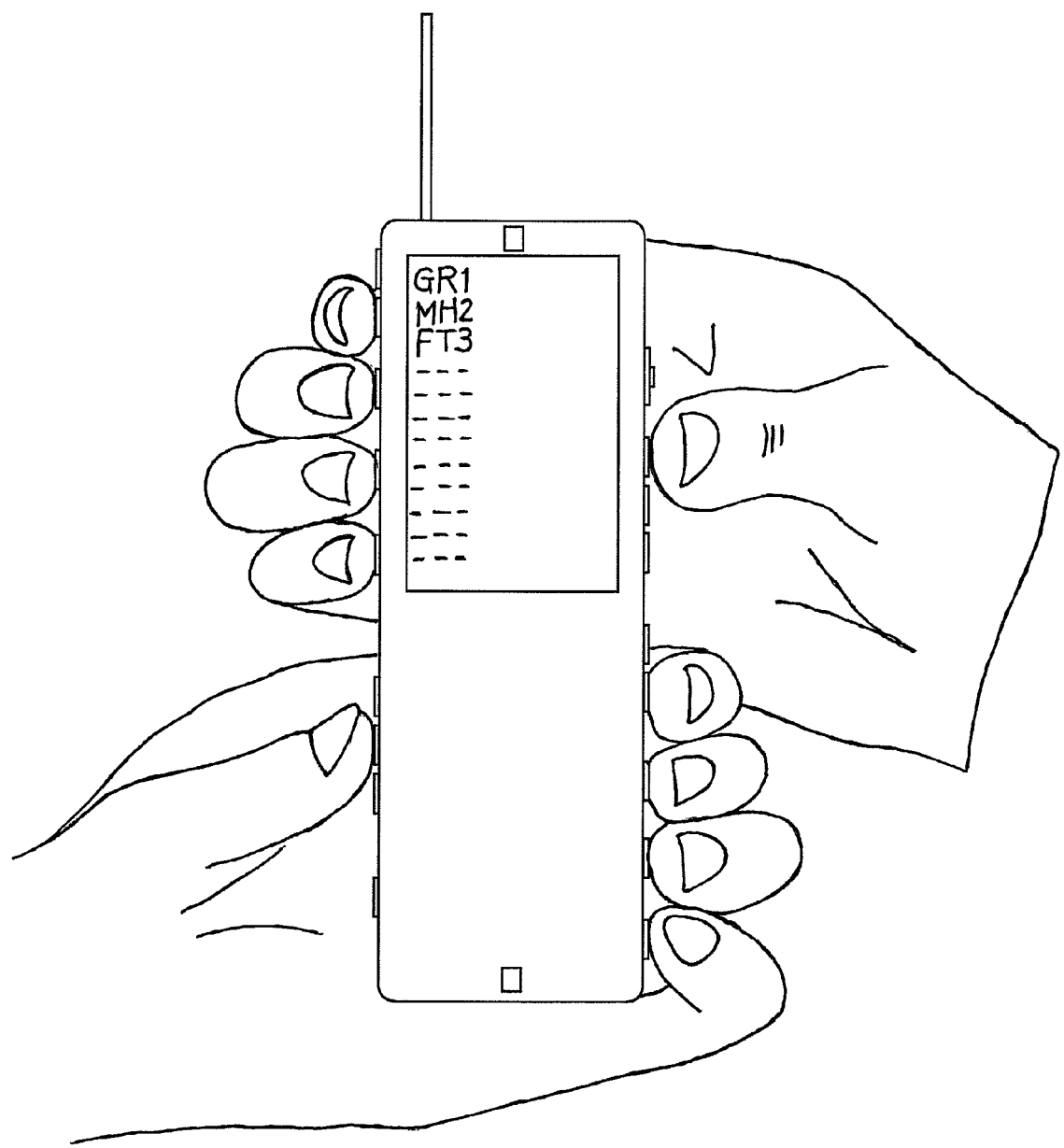
FIG. 37 illustrates a view of appearance of the cell phone of FIG. 36 being inputted with letters.

FIG. 37 illustrates a schematic view of the cell phone of FIG. 36 which is being inputted with letters by the ten fingers of both hands.

FIG. 37 schematically illustrates the cell phone being held by both hands, wherein ten fingers of both hands are positioned at home positions of the letter input means.

As shown in FIG. 37, the right hand thumb operates the joy key 215, nine keys in three rows and three columns 225, 226 and 227 on the right side face; the right hand forefinger operates six keys in two rows and three columns 216 and 217 on the left side face; the right hand middle finger operates three keys of 218; the right hand fourth finger operates three keys of 219; the right hand little finger operates three keys of 220; on the left side face.

Similarly, the left hand thumb operates twelve keys in four rows and three columns 221, 222, 223 and 224 on the left side face; the left hand forefinger operates six keys in two rows and three columns 228 and 229 on the right side face; the left hand middle finger operates three keys of 230; the left hand fourth finger operates three keys of 231; the left hand little finger operates three keys of 232; on the right side face.

When the right hand thumb does not push any key and the remaining nine fingers push any of the thirty-nine keys except for the three keys 224-1, 224-2, 224-3, then it is possible to input any of the twenty-six lower case alphabet letters from "a" to "z" and ten numeric characters and three characters. Then, when the right hand thumb pushes the key 225-2 and the remaining nine fingers push any of the thirty-nine keys, it is possible to input any of the twenty-six capital alphabet letters from "A" to "Z" and the other thirteen characters. When the right hand thumb pushes the key 225-1 one more time, it is possible to input any of the other thirty-nine characters.

In this figure, there are shown about 39 keys. This number is sufficient so that there is no problem if keys that are difficult push by forefingers which have to operate a number of keys (e.g., keys 216-3 and 228-3) and keys that are difficult to push by little fingers which have difficulty in moving (e.g., keys 224-3 and 232-3) are omitted to reduce the number of keys so that other keys are substituted for the letter input. Therefore, even if the number of keys is increased or decreased by about four, the number will be included in the scope of the present invention so long as the keys to be used are provided in three columns.

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 215.

Thus, the present invention allows one key to have two roles (e.g., alphabet, numeric character, sign, or function), thereby allowing a user to perform touch typing with an extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of Japanese language. As a result, the remaining twenty letters can be allocated to such keys that are frequently used for Japanese language (e.g., keys responsible for "″", "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In this way, the present invention can be applied to any language including English and Japanese so long as the language allows the conversion with thirty-nine characters.

The joy key 215 on the right side face has a main task of moving a cursor on the display 02 in the lateral and vertical directions. The joy key 215 also may be allocated for a task of conversion from "Hiragana" to "Kanji" and "Katakana" or other tasks when Japanese Kanji needs to be inputted.

By switching modes by the joy key 215, a native language input mode can be selected to use the three keys of 225 as a shift key for a native language (e.g., "Hiragana" and "Katakana" for Japanese language, "Kanji" for China, and "Hangul characters" for South Korea) and to use the three keys of 226 as a shift key for English. This allows the input of English only by the operation of the shift key without switching modes while a native language other than English is inputted.

It is also possible to use in the native language input mode the keys 225-1 and 225-2 as a shift key so that about 39 keys are used for the direct input of 51 character-Japanese syllabary without the input of Roman characters.

In this way, the present invention can be applied to any language including English and Japanese so long as the language allows the conversion with twenty-six alphabet letters or thirty-nine characters.

When alphabet is used for input, a single key can be used for a pair of a capital letter and a lower case. This allows the fingers to learn the input system with an extreme ease, thus requiring the minimum period of time for performing a touch typing with the cell phone.

Specifically, the use of the present invention provides about twenty times faster letter input rate as compared to that obtained by a key layout using only one hand thumb for the letter input.

Figure 44:
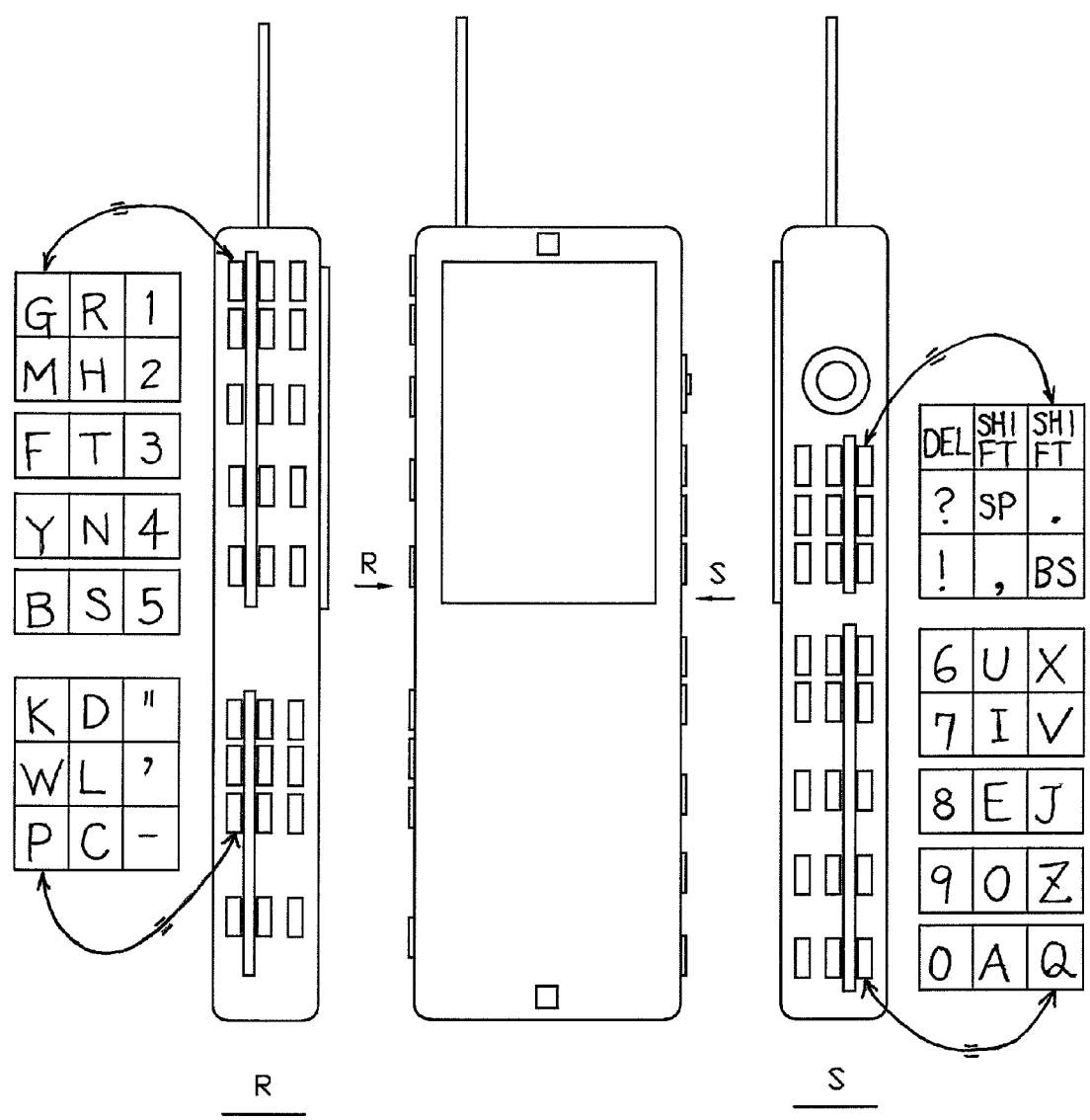
FIG. 44 illustrates the allocation according to the concept of the present invention of the letters to the keys of the cell phone of FIG. 36.

Naturally, the present letter input means also can be simply used as a cell phone by which a telephone number can be inputted with one hand. In this case, the right hand thumb pushes the key 225-1 simultaneously with the push of any key in the first and second columns in the group of the keys 216, 217, 218, 219, and 220 as shown in FIG. 44, thereby providing the input of numeric characters 1, 2, . . . , 9, and 0.

How to reasonably allocate such characters that are used frequently to thumbs or forefingers which can move faster than other fingers so that the fastest letter input rate can be obtained will be described in other embodiments. The following sections will describe only that the key layout according to the present invention can classify the keys for capital letters, the keys for lower cases, and the keys for numeric characters/function/sign so that faster letter input rate is obtained.

The three keys 224 on the left side face are provided at optimal positions which have a contact with the little finger of a right hand so that these three keys are used only in the one hand mode.

The present letter input means also can be used for such a language that is represented with 42 characters by allowing the three keys 224 to be allocated with characters for both hands mode.

Seven of the keys 225-3, 226, and 227 on the right side face are not necessary when English is inputted by both hands. Therefore, these key may be omitted or may be allocated to "BackSpace", "DEL", "ENT", ".", ",", or the like for providing a faster input rate of an English text.

The following section will describe another method for inputting letters with ten fingers of both hands according to the present invention.

In this method, the key 222-2 is used as a shift key used by a left hand thumb; the key 225-2 is used as a shift key used by a right hand thumb; and thirty keys are used as a letter key used by the remaining eight fingers. There are three shift modes including a key status in which no keys are pushed by thumbs of both hands. As a result, the calculation of 3×30 letters=90 letters is established. An increase of the shift keys to four allows the input of 150 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

When a user can use both hands, then the key layout is used as shown in FIG. 37. When a user can use only one hand (e.g., when a user hangs on a strap in a train), then the user pushes the key 227-3 one time to switch to the one hand mode. When the user pushes the switch 227-3 one more time, then the user can use both hand mode. The mode also may be switched by the joy key 215.

Figure 38:
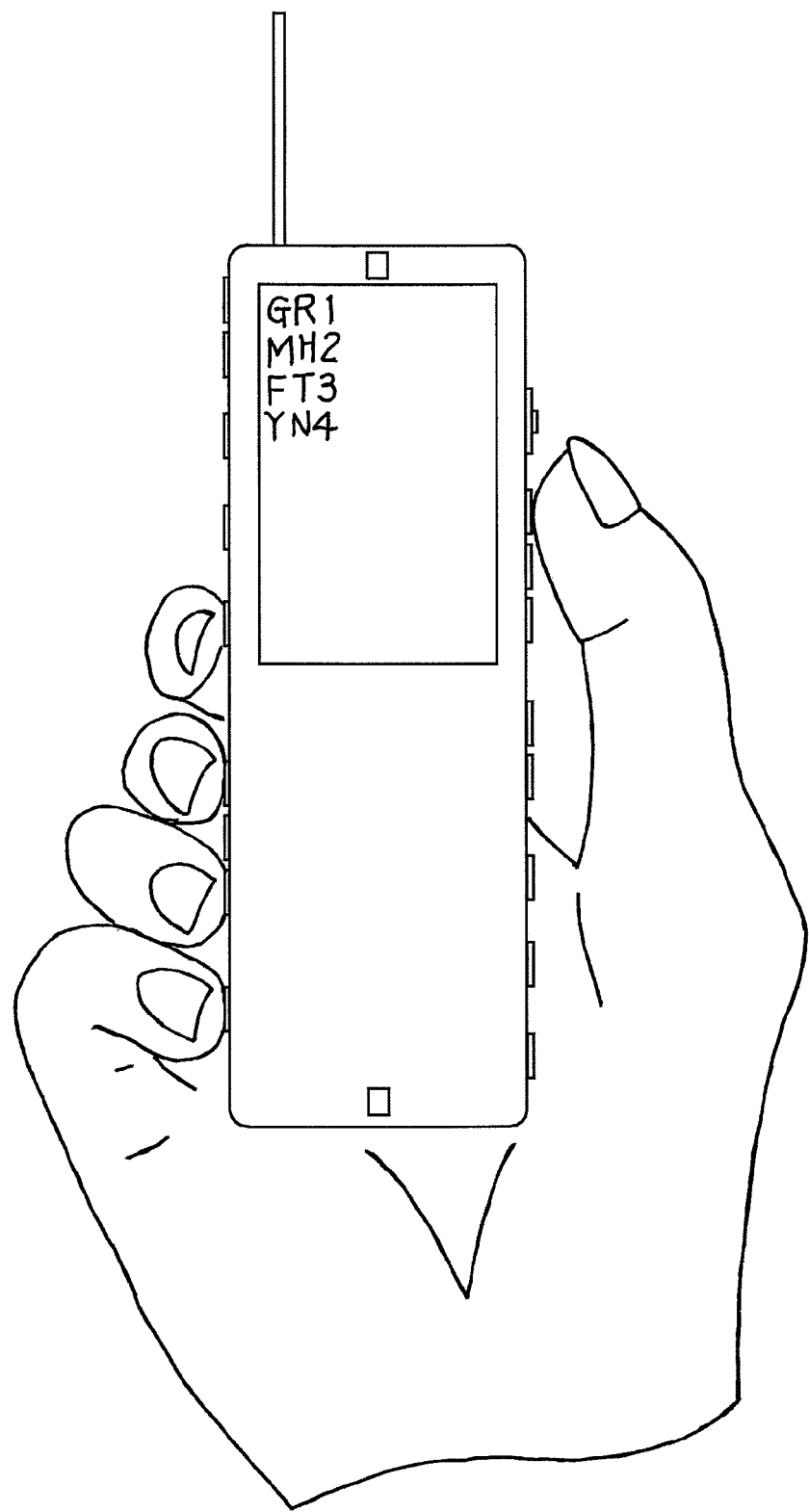
FIG. 38 shows a view in which the cell phone according to the present invention of FIG. 36 is being used with the one hand mode.

FIG. 38 illustrates the cell phone of FIG. 36 according to the present invention which is being used with the right hand mode.

FIG. 38 schematically illustrates the letter input means being held by a right hand, wherein the five fingers of the right hand are always placed at the home positions of the letter input means.

The one hand mode herein means a mode where the twelve left side face keys in four rows and three columns 220, 221, 223, and 224; the joy keys 215, and the six keys on the right side face 225-1, 225-2, 226-1, 226-2, 227-1, and 227-2 are provided with the right of controlling the input of letters; and the remaining fifteen keys in five rows and three columns on the left side face 216, 217, 218, 219, and 222, and the eighteen keys on the right side face 225-3, 226-3, 227-3, 228, 229, 230, 231 and 232 are disabled.

In FIG. 38, every three keys on the left side face are allocated to a forefinger, a middle finger, a fourth finger, and a little finger. The reason is that the mechanism shown in FIG.

36 in which a frame provided between keys is higher than the keys allows the user holding the cell phone with the right hand to input letters to the cell phone so that these four fingers can differentiate the allocated three keys to press an appropriate key. The right hand thumb provides a delicate differentiation and thus is allocated with a number of keys. Even in the one hand mode, at least about four times faster letter input rate than that obtained by a key layout using only a one hand thumb can be afforded.

In the one hand mode, the right hand thumb on the right side is used to obtain six key combinations by each of the keys and one combination by pushing no keys (total of seven combinations). The left side face has twelve keys, thereby establishing the calculation of 7×12 to allow a total of 84 characters to be inputted.

For inputting English which generally includes numeric characters, it is sufficient to provide 80 characters by key combinations and thus the mode switch key is not required to be switched frequently.

In FIG. 36, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIGS. 37 and 38 show the cell phone of FIG. 36 having on the display thereof letters inputted corresponding to the keys selected by the thumbs in order to show the letters corresponding to the keys selected by the mode keys and the thumbs. When a user pushes the key 216-1 on the top of the left side face while the display is as shown in FIG. 37, for example, then an alphabet letter of "G" on the left top of the display can be inputted. When the thumb selects another key, then the details of a letter indicated on the display are changed accordingly. The exemplary cell phone shown in FIG. 38 is in the one hand mode and thus has twelve keys on the left side face, thereby allowing the display to indicate twelve letters. Any of the above key layouts allows a user to utilize efficiently the guidance of input of keys in a small display of the cell phone.

Embodiment 11

Figure 39:
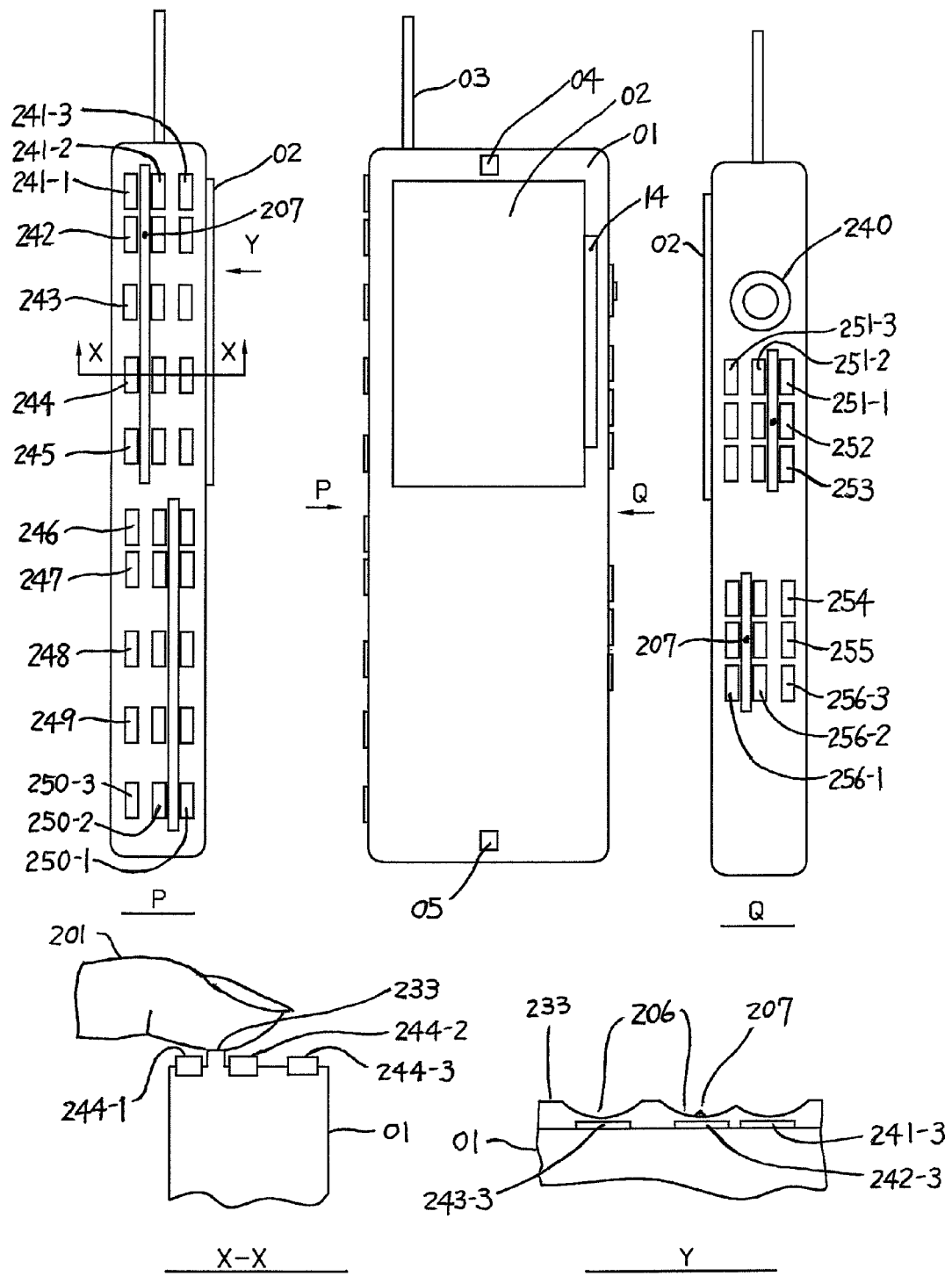
FIG. 39 illustrates another example of the super-high rate letter input device for a cell phone according to the present invention which can be held by both hands so that the ten fingers of both hands can be used for letter input, which causes less fatigue of the hands.

FIG. 39 illustrates one example of a super-high rate letter input device for a cell phone according to the present invention which can be held by both hands so that the ten fingers of both hands can be used for letter input.

The cell phone according to the present invention includes: a main body 01; a display 02; an antenna 03; a loudspeaker 04; a microphone 05; a hinge mechanism 14; left side face keys consists of such as 241-1, 241-2, 241-3 in one row and three columns; total of thirty keys in ten rows and three columns 242, 243, 244, 245, 246, 247, 248, 249 and 250, and on right side face, a joy key 240; total of eighteen keys in six rows and three columns 251, 252, 253, 254, 255 and 256, and a frame 233 for fingers rest.

Figure 40:
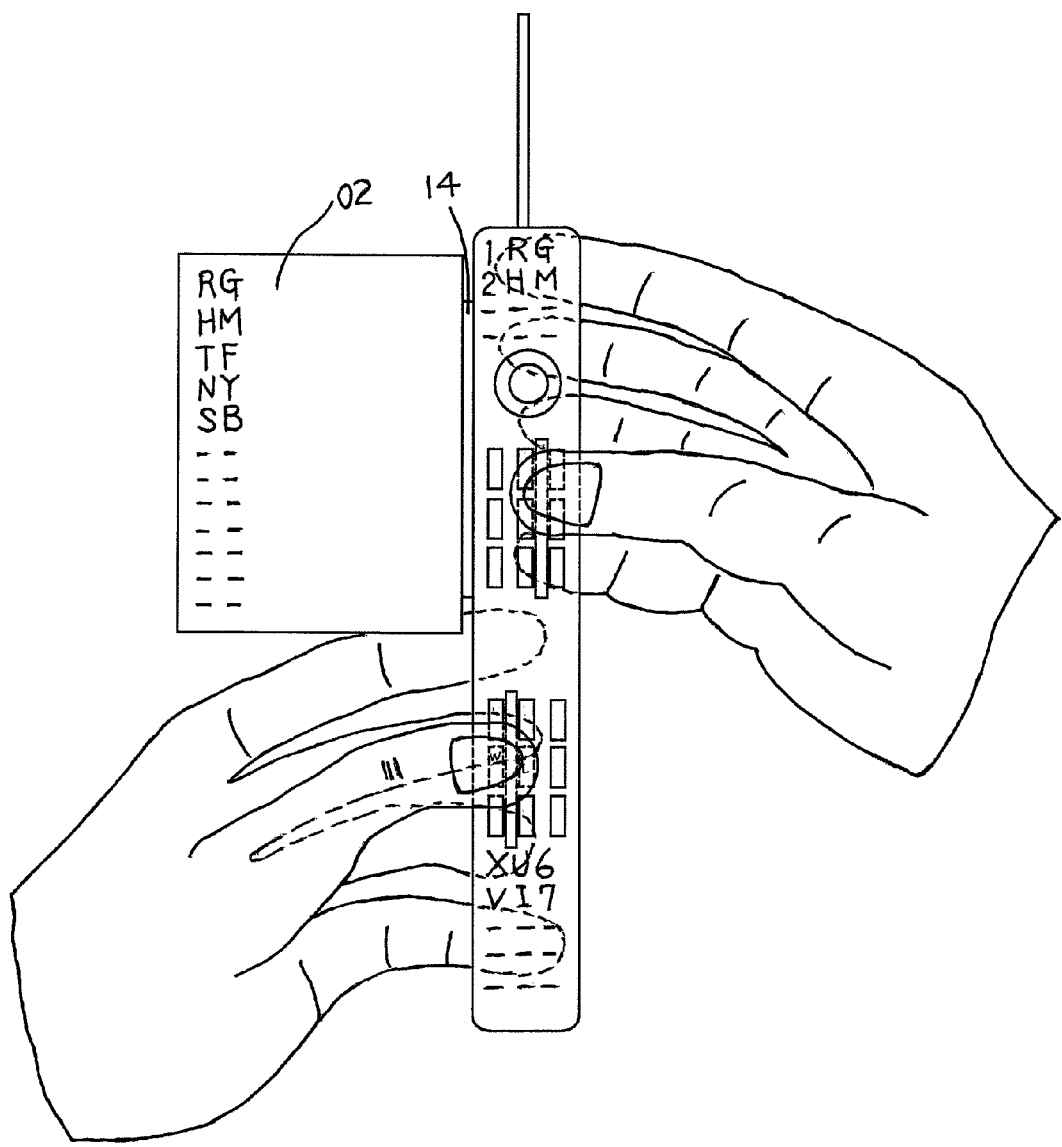
FIG. 40 illustrates a view of appearance of the cell phone of FIG. 39 being inputted with letters.

FIG. 40 schematically illustrates the cell phone being held by both hands, wherein ten fingers of both hands are positioned at home positions of the letter input means.

In the method of holding the cell phone, the hands are placed naturally to give very little fatigue to a user while the user is operating the cell phone.

When the cell phone is used for the input by both hands, then the right side face shown in FIG. 39 is moved to a position in front of a user. When the display 02 positioned as shown in FIG. 39 is rotated by 90 degrees around the hinge mechanism 14 and then the display 02 as shown in FIG. 40 is obtained.

FIG. 40 illustrates the appearance of the cell phone being used and having a structure convenient for the right-handed user.

As can be seen from FIG. 40, the cell phone includes the joy key 240 and shift keys 251-2 and 251-1 operated by which the fast-moving right hand thumb can perform a number of delicate tasks.

This cell phone also can be sufficiently used for the left-handed user.

As shown in FIG. 40, the right hand thumb operates the joy key 240, nine keys in three rows and three columns 251, 252 and 253 on the front side face of the user; the right hand forefinger operates six keys of 241 and 242 on the back side face to the user; the right hand middle finger operates three keys of 243 on the back side face; the right hand fourth finger operates three keys of 244 on the back side face; and right hand little finger operates three keys of 245 on the back side face.

Similarly, the left hand thumb operates nine keys 254, 255 and 256 on the front side face of the user; the left hand forefinger operates six keys 246 and 247 on the back side face to the user; the left hand middle finger operates three keys 248 on the back side face; the left hand fourth finger operates three keys 249 on the back side face; and left hand little finger operates three keys 250 on the back side face.

When the right hand thumb does not push any key and the remaining nine fingers push any of thirty-nine keys, then it is possible to input any of the twenty-six alphabetical lower cases from alphabet letters of "a" to "z" and ten numeric characters and three characters. Then, when the right hand thumb pushes the key 251-2 and the remaining nine fingers push any of thirty-nine keys, it is possible to input any of the twenty-six alphabetical capital letters from alphabet letters of "A" to "Z" and the other thirteen characters.

When the right hand thumb pushes the key 251-1 one more time and it is possible to input any of the other thirty-nine characters.

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the-key and then a number of special signs can be subsequently inputted by repeatedly moving the joy key 240.

When alphabet is used for input, a single key can be used for a pair of a capital letter and a lower case. This allows the fingers to learn the input system with an extreme ease, thus requiring the minimum period of time for performing a touch typing with the cell phone.

In other words, the letter input rate is at least about twenty times faster than that obtained by a key layout requiring the input by one hand thumb.

Thus, the present invention allows one key to have two roles (e.g., alphabet, numeric character, sign, or function), thereby allowing a user to perform touch typing with extreme ease.

As described above, the present invention does not require the user to switch the keys on the right side face which are operated by the right hand thumb to input the twenty-six alphabet letters. Such a characteristic also provides a revolutionary advantage when Japanese language is inputted with the Roman character input method. Specifically, a Roman character input method for Japanese language does not use the seven alphabet letters of "C", "F", "J", "L", "Q", "V", and "X" and thus allows nineteen alphabet letters to be used for the input of "Kana characters" of the Japanese language. As a result, the remaining twenty letters can be allocated to such keys that are frequently used for Japanese language (e.g., keys responsible for ", ", "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In this way, the present invention can be applied to any language including English and Japanese so long as the language allows the conversion with thirty-nine characters.

The joy key 240 on the right side face has a main task of moving a cursor on the display 02 in the lateral and vertical directions. The joy key 240 also may be allocated for a task of conversion from "Hiragana" to "Kanji" and "Katakana" or other tasks when Japanese Kanji needs to be inputted. By switching modes by the joy key 240, a native language input mode can be selected to use the three keys of 251 as a shift key for a native language (e.g., "Hiragana" and "Katakana" for Japanese language, "Kanji" for China, and "Hangul characters" for South Korea) and to use the three keys of 252 as a shift key for English. This allows the input of English only by the operation of the shift key without switching modes while a native language other than English is inputted.

Seven of the keys 251-3, 252, and 253 on the right side face are not necessary when English is inputted by both hands. Therefore, these key may be omitted or may be allocated to "BackSpace", "DEL", "ENT", ",", "." or the like for providing a faster input rate of an English text.

How to reasonably allocate such characters that are used frequently to thumbs or forefingers which can move faster than other fingers so that the fastest letter input rate can be obtained will be described in other embodiments. The following sections will describe only that the key layout according to the present invention can classify the keys for capital letters, the keys for lower cases, and the keys for numeric characters/function/sign so that faster letter input rate is obtained.

The following section will describe another method for inputting letters with ten fingers of both hands according to the present invention.

In this method, the key 255-2 is used as a shift key used by a left hand thumb; the key 251-2 is used as a shift key used by a right hand thumb; and thirty keys are used as a letter key used by the remaining eight fingers. There are three shift modes including a key status in which no keys are pushed by thumbs of both hands. As a result, the calculation of 3×30 letters=90 letters is established. An increase of the shift keys to four allows the input of 150 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

When both hands are available, the cell phone is used as shown in FIG. 40. When only one hand is available (e.g., a user hangs on a strap in a train), then the user can push the key 253-3 one time to switch to the one hand mode. When the user pushes the key 253-3 one more time, then the one hand mode switches to both hands mode. This switching from the one hand mode to both hands mode also may be performed by the joy key 240.

Figure 41:
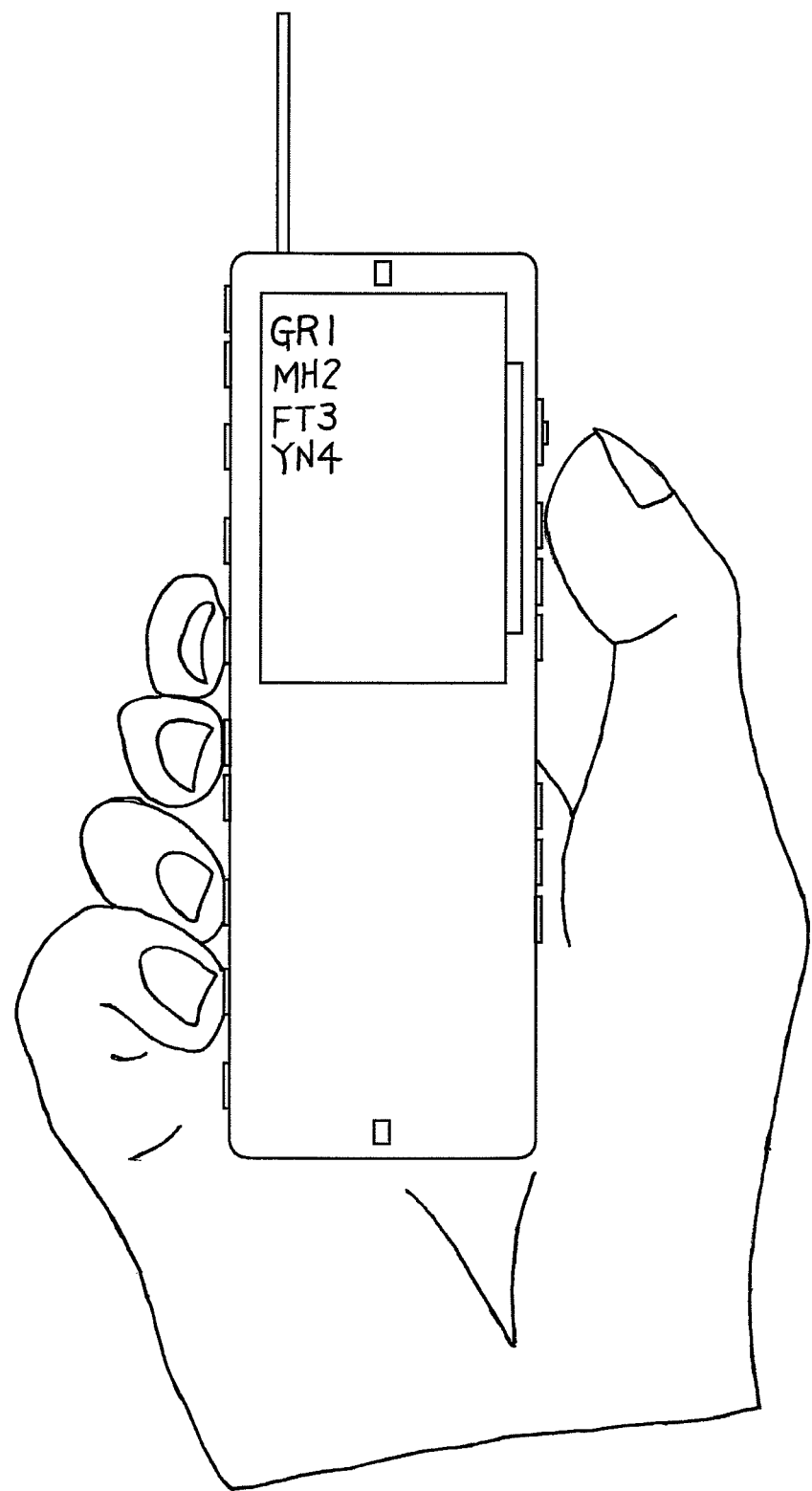
FIG. 41 shows a view in which the cell phone according to the present invention of FIG. 39 is being used with the one hand mode.

FIG. 41 shows a view in which the cell phone according to the present invention of FIG. 39 is being used with the right hand mode.

FIG. 41 schematically illustrates the letter input means being held by a right hand, wherein the five fingers of the right hand are always placed at the home positions of the letter input means.

The one hand mode herein means a mode where the twelve left side face keys in four rows and three columns 245, 246, 248, and 249; the joy keys 240, and the six keys on the right side face 251-1, 251-2, 252-1, 252-2, 253-1, and 253-2 control the input of letters; and the remaining eighteen keys in six rows and three columns on the left side face 241, 242, 243, 244, 247 and 250, and the twelve keys on the right side face 251-3, 252-3, 253-3, 254, 255 and 256 are disabled. control the input of letters; and the remaining eighteen keys in six rows and three columns on the left side face 241, 242, 243, 244, 247 and 250, and the twelve keys on the right side face 251-3, 252-3, 253-3, 254, 255 and 256 are disabled.

In FIG. 41, every three keys on the left side face are allocated to a forefinger, a middle finger, a fourth finger, and a little finger. The reason is that the mechanism shown in the X-X section of FIG. 39 in which a frame provided between keys is higher than the keys allows the user holding the cell phone with the right hand to input letters to the cell phone so that these four fingers can differentiate the allocated three keys to press an appropriate key. The right hand thumb provides a delicate differentiation and thus is allocated with a number of keys. Even in the one hand mode, at least about a four times faster letter input rate than that obtained by a key layout using only a one hand thumb can be obtained.

In the one hand mode, the right hand thumb for the right side face is used for a total of six keys. This means that the right hand thumb can select a total of seven key combinations including six combinations in which each of the six keys is pushed and one combination in which no keys are pushed. Since there are twelve keys on the left side face, a calculation of the 7 combinations×twelve is established and thus a total of 84 characters can be inputted.

In the case of an English text generally including numeric characters, key combinations providing 72 characters are sufficient for the input of English and thus no mode switch key is less frequently required. When the key 251-3 or the like which is not used only during the one hand mode is specified as a mode switch key, then the number of imputable letters can be increased easily.

In FIG. 39, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIGS. 40 and 41 show the cell phone of FIG. 39 having on the display thereof letters inputted corresponding to the keys selected by the thumbs in order to show the letters corresponding to the keys selected by the mode keys and the thumbs. When a user pushes the key 241-1 on the top of the left side face while the display is as shown in FIG. 40, for example, then an alphabet letter of "G" on the right top of the display can be inputted. When the thumb selects another key, then the details of a letter indicated on the display are changed accordingly. The exemplary cell phone shown in FIG. 41 is in the one hand mode and thus has twelve keys on the left side face, thereby allowing the display to indicate twelve letters.

Any of the above key layouts allows a user to utilize efficiently the guidance of input of keys in a small display of the cell phone.

Embodiment 12

FIG. 42 illustrates another example of a super-high rate letter input device for a cell phone according to the present invention which can be held by both hands so that ten fingers of both hands can be used for letter input.

This letter input means is characterized in that two housings provided at right and left are connected. This cell phone can be folded like a book in the left-and-right direction. This letter input means has two displays provided at the left and right sides and can be used as both of an electronic databook and a cell phone by which a number of pieces of letter information or the like can be recognized at one glance and characters can be inputted at a high rate.

The cell phone according to the present invention includes: two main housing 01 at the right and left side; two display 02 at the right and left side; an antenna 03;

a loudspeaker 04; a microphone 05; two sets of hinge mechanism 14 of upper and lower side; four sets of bar 121; four sets of bar storage groove 122; and total of nine keys in three rows and three columns 261, 262 and 263 on the left side face of the left housing; total of fifteen keys in five rows and three columns 264, 265, 266, 267 and 268 on the right side face of the left housing;

total of fifteen keys in five rows and three columns 269, 270, 271, 272 and 273 on the left side face of the right housing; a joy key 260, and total of nine keys in three rows and three columns 274, 275 and 276 on the right side face of the right housing, and a frame 233 for fingers rest.

Figure 43:
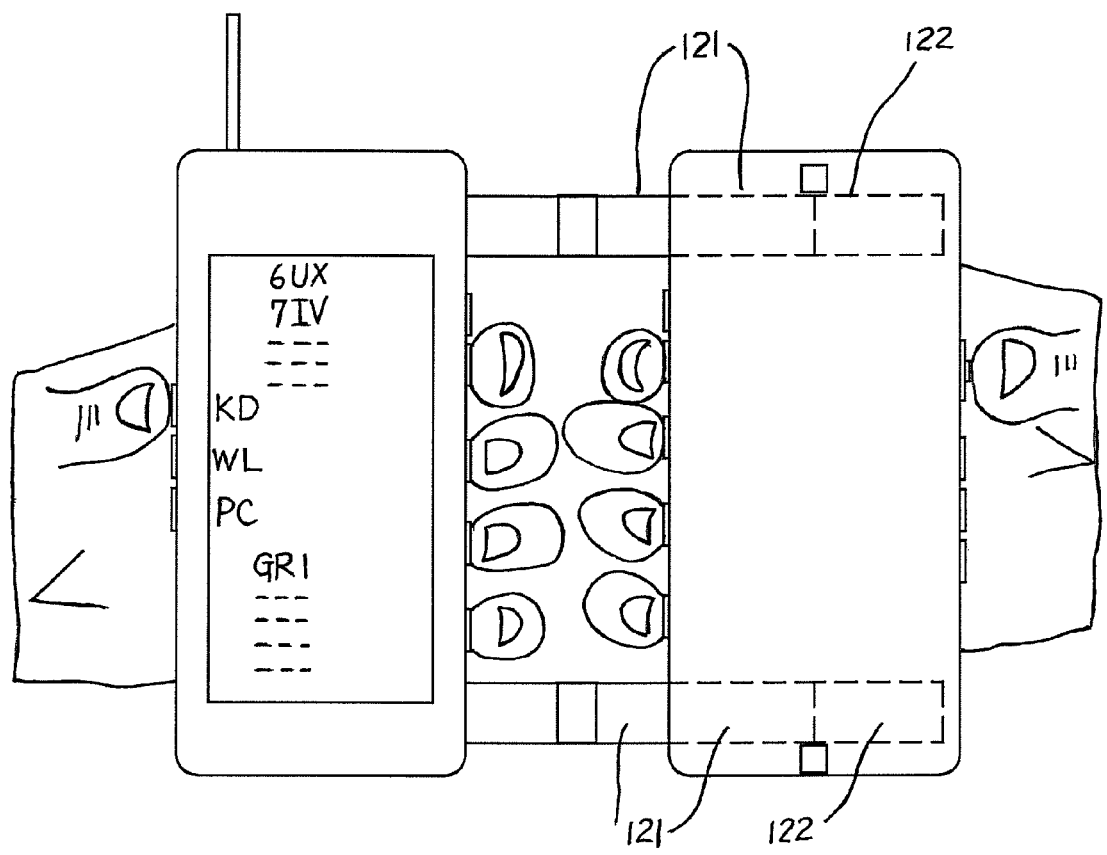
FIG. 43 illustrates a schematic view of the cell phone of FIG. 42 which is being inputted with letters by the ten fingers of both hands.

FIG. 43 illustrates a schematic view of the cell phone of FIG. 42 which is being inputted with letters by the ten fingers of both hands.

FIG. 43 schematically illustrates the cell phone being held by both hands, wherein ten fingers of both hands are positioned at home positions of the letter input means.

Except for the case where the cell phone is used by both hands, the letter input means takes a folded-configuration by allowing a user to apply a compressive force to the main housing 01 from left and right sides to push a bar 121 into a bar storage groove 122 and to subsequently allow the hinge mechanism 14 to oppose the back faces to each other as shown in FIG. 42. As a result, the two displays 02 face outside.

When being folded, the letter input means also can be used as a usual telephone in which the display 02 can display information and reception and transmission of information can be provided by a limited number of keys as compared to the number for the use by both hands.

FIG. 43 illustrates the appearance of the cell phone being used and having a structure convenient for the right-handed user.

As can be seen from FIG. 42, the cell phone includes the joy key 260 and shift keys 274-2 and 274-1 operated by which the fast-moving right hand thumb can perform a number of delicate tasks.

This cell phone also can be sufficiently used for the left-handed user.

As shown in FIG. 43, the left hand thumb operates nine keys in three rows and three columns 261, 262 and 263 on the left side face the left housing; the left hand forefinger operates six keys in two rows and three columns 264 and 265, the left hand middle finger operates three keys in one row and three columns 266, the left hand fourth finger operates three keys in one row and three columns 267, and left hand little finger operates three keys in one row and three columns 268 on the right side face of the left housing.

Similarly, the right hand forefinger operates six keys in two rows and three columns 269 and 270, the right hand middle finger operates three keys in one row and three columns 271, the right hand fourth finger operates three keys in one row and three columns 272, and right hand little finger operates three keys in one row and three columns 273 on the left side face of the right housing; the right hand thumb operates the joy key 260, nine keys in three rows and three columns 274, 275 and 276 on the right side face the right housing.

When the right hand thumb does not push any key and the remaining nine fingers push any of thirty-nine keys, then it is possible to input any of the twenty-six alphabetical lower cases from alphabet letters of "a" to "z" and ten numeric characters and three characters. Then, when the right hand thumb pushes the key 274-2 and the remaining nine fingers push any of thirty-nine keys, it is possible to input any of the twenty-six alphabetical capital letters from alphabet letters of "A" to "Z" and the other thirteen characters.

When the right hand thumb pushes the key 274-1 one more time and it is possible to input any of the other thirty-nine characters.

One of the above keys is not necessarily allocated to only a character and also may be allocated to a function key, for example "Space" key or "DELETE" key. When one key for one character or one sign is specified as the one which is to be pushed as a representative key for the collection of special signs, then a specific one character is inputted by the key and then a number of special signs can be subsequently inputted by repeatedly moving the joy key 260.

When alphabet is used for input, a single key can be used for a pair of a capital letter and a lower case. This allows the fingers to learn the input system with an extreme ease, thus requiring the minimum period of time for performing a touch typing with the cell phone.

In other words, the letter input rate is at least about twenty times faster than that obtained by a key layout requiring the input by one hand thumb.

Thus, the present invention allows one key to have two roles (e.g., alphabet, numeric character, sign, or function), thereby allowing a user to perform touch typing with extreme ease.

As described above, the present invention has the characteristic in that it is not required to switch the keys on the right side face to be operated by the right hand thumb when twenty-six alphabet letters are inputted. Such a characteristic also provides a revolutionary advantage when Japanese language is inputted with the Roman character input method. Specifically, a Roman character input method for Japanese language does not use the seven alphabet letters of "C", "F", "J", "L", Q, "V", and "X" and thus allows nineteen alphabet letters to e used for the input of "Kana characters" of Japanese language. As a result, the remaining twenty letters can be allocated to such keys that are frequently used for Japanese language (e.g., keys responsible for , """, "○", "RET", "DEL", "Space", and "BackSpace", or keys responsible for the collection of special characters). This allows all "Hiragana" to be continuously inputted without pushing the mode switch key and also allows the right hand thumb to always stay at the joy key so that the right hand thumb can be exclusively used for "Kanji (Chinese character)" conversion, thereby providing a super-high rate letter input.

In this way, the present invention can be applied to any language including English and Japanese so long as the language allows the conversion with thirty-nine characters.

The joy key 260 on the right side face has a main task of moving a cursor on the display 02 in the lateral and vertical directions. The joy key 260 also may be allocated for a task of conversion from "Hiragana" to "Kanji" and "Katakana" or other tasks when Japanese Kanji needs to be inputted.

By switching modes by the joy key 260, a native language input mode can be selected to use the three keys of 274 as a shift key for a native language (e.g., "Hiragana" and "Katakana" for Japanese language, "Kanji" for China, and "Hangul characters" for South Korea) and to use the three keys of 275 as a shift key for English. This allows the input of English only by the operation of the shift key without switching modes while a native language other than English is inputted.

Seven of the keys 274-3, 275, and 276 on the right side face are not necessary when English is inputted by both hands. Therefore, these key may be omitted or may be allocated to "BackSpace", "DEL", "ENT", ".", "," or the like for providing a faster input rate of an English text.

How to reasonably allocate such characters that are used frequently to thumbs or forefingers which can move faster than other fingers so that the fastest letter input rate can be obtained will be described in other embodiments.

The following sections will describe only that the key layout according to the present invention can classify the keys for capital letters, the keys for lower cases, and the keys for numeric characters/function/sign so that faster letter input rate is obtained.

The following section will describe another method for inputting letters with ten fingers of both hands according to the present invention.

In this method, the key 262-2 is used as a shift key used by a left hand thumb; the key 274-2 is used as a shift key used by a right hand thumb; and thirty keys are used as a letter key used by the remaining eight fingers. There are three shift modes including a key status in which no keys are pushed by thumbs of both hands. As a result, the calculation of 3×30 letters=90 letters is established. An increase of the shift keys to four allows the input of 150 letters.

There is a method in which while any one of the shift keys is being pushed, any one key is pushed by any one of the remaining eight fingers of both hands to provide one input. There is another method in which any one of the shift keys is pushed simultaneously with an action in which any one key is pushed by any one of the remaining eight fingers of both hands to provide one input. The latter has a characteristic in that a faster input rate can be provided to a person of experience who has a faster rate at which a key is pressed.

In the situation where both hands can be used, the present letter input means is used as shown in FIG. 43. When only one hand is available (e.g., a user hangs on a strap in a train), then the present letter input means is used while the cell phone is folded as described earlier to be used in the one hand mode.

The keys to be used in the one hand mode are almost the same as those in Embodiment 11. Specifically, the eighteen keys 269, 271, 272, 273, 274-1, 274-2, 275-1, 275-2, 276-1, and 276-2 are used.

The present letter input means also can be designed to work as a cell phone having a key structure for left-handed users. Such a cell phone can be realized by moving the joy key 260 shown in FIG. 42 from the face D to the side face of the face A. In this case, the nine keys 274, 275, and 276 are used instead of the nine keys 261, 262, and 263 for the letter input. By previously providing one joy key 260 on the face D and the face A, respectively, to design a software before an actual use of the cell phone, both of the left-handed user and the right-handed user are allowed to use one type of cell phone by selecting appropriate keys.

In FIG. 42, the cell phone always has, on the front surface of the main body, printed letters associated with the keys of the cell phone so that inputted letters corresponding to the key are guided. Such a printed guide is convenient when a user inputs letter to a cell phone or a small PDA device according to the present invention.

FIG. 43 shows the cell phone of FIG. 42 having on the display thereof letters inputted corresponding to the keys selected by the thumbs in order to show the letters corresponding to the keys selected by the mode keys and the thumbs. When a user pushes the key 261-1 on the top of the left side face while the display is as shown in FIG. 43, for example, then an alphabet letter of "K" on the left top of the display can be inputted. When the thumb selects another key, then the details of a letter indicated on the display are changed accordingly. Any of the above key layouts allows a user to utilize efficiently the guidance of input of keys in a small display of the cell phone.

Embodiment 13

Figure 31:
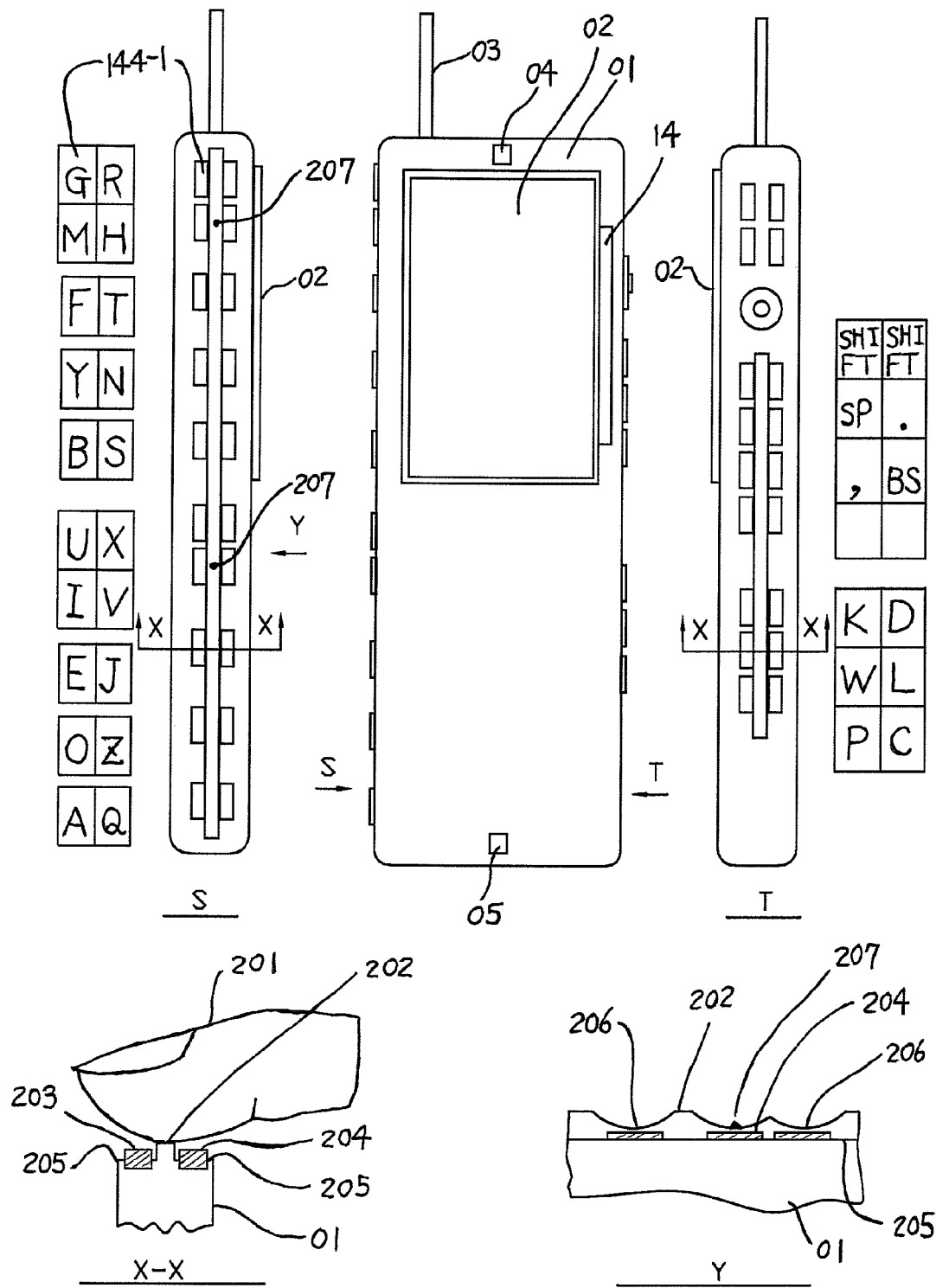
FIG. 31 illustrates the allocation according to the concept of the present invention of the letters to the keys of the cell phone of FIG. 26, and the cell phone has frames being provided between the neighboring keys and having a higher height than that of the keys.

Cross-sections X-X shown in FIGS. 30 and 31 illustrate the letter input means designed to provide an accurate letter input by neighboring keys without input errors. The cross-sections X-X includes a finger 201, a frame 202, a key 203, a key 204, a frame 205, and a main body 01.

The cross-section X-X includes the frame 202 which is provided between the neighboring keys 203 and 204 and which is higher than these keys. The frame 202 is a frame which accepts a reaction force caused by the pushing force to a key on the opposite side face by a finger. The reason why the frame 202 is higher than the keys 203 and 204 is that, allowing the finger 201 to be provided on the frame 202 prevents the keys 203 and 204 from being erroneously pushed even when the reaction force to the key on the opposite side face is accepted by the finger 201 on the frame 202. While being positioned on the frame 202, the finger 201 can push any of the neighboring keys 203 and 204 without departing from the frame 202. The frame 205 is designed to be lower than the keys 203 and 204 to allow a user to push the keys in an easier manner.

Figure 32:
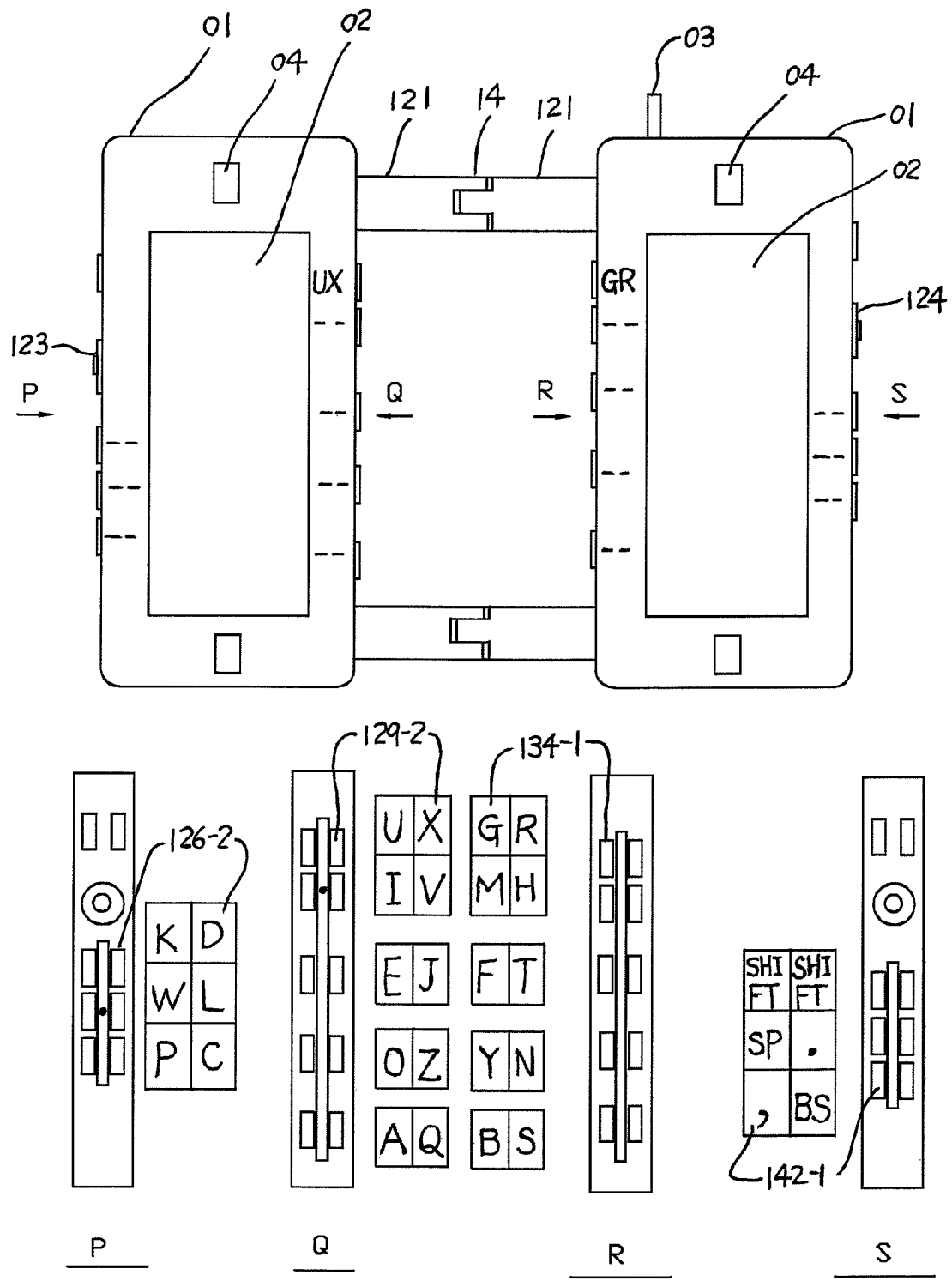
FIG. 32 illustrates the allocation according to the concept of the present invention of the letters to the keys of the cell phone of FIG. 24, and the cell phone has frames being provided between the neighboring keys and having a higher height than that of the keys.

The frames shown in FIGS. 30, 31, and 32 also have, on a specific position thereon, a projection shown by a solid circle 207 which can be tactilely felt by fingers so that a user can know where the home position is for the input by touch typing.

There are also concavities 206 as shown in the cross section Y of FIGS. 30 and 31 by which a user can know the home position for the fingers for the input by touch typing. The concavities 206 are provided at home positions for at least ten fingers on the surface of the frame 202 to accept the fingers. By the concavities 206, a user can tactilely feel the concavities 206 by the ten fingers to guide the ten fingers to the home positions.

Figure 34:
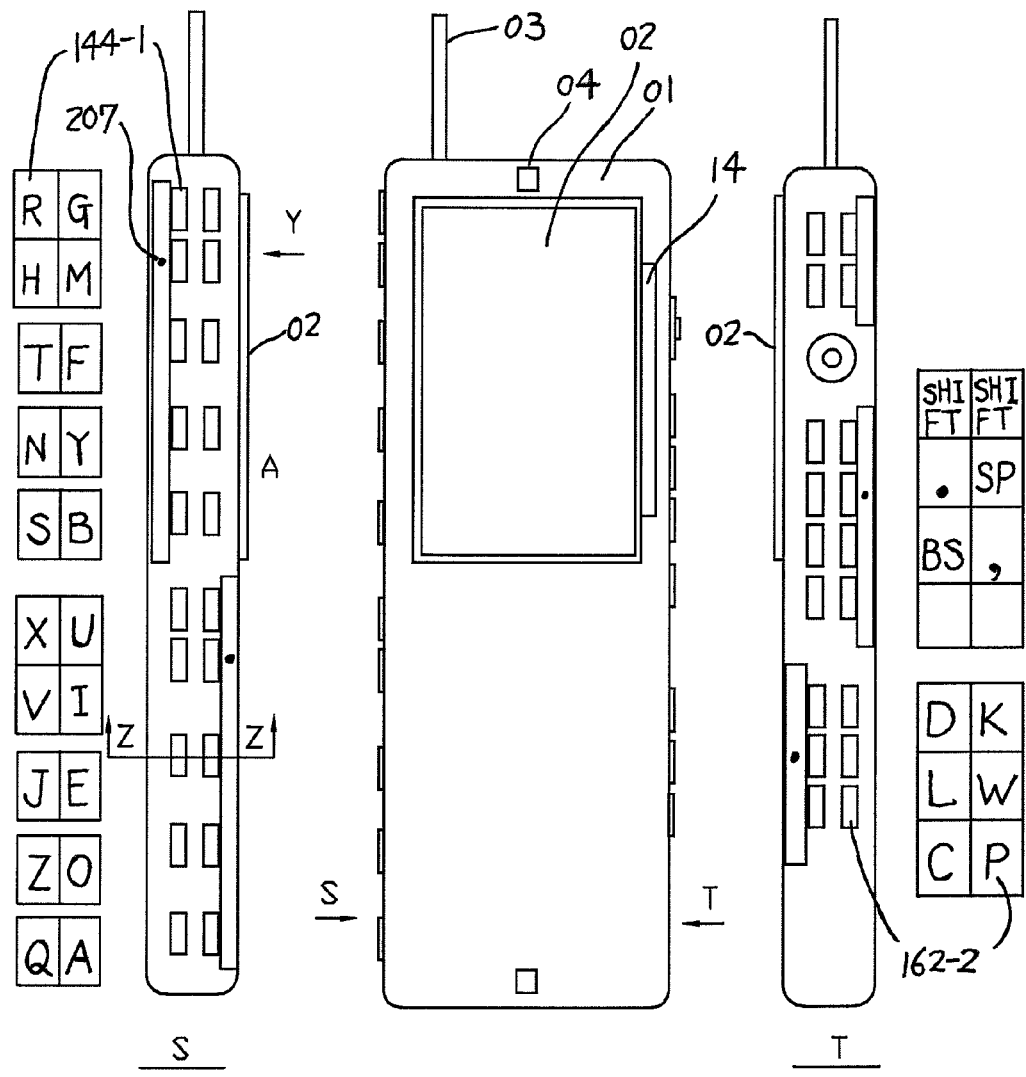
FIG. 34 illustrates the allocation according to the concept of the present invention of the letters to the keys of the cell phone of FIG. 26, and the cell phone has frames being provided at one side of the neighboring keys and having a higher height than those of the keys.

The letter input means shown in the cross-section Z-Z of FIGS. 33 and 34 is designed to provide the letter input without causing an input error by neighboring keys. The cross-section Z-Z includes the finger 201, the frame 208, the key 209, the key 210, the frames 211 and 212, and the main body 01.

As shown by the cross-section Z-Z, the frame 208 is provided on the side of the joint of the finger which operates one side of the neighboring keys 209 and 210, and is designed to be higher than these neighboring keys 209 and 210. The frame 208 is a frame for accepting a reaction force caused when a finger pushes a key on the opposite side face. The reason why the frame 208 is designed to be higher than the neighboring keys 209 and 210 is that the finger 201 placed on the frame 208 prevents the keys 209 and 210 from being erroneously pushed even when the finger 201 on the frame 208 receives a reaction force caused when a key on the opposite side face is pushed. The frame 208 also allows the finger 201 to push the key 209 without departing from the frame 208. When pushing the key 210, the finger 201 needs to move toward the tip end. The frames 211 and 212 are designed to be lower than the keys 209 and 210 so that a user can push the keys 209 and 210 in an easier manner.

Figure 35:
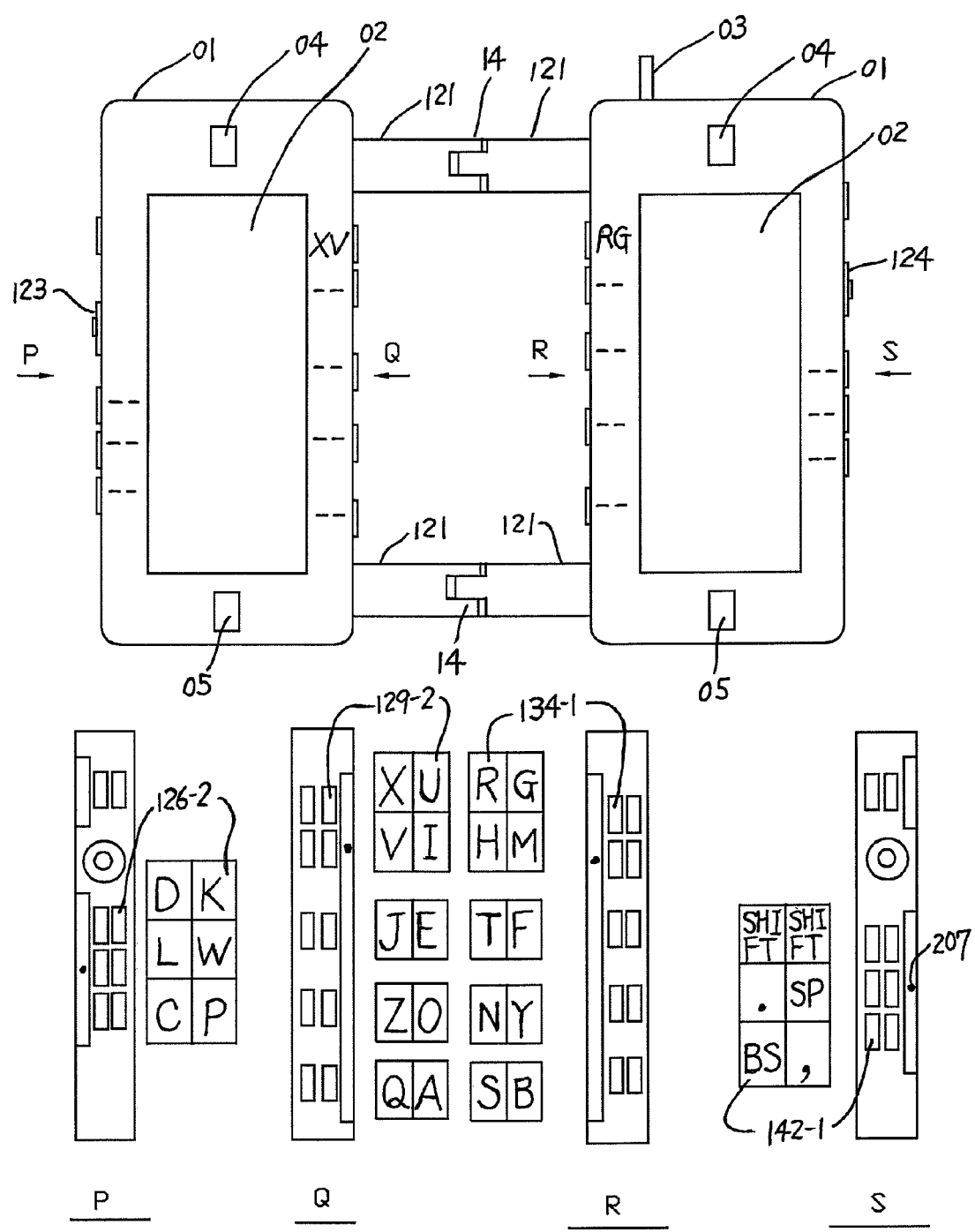
FIG. 35 illustrates the allocation according to the concept of the present invention of the letters to the keys of the cell phone of FIG. 24, and the cell phone has frames being provided at one side of the neighboring keys and having a higher height than those of the keys.

The frames shown in FIGS. 33, 34, and 35 also have, on a specific position thereon, a projection shown by a solid circle 207 which can be tactilely felt by fingers so that a user can know where the home position is for the input by touch typing.

There are also concavities 206 as shown in the cross section A of FIGS. 33 and 34 by which a user can know the home position for the fingers for the input by touch typing. The concavities 206 are provided at home positions for at least ten fingers on the surface of the frame 208 to accept the fingers. By the concavities 206, a user can tactilely feel the concavities 206 by the ten fingers to guide the ten fingers to the home positions.

The inventions shown in FIGS. 30, 31, and 32 are those allocating alphabet letters to the keys of the cell phones shown in FIGS. 17, 26, and 24. A conventional cell phone has about twelve keys allocated with twenty-six alphabet letters and thus provides a very slow letter input rate. A personal computer on the other hand uses a QWERTY key board having three of top, middle, and bottom rows.

Although the QWERTY key board is now being used world wide, the QWERTY key board is not the one made by deliberately considering the balance among various factors (e.g., a frequency at which each letter is used, hand fatigue caused by a distance along which the hand travels, a rhythm with which left and right hands are alternately used for typing a text, the difference of western letters and eastern characters in a frequency at which the former and the latter are used).

There is no conventional cell phone which has a key layout of two columns by which a user is allowed to input any of twenty-six alphabet letters by a single push of a key. Such a problem of conventional cell phones is solved by the present invention. In English, the order of the frequency at which each letter is used is ETAOINSRHLDCUMFPGWYBVKXJQZ from higher to lower. In English, the vowels of UIEOA basically tend to be interposed among the other consonants. In Japanese, on the other hand, the order of the frequency at which each character is used is IOAUNKTESRYH-MGDZWBP from higher to lower. It is clear that in eastern characters the vowels of UIEOA and consonants are alternately used. The letter input means shown in FIGS. 30, 31, and 32 allow the letters UIEOA and RHTNS which have a high frequency at which the letters are used both in western and eastern languages to be inputted by the minimum movement of both hand's forefingers, middle fingers, fourth fingers, and little fingers by allowing the keys to be provided in one column so that the fingers can move a shorter distance.

The letter input means shown in FIGS. 30, 31, and 32 also allow the keys to be configured so that the order of the frequency at which each finger is used can be the one of forefingers, middle fingers, fourth fingers, and little fingers from higher to lower. The letter input means also takes into consideration a comfortable rhythm of the alternate keying by fingers of left and right hands, a frequency at which each letter is used in western languages and the structure, and a frequency at which each character is used in eastern languages and the structure, thus allowing the present letter input means to be used for many languages in the world.

The inventions shown in FIGS. 33, 34, and 35 are also those allocating alphabet letters to the keys of the cell phones shown in FIGS. 17, 26, and 24. Design concepts of the key allocation shown in FIGS. 33, 34, and 35 are the same as those in FIGS. 30, 31, and 32 except for that frame is provided at one side of the keys so that the keys provided at such a position that can be easily touched by a finger are allocated with the letters having a high frequency at which the letters are used.

The cell phone shown in FIG. 30, 31, 32, 33, 34 or 35 has keys allocated with alphabet letters. The cell phone is also designed such that, while the shift key is being pushed, an alphabet letter key for inputting "R." is allocated with a numeric character "1", "G-" with "2", "H." with "3", "M" with "4", "T" with "5", "F" with "6", "N" with "7", "Y" with "8", "S" with "9", and "B" with "0". Such allocation allows numeric characters of 1, 2, . . . , 9 and 0, e.g., telephone number to be inputted only by those fingers for operating the shift key, which is very convenient and efficient.

Embodiment 14

Cross-sections X-X and Y shown in FIGS. 36, 39, and 42 show the inventions by which neighboring keys in the first, second, and third column of a plurality of columns can be used to input letters without causing input errors.

The cross-section X-X includes the finger 201, the frame 233, the key 222-1, 222-2, 222-3, and the main body 01.

As shown by the cross-section X-X, the frame 233 is provided between the neighboring keys 222-1 and 222-2, and is designed to be higher than these neighboring keys 221-1, 222-2 and 222-3. The frame 233 is a frame for accepting a reaction force caused when a finger pushes a key on the opposite side face. The reason why the frame 233 is designed to be higher than the neighboring keys 222-1, 222-2 and 222-3 is that the finger 201 placed on the frame 233 prevents the keys 222-1, 222-2 and 222-3 from being erroneously pushed even when the finger 201 on the frame 233 receives a reaction force caused when a key on the opposite side face is pushed. The frame 233 also allows the finger 201 to push the keys 222-1 and 222-2 without departing from the frame 233. When pushing the key 222-3, the finger 201 needs to move toward the tip end.

The frames shown in FIGS. 36, 39, and 42 also have, on a specific position thereon, a projection shown by a solid circle 207 which can be tactilely felt by fingers so that a user can know where the home position is for the input by touch typing.

There are also concavities 206 as shown in the cross section Y of FIGS. 36, 39 and 42 by which a user can know the home position for the fingers for the input by touch typing. The concavities 206 are provided at home positions for at least ten fingers on the surface of the frame 233 to accept the fingers. By the concavities 206, a user can tactilely feel the concavities 206 by the ten fingers to guide the ten fingers to the home positions.

Figure 45:
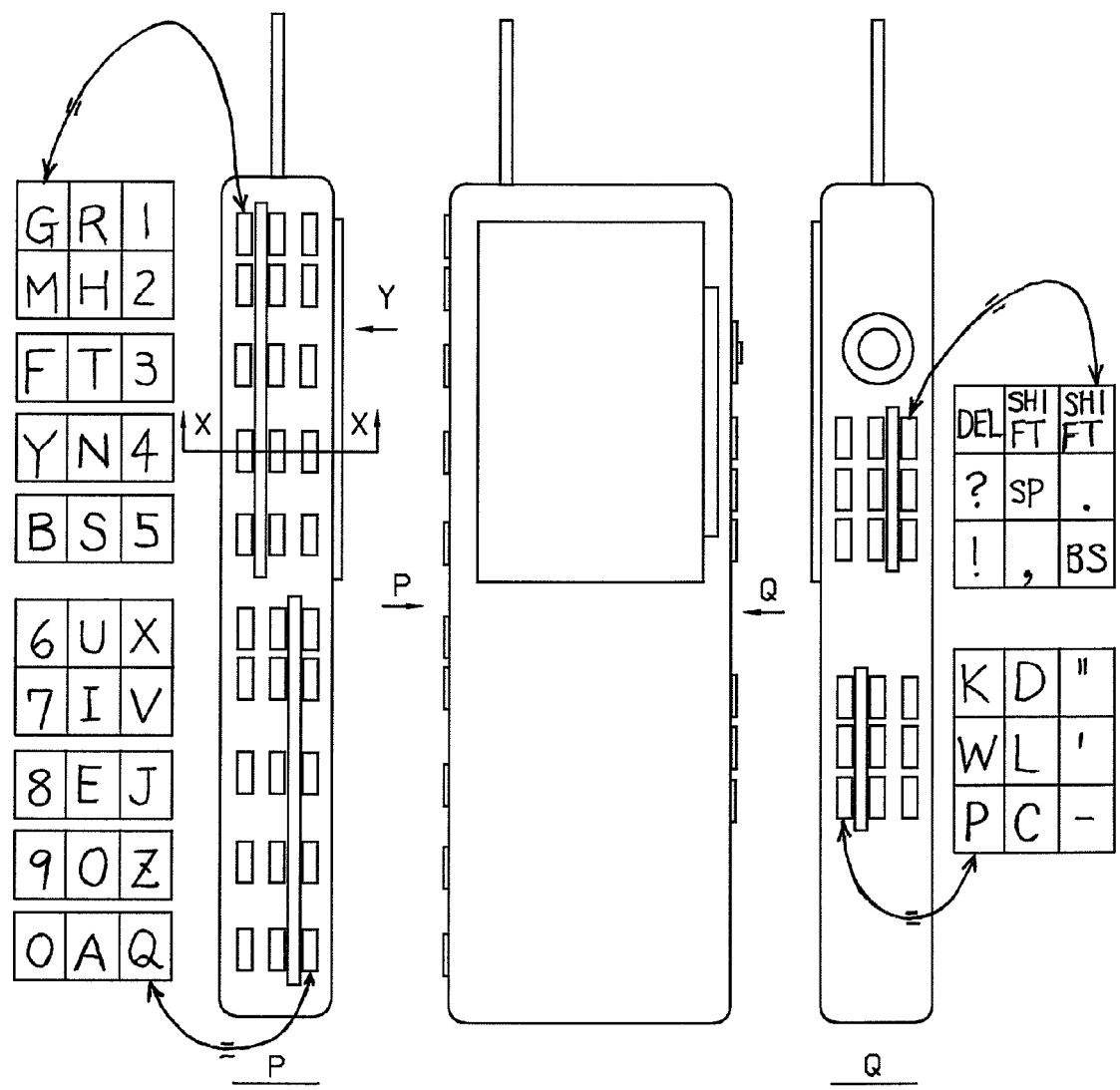
FIG. 45 illustrates the allocation according to the concept of the present invention of the letters to the keys of the cell phone of FIG. 39.

The inventions shown in FIGS. 44, 45, and 46 are those allocating alphabet letters and numeric characters to the keys of the cell phones shown in FIGS. 36, 39, and 42. A conventional cell phone has about twelve keys allocated with twenty-six alphabet letters and ten numeric characters thus provides a very slow letter input rate. A personal computer on the other hand uses a QWERTY key board having four of top, middle, and bottom rows including numeric characters.

Although the QWERTY key board is now being used world wide, the QWERTY key board is not the one made by deliberately considering the balance among various factors (e.g., a frequency at which each letter is used, hand fatigue caused by a distance along which the hand travels, a rhythm with which left and right hands are alternately used for typing a text, the difference of western letters and eastern characters in a frequency at which the former and the latter are used).

There is no conventional cell phone which has a key layout of three columns by which a user is allowed to input any of twenty-six alphabet letters and ten numeric characters by a single push of a key. Such a problem of conventional cell phones is solved by the present invention. In English, the order of the frequency at which each letter is used is ETAOINSRHLDCUMFPGWYBVKXJQZ from higher to lower. In English, the vowels of UIEOA basically tend to be interposed among the other consonants. In Japanese, on the other hand, the order of the frequency at which each character is used is IOAUNKTESRYHMGDZWBP from higher to lower. It is clear that in eastern characters the vowels of UIEOA and consonants are alternately used. The letter input means shown in FIGS. 44, 45, and 46 allow the letters UIEOA and RHTNS which have a high frequency at which the letters are used both in western and eastern languages to be inputted by the minimum movement of both hands' forefingers, middle fingers, fourth fingers, and little fingers by allowing the keys to be provided in one column so that the fingers can move a shorter distance.

The letter input means shown in FIGS. 44, 45, and 46 also allow the keys to be configured so that the order of the frequency at which each finger is used can be the one of forefingers, middle fingers, fourth fingers, and little fingers from higher to lower. The letter input means also takes into consideration a comfortable rhythm of the alternate keying by fingers of left and right hands, a frequency at which each letter is used in western languages and the structure, and a frequency at which each character is used in eastern languages and the structure, thus allowing the present letter input means to be used for many languages in the world. The letter input means also has a key layout of numeric character keys which can be visually recognized with an ease.

The cell phone shown in FIG. 44, 45, or 46 has keys allocated with alphabet letters. The cell phone is also designed such that, while the shift key is being pushed, an alphabet letter key for inputting "R" is allocated with a numeric character "1", "G" with "2", "H" with "3", "M" with "4", "T" with "5", "F" with "6", "N" with "7", "Y" with "8", "S" with "9", and "B" with "0". Such allocation allows numeric characters of 1, 2, . . . , 9 and 0, e.g., telephone number to be inputted only by those fingers for operating the shift key, which is very convenient and efficient.

INDUSTRIAL APPLICABILITY

According to the present invention, keys of a cell phone have the key layouts as shown in the above embodiments by which any one letter of twenty-six alphabet letters can be inputted by a single key push operation by any one finger of the fingers of both hands, without changing the input conditions by a mode key or the like. This allows a remarkable reduction of input errors by users. Also according to the present invention, one key is mainly allocated with one letter and one numeric character/sign/function, thereby allowing fingers to recognize a key with an ease.

Due to the above reasons, fatigue caused to a user is significantly alleviated.

When the present invention is used by all of the ten fingers of both hands, then a letter input rate obtained is about 20 times faster than that obtained by the input only by one thumb. Compared to the input by one thumb, the present invention also requires a far shorter period for the training of a user during which the user learns how to perform a touch typing with the key layout.

When the user can do a touch typing with the present invention, then a further faster letter input rate can be obtained. Specifically, the present invention provides a cell phone with a letter input rate equal to that obtained by a personal computer on a desk, providing new innovative communication means for a cell phone.

The present invention also provides a key layout by which keys can be pushed by the minimum movement of both hands' forefingers, middle fingers, fourth fingers, and little fingers by allowing the keys for the letters most frequently used both in western and eastern languages to be provided in one column so that the fingers can move a shorter distance. The keys are configured so that the frequency at which each finger is used decreases from forefingers, to middle fingers, to fourth fingers, to little fingers. In addition, the key layout provides a comfortable rhythm of the alternate keying by fingers of the left and right hands, since it considers the frequency at which each letter is used in western languages and the structure of western languages, and the frequency at which each character is used in eastern languages and the structure of eastern languages, thus allowing the key layout to be used for many languages in the world.

It is estimated that the number of people in the world using a cell phone or a small PDA for letter input will exceed 500 million. Thus, the letter input device for a cell phone according to the present invention has an industrial applicability.

The invention claimed is:

1. A cell phone configured for ten finger typing by a user, the cell phone comprising:
   a main body, wherein the main body comprises a substantially rectangular parallelepiped shape, with a first face and opposing side faces adjacent to the first face;
   a movable display, wherein the display is movable from a first position where the display is viewable from the first face to a second position approximately parallel with the side faces where the display is viewable from one of the side faces; and
   a keyboard, wherein the keyboard comprises:
      at least two shift keys;
      at least one joy stick;
      at least six keys located on the one of the side faces;
      at least twenty keys located on the other one of the side faces; and
      wherein each of said six keys located on the one of the side faces and said twenty keys located on the other one of the side faces corresponds to a letter or a character.

2. The cell phone according to claim 1, wherein each of said six keys located on the one of the side faces and said twenty keys located on the other one of the side faces corresponds to a single one of twenty-six alphabet letters.

3. A cell phone configured for ten finger typing by a user, the cell phone comprising:
   a main body, wherein the main body comprises a substantially rectangular parallelepiped shape, with a first face and opposing side faces adjacent to the first face; and a keyboard, wherein keyboard comprises;
at least two shift keys;
at least one joy stick;
at least six keys located on one of the side faces;
at least twenty keys located on the other one of the side faces; and
wherein each of said six keys located on the one of the side faces and said twenty keys located on the other one of the sides faces corresponds to a letter or a character; and a frame located on each of the opposing side faces, wherein the frames are higher than adjacent keys.

4. The cell phone according to claim 3, wherein said frames are provided with concavities to identify specific keys.

5. The cell phone according to claim 3, wherein said frames are provided with projections to identify specific keys.

* * * * *